US010963282B2

(12) United States Patent
Shevade et al.

(10) Patent No.: US 10,963,282 B2
(45) Date of Patent: Mar. 30, 2021

(54) COMPUTING SERVICE WITH CONFIGURABLE VIRTUALIZATION CONTROL LEVELS AND ACCELERATED LAUNCHES

(71) Applicant: Amazon Technologies, Inc., Seattle, WA (US)

(72) Inventors: Upendra Bhalchandra Shevade, Washington, DC (US); Diwakar Gupta, Seattle, WA (US); Michael B. Furr, Herndon, VA (US); Kevin P. Smith, Fairfax, VA (US); Nishant Mehta, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 121 days.

(21) Appl. No.: 16/216,568

(22) Filed: Dec. 11, 2018

(65) Prior Publication Data
US 2020/0183724 A1   Jun. 11, 2020

(51) Int. Cl.
G06F 9/455 (2018.01)
G06F 9/50 (2006.01)

(52) U.S. Cl.
CPC .......... *G06F 9/45558* (2013.01); *G06F 9/505* (2013.01); *G06F 9/5016* (2013.01); *G06F 2009/45562* (2013.01); *G06F 2009/45575* (2013.01); *G06F 2009/45595* (2013.01)

(58) Field of Classification Search
CPC .... G06F 9/45558; G06F 9/5016; G06F 9/505; G06F 2009/45562; G06F 2009/45575; G06F 2009/45595

USPC .......................................................... 718/1
See application file for complete search history.

(56) References Cited

U.S. PATENT DOCUMENTS

| | | | |
|---|---|---|---|
| 8,977,679 B2 * | 3/2015 | Van Biljon | H04L 67/10 709/203 |
| 9,092,625 B1 * | 7/2015 | Kashyap | G06F 21/566 |
| 10,147,123 B2 * | 12/2018 | Golden | G06Q 30/06 |
| 2014/0365626 A1 | 12/2014 | Radhakrishnan et al. | |
| 2016/0070590 A1 * | 3/2016 | Eicher | G06F 9/45558 719/320 |
| 2019/0294477 A1 * | 9/2019 | Koppes | G06F 9/5072 |

OTHER PUBLICATIONS

Google Compute Engine Documentation, "Virtual Machine Instances", Sep. 2018, Download from https://web.archive.org/web/20180923170058/https://cloud.google.com/compute/docs/instances/, 3 pages (Year: 2018).*

(Continued)

*Primary Examiner* — Ted T. Vo
(74) *Attorney, Agent, or Firm* — Robert C. Kowert; Kowert, Hood, Munyon, Rankin & Goetzel, P.C.

(57) ABSTRACT

A first virtualization control mode to be used for configuring one or more compute instances is determined. Based at least partly on the mode, preparatory configuration operations for launching a compute instance are initiated. The operations include transferring at least a portion of a machine image to a storage device accessible from a host, and initialization of a virtual network interface. A compute instance is instantiated using the machine image at the host. The compute instance is a thread of an intermediary process launched by an administrative agent at the host in response to a launch request.

20 Claims, 23 Drawing Sheets

(56) References Cited

OTHER PUBLICATIONS

Google Compute Engine Documentation, "Creating and Starting a VM Instance", Jun. 2018, downloaded from https://web.archive.org/web/20180822093639/https://cloud.google.com/compute/docs/instances/create-start-instance , 12 pages (Year: 2018).*

Google Compute Engine Documentation, "Deploying Containers on VMs and Managed Instance Groups", 2017, downloaded from https://web.archive.org/web/20170918124504/https://cloud.google.com/compute/docs/containers/deploying-containers, 11 pages (Year: 2017).*

Google Compute Engine Documentation, "Exporting an Image", 2017, downloaded from https://web.archive.org/web/20170201101732/https://cloud.google.com/compute/docs/images/export-image , 4 pages (Year: 2017).*

International Search Report and Written Opinion from PCT/US2019/063363, dated Mar. 4, 2020, pp. 1-10.

\* cited by examiner

Information about supported virtualization control modes (VCMs) for compute instances (CIs) of one or more types (e.g., micro-VMs that meet a required resource capacity criterion) such as shared managed mode (SMM), dedicated managed mode (DMM), dedicated power user mode (DPM) and the like, is provided via programmatic interfaces of a virtualized computing service (VCS) 2201

↓

Respective indications of (a) a machine image to be used to instantiate one or more CIs (which may represent a snapshot generated from some earlier-launched CI), (b) an isolated virtual network (IVN) with which connectivity from the one or more compute instances is to be configured and/or (c) a particular VCM, VCM1, to be used for configuring/administering the compute instances is obtained, e.g., via a programmatic interface of the VCS    2204

↓

Based at least partly on VCM1, a set of preparatory configuration operations that collectively enable faster responses to future CI launch requests is initiated/performed: e.g., caching at least a portion of the machine image at a location accessible from candidate virtualization hosts (VHs) that each include a virtualization management offloading card, caching additional data objects that may be shared among CIs (such as SW container artifacts), initializing one or more virtual network interfaces, etc.; the extent of advance preparation, and therefore the extent of launch acceleration achieved, may be greater for VCMs in which the client has greater control and can, for example, indicate the specific virtualization hosts to be used   2207

↓

A launch request for one or more CIs (e.g., a collaborating group of micro-VMs) is received at the VCS; depending on VCM1, the request may indicate the specific VH(s) at which the respective CIs are to be instantiated    2210

↓

Any additional pre-requisite configuration operations required are performed, and the requested CIs are launched, e.g., each implemented as one or more threads of a virtualization intermediary process established by a VCS control plane agent at a VH in response to the launch request; one or more types of communication channels may be established for the CIs, including over-the-network channels (e.g., to devices within the IVN, thus configuring the CIs as part of the IVN) via respective virtual network interfaces whose traffic is processed at the virtualization management offloading card, local channels for communications with other CIs without using network resources, etc.; a given CI may be terminated after a pre-disclosed duration   2213

↓

Depending on VCM1, detailed information regarding the requested capacities of CIs at a given host and/or measures of actual resources used at that host by the CIs may be provided to a client; such information may be used, when requesting additional CIs, to oversubscribe resources along desired dimensions such as CPU, memory etc. by the client if desired    2216

↓

Snapshots of state information of a CI, including CPU state, memory state etc. may be generated, e.g., based on requests from clients and/or based on auto-detection of snapshot points during CI execution; such snapshots may be used to clone CIs that have already been at least partly configured, further shortening the time taken by a CI to start doing useful application work    2219

*FIG. 22*

COMPUTING SERVICE WITH CONFIGURABLE VIRTUALIZATION CONTROL LEVELS AND ACCELERATED LAUNCHES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment.

A network-accessible service that provides virtualized computing functionality may have to manage hundreds of thousands, or even millions, of virtual machines concurrently. Some of the virtual machines, established for long-running client applications, may remain operational for weeks, months, or years, and may each consume a substantial amount of computing, memory and storage resources. Other virtual machines may be short-lived, e.g., lasting for just a few minutes or seconds to perform a specific task on behalf of a client, may each consume a smaller amount of resources, and may benefit more from short startup times. The same client may need a variety of different types of virtual machines for different applications and use cases, and the demand for the different types vary substantially over time. Designing a virtualization service that can efficiently handle large, dynamically changing mixes of virtual machines with widely differing functional and performance requirements remains a non-trivial technical challenge.

BRIEF DESCRIPTION OF DRAWINGS

FIG. 22 is a flow diagram illustrating aspects of operations that may be performed at a virtualized computing service to support accelerated launch times and client-selectable levels of virtualization control, according to at least some embodiments.

Figure 1:
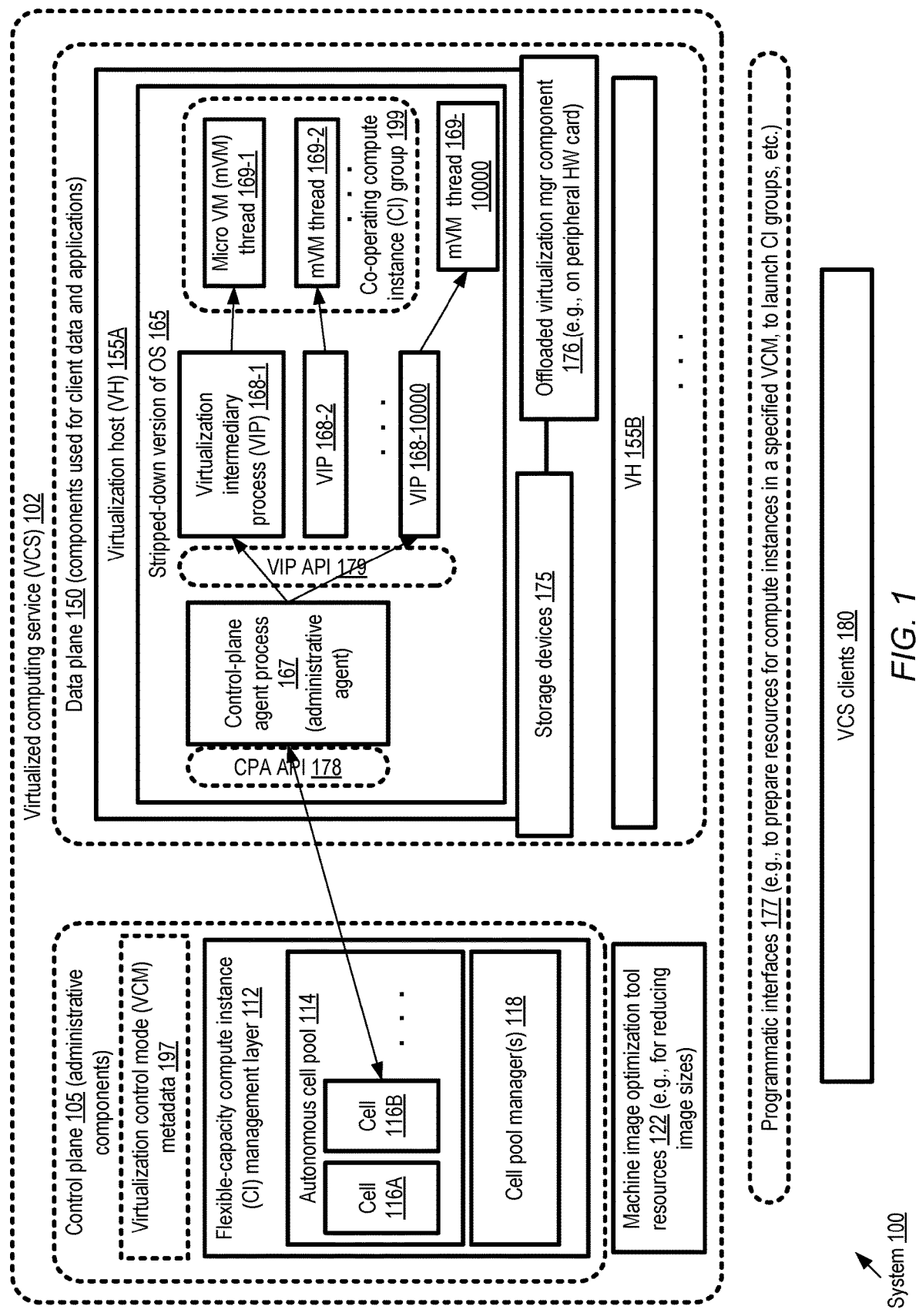
FIG. 1 illustrates an example system environment in which a virtualized computing service that supports virtual machines with short launch times and customizable levels of user control regarding various types of administrative tasks may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing a virtualized computing service (VCS) that can support the rapid instantiation of large numbers of compute instances such as virtual machines on individual virtualization hosts, while enabling a variety of levels of user control over administrative decisions such as selection of virtualization hosts, resource oversubscription and the like are described. The term "compute instance" may be used in various embodiments to refer generally to a variety of types of program execution environments that may be set up at virtualization hosts of a VCS, including for example full-fledged virtual machines in which the vast majority or all hardware devices of a host are virtualized, "bare-metal" instances in which a significant subset of hardware devices are directly controlled by the compute instance's operating system processes, and so on. Some compute instances may be referred to in various embodiments as "micro" virtual machines (mVMs), as their respective resource requirements and/or expected lifetimes may lie below certain pre-selected thresholds, thus facilitating their instantiation at virtualization hosts whose hardware and software stacks are optimized for hosting thousands of small-resource-footprint virtual machines. In at least some embodiments, a virtualized computing service that is designed primarily or specifically to host micro virtual machines may be implemented. Note that techniques similar to those described herein may of course also be used to support fewer compute instances per host; in general, the techniques may allow substantial flexibility in the number and characteristics of compute instances that can be supported on individual hosts, and the extent to which clients of the service can control various aspects of compute instance administration.

As one skilled in the art will appreciate in light of this disclosure, certain embodiments may be capable of achieving various advantages, including some or all of the following: (a) reducing the overall amount of CPU, memory and storage resources that are utilized at a virtualized computing service to set up and run applications that utilize compute instances while meeting customer-specified levels of control over virtualization decisions, functionality and performance requirements, (b) improving the overall responsiveness of a virtualized computing service with respect to compute instance configuration requests, especially pertaining to starting up short-lived or small-resource-footprint virtual machines, (c) simplifying the user experience of customers that wish to control various aspects of virtualization management such as placement, oversubscription and the like, and/or (d) deploying groups of cooperating compute instances that collaborate on a given set of tasks, e.g., using fast local communication channels at a given host, such that the compute instances of a group can communicate efficiently with each other using local communication channels that do not require the use of networking devices, thereby reducing the overall resource usage for such collaborative applications.

The resources and artifacts of a network-accessible virtualized computing service may be logically subdivided into at least two high-level groups in various embodiments: a control plane and a data plane. The control plane may be used primarily for administrative operations, such as provisioning the hardware to be used for compute instances, establishing and maintaining network connectivity, monitoring various components to ensure availability and failure resilience at desired levels, and so on. The data plane may be used primarily for running client applications on client-requested compute instances, storing and transmitting client application data, and so on. In some embodiments, the control plane may be implemented primarily using one set of computing devices, while the data plane may be implemented primarily using a different set of computing devices, e.g., in an attempt to reduce the probability of failures in one plane from affecting the other. In at least some embodiments, a given computing device of a virtualized computing service may comprise components of both the control plane and the data plane—e.g., as discussed below in further detail, an agent of a control plane cell may run on a virtualization host at which a client-requested compute instance is launched. In at least some embodiments, the VCS may be one among several network-accessible services implemented at a provider network or public cloud environment, and some virtual machines may be set up at the VCS on behalf of one or more of the other services. For example, a service that supports software container-based computing may utilize micro virtual machines of the VCS to set up software containers for its clients in one embodiment; such services may be referred to as intermediary services as they utilize the VCS on behalf of their own clients.

In various embodiments, the set of clients or users of a VCS may have widely varying levels of expertise regarding virtualization. Some clients may wish to leave the vast majority of virtualization administration decisions to the control plane components of the VCS, while other clients may prefer to have the ability to make fine-grained administrative decisions such as selecting specific dedicated hosts at which respective compute instances are to be launched. In order to help support such diverse requirements, in at least some embodiments a number of virtualization control modes (VCMs) may be supported at a VCS. For example, in one embodiment at least a shared managed mode (SMM), a dedicated managed mode (DMM) and a dedicated power-user mode (DPM) may be supported. In the SMM, for example, more decisions regarding virtualization administration (such as the selection of hosts for specific compute instances) may be made at the VCM than in the DMM or the DPM, with the client being provided the highest level of administrative control among the VCMs when the DPM is being used in at least some embodiments. The VCMs may differ from one another in regard to host multi-tenancy versus single tenancy as well in at least some embodiments, with virtualization hosts being potentially shared among compute instances of multiple clients in the SMM mode, and with virtualization hosts being dedicated for compute instances of individual clients in the DMM and DPM modes. The number and types/definitions of VCMs supported at the VCS may differ in different embodiments.

The VCS may provide information about the supported modes, including the particular types of administrative decisions that a client may make in respective supported modes, via one or more programmatic interfaces (e.g., a web-based console, a set of application programming interfaces (APIs), command-line tools, graphical user interfaces and the like) in various embodiments. The client may select a particular VCM to be used for a particular group (or all) of the compute instances to be set up on the client's behalf, and provide an indication of the VCM to the VCS in at least some embodiments (e.g., via one or more programmatic requests). In at least some embodiments, the number and types of programmatic interactions between a client and the VCS with respect to establishing and using a set of compute instances may be based at least in part on the selected VCM—e.g., the client may obtain a set of candidate virtualization host identifiers to be used programmatically in the DPM or the DMM, but not in the SMM in one embodiment. The amount of preparatory configuration work that can be done to help speed up compute instance launches using specified machine images may vary from one VMC to another in at least some embodiment. Such preparatory configuration work may include, for example, one or more of the set of networking configuration steps needed to enable a compute instance to communicate with various types of endpoints (including for example endpoints within one or more types of isolated virtual networks of the client). As a result, in one embodiment, launches of micro-VMs or other compute instances, and/or the total time taken by the compute instances to start doing useful application processing (which may at least in some cases involve network communication with external endpoints) may be accelerated to a greater extent when DPM is employed than when DMM is used, and to a greater extent when DMM is used than when SMM is used. As such, in various embodiments, the set of supported VCMs may represent a spectrum of tradeoffs between the extent of administrative decision making done by clients, and the speed with which useful application work can be initiated at compute instances. Generally speaking, in at least some embodiments, the more decisions that the client is willing to make, the faster their instances may potentially be brought online, and the more quickly the applications on those compute instances can start performing useful work.

According to at least some embodiments, a network-accessible computing service such as a VCS may comprise a set of computing devices that store program instructions. When executed on or across one or more processors, the instructions may cause the computing devices to obtain an indication of (a) a machine image to be used to instantiate one or more compute instances (such as micro virtual machines which meet a first resource capacity criterion), (b) an isolated virtual network to which connectivity from the one or more compute instances is to be established, and (c) a first virtualization control mode (VCM) associated with the one or more compute instances. An isolated virtual network (IVN) may comprise a collection of computing and/or other resources in a logically isolated section of a provider network or cloud environment in various embodiments. The indication(s) of the machine image, the IVN and/or the first VCM may be received via one or more of the VCM's programmatic interfaces in various embodiments. Machine images may also be referred to as boot images in some embodiments. Based at least in part on the first VCM, one or more preparatory configuration operations enabling an accelerated response to a future launch request for one or more compute instances may be initiated in at least some embodiments. The preparatory configuration operations may, for example, include (a) a transfer of the machine image to a storage device accessible from a first virtualization host and (b) an initialization of one or more virtual network interfaces at the first virtualization host. Virtualization hosts may also be referred to as "virtualization servers" in various embodiments. In some embodiments, at least some virtualization hosts may include a respective virtualization offloading card configured to process network traffic between one or more virtual network interfaces of the host (i.e., programmatically attached to one or more compute instances or other software entities running at the host) and one or more endpoints external to the host. In at least one embodiment, a programmatic request to prepare the resources needed for one or more later compute instance launch requests may be submitted by the client, and the preparatory operations may be performed in response to such a prepare request.

Later, after at least some of the preparatory operations are completed, at least a first compute instance (such as a micro virtual machine) may be caused to be instantiated using the specified machine image at the first virtualization host in various embodiments. The first compute instance may comprise at least one thread of an intermediary process launched by an administrative agent of the computing service at the first virtualization host in response to a launch request in some embodiments. The first compute instance may be configured to communicate with one or more endpoints within the isolated virtual network using the virtualization offloading card and at least one virtual network interface in various embodiments. As such, the compute instance may be configured within the isolated virtual network in such embodiments.

According to some embodiments, depending on the VCM in use, at least a second compute instance may later be caused to be instantiated at the first virtualization host after the first compute instance is launched. An indication that the first virtualization host is to be used for the second compute instance may be obtained, e.g., from the client on whose behalf the first compute instance was set up. In at least some cases, the instantiation of the second compute instance at the first virtualization host may result in an oversubscription, permitted in accordance with the VCM being used, of at least a first type of resource of the first virtualization host (such as virtual and/or physical CPUs (central processing units), memory, disk space, networking bandwidth, or the like). The term oversubscription may be used in various embodiments to refer to a scenario in which the nominal total resource capacity of a given host, with respect to a given type of resource, is exceeded by the sum of the requested resource capacities of the individual compute instances at the host. In at least one embodiment, the client may make oversubscription-related decisions in one or more of the virtualization control modes (but not necessarily in all the modes). For example, in some embodiments, when the dedicated power user mode (DPM) is used, the client may obtain information programmatically about the requested resource capacities of the compute instances currently instantiated at a given virtualization host H1, as well as some measures or metrics of the actual resource usage of the compute instances over some recent time period at H1, and request that one or more additional compute instances be started up at H1 even if the launch of the additional instances would result in exceeding a resource capacity limit of H1.

In one embodiment, if the dedicated power user mode or another equivalent mode is in use, the VCS may start up an additional compute instance at a specified virtualization host without verifying whether a requested resource level of the additional compute instance with respect to one or more resource types would cause the nominal resource capacity of the host to be exceeded; in contrast, if other VCMs are in use, the VCS may at least in some cases place a requested compute instance on a particular host only after checking whether the nominal resource capacity of the host would be exceeded by introducing the additional compute instance. In some embodiments, a client may begin using one or more virtualization hosts in a particular VCM, and later submit a programmatic request to change the VCM to be used at the virtualization hosts going forward (e.g., for subsequent compute instance launches). The VCM may, in various embodiments, store metadata indicating the particular VCM being used at respective virtualization hosts.

In some embodiments, a given launch request may indicate that a group of compute instances, e.g., a group collectively implementing at least a part of the functionality of an application or a set of related applications, is to be instantiated at one or more virtualization hosts, and multiple compute instances may be set up accordingly. In one embodiment, local channels of communication, e.g., using buffers implemented in a region of shared volatile or non-volatile memory of the virtualization host, may be set up for the collaborating compute instances. The types of communication channels to be set up for the group of compute instances may be indicated in a launch request for the group, and/or in a request for preparatory operations pertaining to the group in some embodiments.

In at least some embodiments, a number of additional techniques may be implemented at a VCS to help increase the speed of compute instance launches, and/or to decrease the usage of resources required for individual compute instances at a given virtualization host. For example, in some embodiments, state information (e.g., processor state, memory state) etc. of a running or partially-configured compute instance may be captured in the form of a snapshot, and such snapshots may be used to launch copies or clones of the instances more quickly (since the snapshots may already include the results of some types of configuration operations that would have had to be re-performed if the snapshots were not used). In some embodiments, the particular phases/stages of execution at which one or more respective useful snapshots may be generated from a compute instance may be automatically detected by components of the VCS, and snapshots may be automatically generated without corresponding client requests. In other embodiments, a client may submit programmatic requests for generating such snapshots from a compute instance.

In at least one embodiment, a VCS may provide a machine image optimization tool, and/or execution platforms/environments at which such tools may optionally be used by clients. Such a tool may be used, for example, to detect modules of operating systems kernels, shared libraries and/or application code that are included in a particular machine image, but are not used during the executions of some applications run using compute instances. Such unused modules may be eliminated from the machine image used for the compute instances with the help of such tools, resulting in smaller machine images that also help speed up compute instance launches and/or execution, reduce the total storage required for the compute instances, and so on.

According to at least some embodiments, the VCS may enforce lifetime limits (e.g., T hours of execution) for at least some types of compute instances. After a compute instance reaches its advertised lifetime limit, it may be terminate automatically by the VCS, e.g., without a client-submitted termination request in such embodiments. Such auto-terminations may help avoid scenarios in which, for example, a given compute instance runs for so long that it is unable to utilize security-related bug fixes and the like which have been released since the compute instance began running. Such long-running compute instance may become more susceptible to attacks. Forced lifetime-limit based terminations may lead to at least some compute instances used for long-lasting applications being restarting periodically, using updated versions of the underlying virtualization software, operating system software and/or application code, and may reduce such vulnerabilities in various embodiments.

When requesting a compute instance (CI), a client of a VCS may have to specify various performance-related characteristics or requirements of the requested CI in some embodiments. This may be done in a variety of ways. In some embodiments, a VCS may enable clients to select from among a discrete set of standardized pre-defined configurations when requesting a particular CI or virtual machine. Each such pre-defined configuration may, for example, indicate a computing capacity (expressed, for example, in terms of virtual CPUs, where the definition of a virtual CPU may be specified by the VCS), a memory capacity, a storage capacity, a networking capacity, and the like. In other embodiments, a VCS may provide more flexibility with regard to CI capabilities: e.g., a client may specify their own combination of performance requirements with respect to processing, memory, storage, networking and the like for a given set of one or more CIs. In at least some embodiments, both pre-defined CI types and client-specified flexible-capacity CIs may be supported. CIs whose capabilities are specified by clients, and do not necessarily correspond to pre-defined standardized configurations supported by the VCS, may be referred to as "flexible" or "flexible-capability" CIs in some embodiments.

Compute instances whose resource requirements (e.g., along one or more dimensions such as CPU, memory, storage, networking and the like) and/or whose lifetimes (duration between launch and termination) are below thresholds defined by the VCS may be designated as micro VMs in at least some embodiments as indicated earlier. Compute instances whose resource requirements exceed the threshold may be referred to as macro VMs in some embodiments. In at least one embodiment, the VCS may pre-define a number of micro VM categories or types, while in other embodiments, a flexible-capacity CI whose resource requirements and/or expected lifetime fall below pre-selected thresholds may be classified as a micro VM—that is, the designation of a CI as a micro VM may be independent of whether the CI belongs to a pre-defined category or not. In one example scenario, if a particular type of hardware server is being used as a virtualization host for micro VMs, and the memory requirement of a particular CI is below (1/N) times the available physical memory of an individual hardware server of that type, where N is a parameter established by the VCS control plane, the CI may be considered a micro VM, and the CI may be classified as a non-micro VM otherwise. The resource or lifetime thresholds distinguishing a micro VM from non-micro VMs may change over time in various embodiments, e.g., as the resource capabilities of individual hosts increase. It is noted that while a micro VM is used as a primary example of the kind of compute instance that is launched at a VCS in at least part of the subsequent description, the techniques described herein for flexible user control over virtualization decisions and accelerated startup of compute instances, are not limited to micro VMs; such techniques may be applied with equal success to any type of compute instance in various embodiments, including for example bare-metal instances, high-resource-use virtual machines, long-lifetime virtual machines and so on.

According to at least some embodiments, a combination of software and hardware optimized for hosting large numbers of micro VMs may be used for at least a subset of virtualization hosts of a VCS. In such embodiments, a virtualization host that is to be used for micro VMs may comprise one or more processors, a memory and one or more virtualization offloading cards. As indicated by the name, a virtualization offloading card may comprise a hardware card (with its own processors, firmware and/or software) that performs at least a subset of virtualization management functionality, thereby offloading or reducing the virtualization management workload of the primary processors (e.g., CPUs) and main memory of the virtualization host. Such cards may also be referred to as offloaded virtualization manager components (OVMCs) or OVMC cards in some embodiments. In one implementation, at least one virtualization offloading card may be attached to the host via a peripheral interconnect such as a PCI (Peripheral Component Interconnect) bus. A given virtualization host may comprise several different virtualization offloading cards in some embodiments—e.g., one may be used for offloading networking-related virtualization management tasks, another for offloading disk storage-related virtualization management tasks, etc. The memory of a virtualization host may store program instructions to implement components of an optimized or stripped down version of an operating system in some embodiments, as well as a set of processes directly involved in instantiating virtual machines. In at least some embodiments, the memory may comprise instructions that when executed on the processors of the virtualization host cause an administrative agent of the VCS control plane to determine that a compute instance such as a micro VM is to be instantiated at the virtualization host on behalf of a VCS client.

The virtualization host may have been selected as the recipient of a request for the new compute instance (e.g., by a VCS control plane cell, and/or by a client, depending on the VCM being used) based at least in part on a determination that the resource requirements of the requested VM are below a threshold used for classifying VMs as micro VMs. The administrative agent at the host, which may be referred to as a control plane agent or CPA process in various embodiments, may serve as a local API (application programming interface) endpoint for the VCS control plane in some embodiments—e.g., the VCS control plane may communicate with the virtualization host, as and when needed, by invoking APIs implemented by the CPA, and the VCS control plane may not need to communicate directly with the compute instances launched at the virtualization host in such embodiments. Operations that are to be performed at the virtualization host in response to control plane requests (e.g., launches/terminations of compute instances, configuration changes to accommodate new compute instances, etc.) may be initiated locally by the CPA process in at least some embodiments. The determination that a compute instance is to be set up at the host may be made based at least in part on analyzing a request received at the agent process from a component of the VCS control plane (which may be running as part of a separate control plane cell as described below) in various embodiments. The control plane component may transmit such a request to the CPA in response to a request from a VCS client to launch a compute instance in various embodiments—that is, a launch request may be directed from a VCS client to the VCS control plane component, and an internal version of the request may be directed from the VCS control plane component to a CPA at a selected virtualization host. In at least one embodiment, a resource requirement of a micro virtual machine to be launched (which, as indicated above, may meet a threshold criterion for designation of the requested virtual machine as a micro VM) may be indicated in the version of the request received by the CPA.

In response to receiving the request, a launch workflow may be initiated by the CPA in various embodiments. As part of the workflow, a copy of a machine image to be used may be generated or obtained, and one or more configuration operations may be initiated by the CPA in some embodiments. Depending on the type of compute instance or micro VM requested, the virtualization control mode being used, and/or the identity of the requesting client, the set of configuration operations required may vary. In one embodiment, for example, a configuration operation to enable connectivity, using a particular virtualization offloading card, for administrative network traffic (e.g., traffic with the control plane of some service other than the VCS itself) associated with a micro VM may be initiated in one or more VCMs. In another embodiment, in addition to or instead of enabling connectivity for administrative traffic, a configuration operation to enable connectivity for non-administrative network traffic (e.g., traffic with compute instances or data-plane resources belonging to the same client on whose behalf a micro VM is being launched) may be initiated by the CPA in at least one VCM (such as DPM or DMM). Configuration operations to configure storage devices for use by the micro VM or compute instance may be initiated in some embodiments by the CPA.

After the CPA has performed its set of configuration operations to prepare the virtualization host for the new CI (compute instance), in at least some embodiments, the CPA may issue a command, via a programmatic interface of a local virtualization intermediary process (VIP), to launch the CI. In at least some embodiments, the CPA may launch the VIP process, and the VIP process may create a new child thread implementing the CI. The command issued by the CPA to the VIP may, in some embodiments, indicate various properties of the CI and/or results of the preliminary configuration operations initiated by the CPA—e.g., the command may indicate resource requirements of the CI, the particular machine image to be used, and/or various configured objects (e.g., software network interface device objects) that the CI is to use. In some embodiments, after the CI is launched, it may perform various client-specified application tasks, communicating with other entities as needed using the virtualization offloading card(s) of the virtualization host.

In some embodiments, the VCS may implement one or more types of virtual network interfaces (VNIs), enabling some networking-related attributes such as IP (Internet Protocol) addresses to be transferred relatively easily between compute instances (e.g., including micro VMs) without necessarily reconfiguring physical network cards. Such attribute transfers may be accomplished, for example, by detaching a virtual network interface programmatically from one compute instance or operating system instance and attaching it programmatically to another CI or operating system instance. In some embodiments, VNIs may be set up in a multiplexed configuration, with some number of child (or "branch") VNIs being programmatically associated with a parent (or "trunk") VNI, such that the use of some software objects or resources may be shared among the child VNIs. For example, only a single PCI device object may be created and associated with the parent VNI at an operating system installed on the virtualization host in some embodiments, and the child VNIs may not require their own PCI devices. Such multiplexed VNI configurations may be especially beneficial for virtualization hosts at which numerous micro VMs are instantiated, as the total number of PCI device objects that can be created may be limited. According to some embodiments, a parent multiplexed VNI may be configured at the virtualization host (e.g., by the VCS control plane or by the CPA) prior to launching at least some micro VMs at the host. In such an embodiments, one of the configuration operations performed by the CPA when it receives a request to launch a micro VM may include programmatically attaching a child VNI (for use by the micro VM) to the parent VNI.

In some embodiments, multiple child VNIs of a parent VNI may be used for respective types of network traffic of a micro VM or other CI. For example, in some embodiments a micro VM may be set up on behalf of an intermediary network-accessible service other than the VCS itself, such as a software container service (SCS). An SCS may use a micro VM for one or more software containers established on behalf of a client of the SCS. In such embodiments, the control plane of the intermediary service may have to communicate with the micro VM (e.g., with an SCS agent thread or process which is launched within the micro VM), and a special communication channel may be set up for such control plane or administrative traffic. In one such embodiment, a single child VNI at the virtualization host may be used, in conjunction with a Port Address Translation (PAT) algorithm, to support such administrative traffic for a number of micro VMs that are to communicate with the intermediary service's control plane. As discussed below in further detail, in some embodiments, a common networking namespace may be established for PAT with respect to such administrative traffic. As part of the configuration operations performed before a particular micro VM is launched, the CPA may configure a link level simulation device (also referred to as a tap device) associated with a bridge in the common PAT namespace for the micro VM. The bridge may be programmatically connected to the child VNI being shared for the administrative traffic of several micro VMs in various embodiments, and a DHCP (Dynamic Host Configuration Protocol) server process instantiated at the virtualization host may assign respective distinct network addresses to each of the micro VMs for their administrative traffic.

According to one embodiment, the VCS may establish isolated virtual networks (IVNs) on behalf of various clients and/or other network-accessible services such as the SCS mentioned above. An IVN may comprise a collection of computing and/or other resources in a logically isolated section of a provider network or cloud environment, and may in some cases be established at the request of a particular customer or client of the VCS of the provider network. The customer may be granted substantial control with respect to networking configuration for the devices included in an IVN set up on the customer's behalf in some embodiments. In one embodiment, for example, a customer may select the IP (Internet Protocol) address ranges to be used for VNIs to be attached to various ones of the customer's compute instances (including for example micro VMs) in the IVN, manage the creation of subnets within the IVN, and/or the configuration of at least some types of routing metadata (e.g., including one or more route tables associated with respective subnets) for the IVN. In some embodiments, resources that are to be used to perform the operations of one or more other services (e.g., services that help provide secure connectivity to resources at client-owned or client-managed data centers outside the provider network, software container management services, file storage services, or database services) implemented at the provider network may also be organized in one or more IVNs. According to some embodiments, a request to launch a micro VM (or another type of compute instance) may indicate one or more properties or settings of an IVN in which the requested micro VM is to be configured, such as the name/ID of the IVN itself, a subnet ID, one or more private or public IP addresses to be assigned to the micro VM within the range of IP addresses of the IVN, and the like. Based at least in part on one or more settings indicated in the request, the CPA may in some embodiments determine at least some networking properties of a micro VM, such as one or more network addresses, thereby enabling data-plane (non-administrative) network traffic to flow between the micro VM and various other resources (such as other micro VMs, or other compute instances) within the IVN. In some embodiments, a respective child VNI may be designated for such IVN data plane traffic per micro VM—that is, if a particular virtualization host comprises K micro VMs, K child VNIs may be configured for their data plane traffic. In other embodiments, a single child VNI may be assigned for data plane traffic of several different micro VMs, enabling even higher levels of scalability.

According to some embodiments, the CPA may configure local communication channels of the kind indicated earlier for messages between individual micro VMs launched at the host, which do not require the use of the virtualization offloading cards and/or networking resources external to the host itself. For example, for some applications, multiple collaborating micro VMs arranged in a logical pipeline or cluster configuration may be set up at a given virtualization host, and at least some of the messages exchanged among such micro VMs may be transmitted via message buffers or queues set up in the memory of the virtualization host. In at least some embodiments, the virtualization intermediary process whose thread is used for a micro VM may be swappable—e.g., in response to detecting that the amount of memory available at the virtualization host is below a threshold, at least a portion of the memory being used for the micro VM may be swapped or written to persistent storage.

A number of different options may be supported with regard to the types of persistent storage that can be used by micro VMs or other types of compute instances in different embodiments. For example, a virtualization host's locally attached rotating disks and/or solid state drives, network-attachable block device volumes managed by the VCS, network-attachable block device volumes managed by a service other than the VCS, object storage devices enabling access to storage via a web services interface, and/or a combination of such device types may be used in various embodiments. The different options may offer different combinations of performance, availability, fault-tolerance/resilience, and security in various embodiments, and the appropriate combinations may be selected for a given compute instance based on the client's preferences and/or on the VCS's default settings for compute instance storage. In some embodiments, storage may be shared among compute instances—e.g., a tiered storage system may be implemented at the virtualization host, with some storage sections or objects being shared among all the compute instances, other sections being shared among sub-groups of compute instances, and others sections being designated for exclusive use by individual compute instances. In at least some embodiments, in order to help speed up launch times, portions of several different boot images corresponding to several categories of compute instances may be cached at the virtualization host, with the CPA being responsible for retrieving the uncached portion (if any) needed to construct the full image to be used to launch a requested compute instance.

In some embodiments, as indicated earlier, one or more categories of compute instances supported by the VCS may not necessarily comprise full-fledged virtual machines as such. For example, in one embodiment, a "bare-metal" compute instance supported by the VCS may comprise various processes of an operating system that directly control at least a portion of the hardware of the host being used, without utilizing virtualization (although a small subset of the hardware functionality may be virtualized in some cases). In such an embodiment, a hypervisor or a special operating system dedicated to virtualization management may not be required. In other embodiments, at least some bare-metal compute instances may comprise a full-fledged virtual machine, with most or all hardware functionality being virtualized. Bare-metal compute instances may be instantiated at virtualization hosts in some embodiments, and then micro VMs may be launched within the bare-metal instances.

In some embodiments, the VCS control plane may comprise several layers. One layer of the VCS control plane may comprise a plurality of autonomous cells in various embodiments, with each cell responsible for administering a respective set of virtual machines without interacting with any other cell (at least during normal operation). Such a control plane layer may be referred to as a "cell-based" layer in various embodiments. As discussed below in further detail, in some embodiments a given cell may comprise a collection of interacting components including one or more request processing nodes, one or more reconciliation or anti-entropy nodes, a log-based persistent data store for storing state information, and metadata indicating a group of virtualization hosts used for the virtual machines managed using the cell. In one such embodiment, the cell-based layer may be used primarily for administering relatively small (in terms of resource requirements) and/or flexible compute instances such as micro VMs. In other embodiments, the cell-based control plane layer may be used for additional types of compute instances, including at least some larger standardized compute instance categories supported by the VCS. In one embodiment, a cell-based control plane may be used for all compute instances of the VCS. In some embodiments, the virtualization hosts being managed may be considered elements of the cell.

In at least one embodiment, a VCS control plane may comprise a layer which is intended primarily for administering pre-defined or standardized compute instances, e.g., in addition to a cell-based layer used primarily for flexible compute instances. In some embodiments, the administrative responsibilities of a multi-layer VCS control plane may be divided based primarily on compute instance performance capabilities rather than flexibility. For example, in one such embodiment, compute instances whose performance needs (e.g., with respect to some combination of processing, memory, storage, or networking) are less than a threshold may be managed by a cell-based layer of the control plane, regardless of whether the compute instances belong to pre-defined standardized categories or not, while other compute instances may be managed using a different layer which does not comprise cells. In various embodiments, a VCS may also include other layers, such as a request routing layer (comprising one or more request routers responsible for receiving client requests for administering compute instances, and directing them to the appropriate cell or other control plane component), a control plane management layer (which may for example include a cell pool manager responsible for configuring the cells, and/or other components for administering the control plane itself), and so on.

Example System Environment

FIG. 1 illustrates an example system environment in which a virtualized computing service that supports virtual machines with short launch times and customizable levels of user control regarding various types of administrative tasks may be implemented, according to at least some embodiments. As shown, system 100 may comprise resources and artifacts of a virtualized computing service (VCS) 102 in the depicted embodiment, which may be broadly divided into a control-plane 105 and a data plane 150. The data plane 150 may include a plurality of virtualization hosts 155, such as 155A and 155B. A given virtualization host such as 155A may comprise a stripped-down or minimized version of an operating system 165 (within which various processes used to implement micro virtual machines and/or other types compute instances may be instantiated), one or more off-loaded virtualization manager components 176 and/or a set of storage devices 155 in the depicted embodiment.

The control plane 105 may comprise at least a flexible-capacity compute instance (CI) management layer 112 in various embodiments, which may perform administration operations for one or more categories of compute instance including micro VMs. In some embodiments, the control plane may comprise one or more additional layers not shown in FIG. 1, such as a layer dedicated to managing pre-defined standardized compute instance families that are not classifiable as micro virtual machines. The flexible-capacity CI management layer 112 may comprise a pool 114 of autonomous control plane cells in the depicted embodiment, such as cells 116A and 116B, as well as one or more cell pool manager(s) 118 responsible for establishing the pool, adding new cells and/or decommissioning cells in various embodiments. In at least some embodiments, the control plane 105 may also include a set of metadata 197 pertaining to a plurality of virtualization control modes (VCMs) that may be supported—e.g., metadata defining the features of the various VCMs, the specific VCM being used at a particular set of virtualization hosts, and so on. Individual VCMs may differ from one another along any of several dimensions in various embodiments, such as the tenancy of the virtualization hosts (single-tenant versus multi-tenant), the extent to which clients can make decisions regarding the selection of virtualization hosts to be used for various compute instances, the types of preparatory configuration operations that can be completed prior to the launches of compute instances so as to help make the eventual response to launch requests faster, and so on. In at least one embodiment, the VCS 102 may also include a set of resources 122 that can be used to optimize machine images used for the compute instances, e.g., by eliminating unused modules/packages at various layers of the software stack including the kernel layer, system libraries and so on, thereby reducing image sizes and speeding up launches even further.

The VCS 102 may implement a set of programmatic interfaces 177, such as a set of APIs, a web-based console, command-line tools and the like which can be used by VCS clients to submit programmatic requests in the depicted embodiment. For example, in one embodiments, programmatic requests such as "provisionVirtualizationHosts" (to identify a set of candidate virtualization hosts to be dedicated to compute instances of a client), "prepareForLaunches" (to perform preparatory configuration operations at some set of candidate hosts prior to the submission of actual launch requests for micro VMs or other compute instances), "launchComputeInstances" (to launch requested groups of one or more compute instances), and so on may be submitted via interfaces 177 by VCS clients 180. Note that VCS clients may include components of other network-accessible services in some embodiments—e.g., a network-accessible service which sets up software containers may use the interfaces 177 to set up micro VMs within which containers may be established. Such other services which use CIs provided by the VCS to serve their own customers may be referred to in various embodiments as intermediary services. Individual users associated with customer accounts of the VCS may also or instead use programmatic interfaces 177 in various embodiments to establish and interact with micro VMs and/or other types of compute instances.

In at least some embodiments, one or more computing devices of the VCS 102 may obtain an indication, e.g., via one or more programmatic interfaces 177, of (a) a machine image to be used to instantiate one or more micro virtual machines, (b) an isolated virtual network to which connectivity from the one or more micro virtual machines is to be established, and (c) a virtualization control mode associated with the one or more micro virtual machines. The compute instances to be established/instantiated may be designated as micro virtual machines because they meet one or more resource capacity criteria in the depicted embodiment—e.g., if the requested requirements of an individual compute instance with respect to virtual or physical CPUs, memory etc. lies below a threshold, that CI may be designated a micro virtual machine.

A number of operations may be performed at the VCS 102 based at least in part on the VCM that is to be used for the micro VMs in various embodiments. For example, a set of preliminary configuration operations to be performed prior to receiving a launch request for the micro VMs, to help speed up or accelerate the actual launch subsequent to the request, may be identified based at least partly on the VCM. Such preparatory configuration operations may include, among others, (a) a transfer of the virtual machine image to a storage device (such as a device 175) accessible from a particular virtualization host 155 (such as VH 155A) and (b) an initialization of one or more virtual network interfaces at the virtualization host in some embodiments. The virtualization host 155 may comprise an offloaded virtualization manager component 176 in at least some embodiments, such as a virtualization management offloading card configured to process network traffic between at least a first network address assigned to a first virtual network interface of the VH and one or more endpoints external to the VH.

A launch request for one or more micro VMs may be obtained at the VCS 102 in various embodiments, e.g., at a particular control plane cell 116 via the programmatic interfaces 177 after at least some preparatory configuration operations for the launch have already been initiated or completed. In response to a launch request, the VCS control plane may cause at least one micro virtual machine to be instantiated, using the machine image indicated earlier, at the particular virtualization host 155 in the depicted embodiment. Such a micro VM may be implemented using at least one thread (e.g., a micro-VM thread 169-1) of a virtualization intermediary process (e.g., VIP 168-1) launched by an administrative or control plane agent 167 of the VCS at the virtualization host 155 in some embodiments. The micro virtual machine may be configured to communicate with one or more endpoints within the isolated virtual network indicated earlier using the virtualization management offloading card and at least one virtual network interface in various embodiments; as such, the micro VM may be configured as a part of the isolated virtual network. In one embodiment, at least some micro VMs may be terminated automatically by the VCS after they reach a threshold lifetime duration (e.g., T hours of execution time), e.g., by terminating the corresponding VIP 168.

In at least some embodiments, one or more additional micro VMs (e.g., comprising mVM thread 169-10000 of another VIP 168-10000), may also be instantiated at the particular virtualization host, e.g., in response to subsequent launch requests. Depending on the VCM being used, an indication that the particular virtualization host such as 155A is to be used for the additional micro virtual machine may be obtained from the client on whose behalf the additional micro-VM is being set up in at least some embodiments—e.g., the client may control the placement of a requested VCM in some modes of virtualization control. Furthermore, in the depicted embodiment, the client may make resource oversubscription decisions in accordance with some VCMs—e.g., instantiation of the additional micro VM at the host selected by the client may result in an oversubscription, permitted in the VCM being used, of at least a first type of resource of the first virtualization host (such as virtual or physical CPUs, memory, network bandwidth, storage, etc.).

In some embodiments, the VCS 102 may support launch requests for a group of collaborating or cooperating compute instances, e.g., a plurality of micro VMs that are expected to work together on some application, while being at least partially isolated from one another for one or more reasons such as the separation of roles/responsibilities among different components of the application, different sources and security characteristics of the micro-VMs, and so on. Thus, in the depicted example scenario shown in FIG. 1, a co-operating compute instance group 199 may comprise at least two micro VMs, one implemented using mVM thread 169-1 of VIP 168-1 and a second implemented using mVM thread 169-2 of VIP 168-2. In at least some embodiments, fast local channels of communication may be established for such collaborating CIs, e.g., using on-memory buffers or queues of the VH 155, so that the CIs do not have to utilize networking devices to interact with one another.

In one or more of the VCMs supported in the depicted embodiment, such as a Dedicated Power-user Mode (DPM), respective identifiers of one or more candidate virtualization hosts such as VH 155A may be provided programmatically to a client 180 of the VCS, and a given launch request from the client may comprise an identifier of one such host (as such, placement decisions mapping CIs to VHs may be made by the client in such VCMs). In other VCMs, such as a Shared Managed Mode (SMM), identifiers of candidate virtualization hosts may not be provided to a client. In some VCMs (such as DPM and a Dedicated Managed Mode (DMM)) individual ones of the VHs 155 may be dedicated exclusively for CIs requested of a particular client or customer; in other modes such as SMM, an individual VH may at least potentially be used for CIs requested by several different clients.

In some embodiments, a request to launch or instantiate a CI such as a micro VM may be processed initially by a request handler layer (not shown in FIG. 1) of the control plane 105, and transmitted to a particular cell 116 such as cell 116B. The particular cell may be selected based on a variety of considerations, such as load balancing considerations, locality considerations and the like. The cell 116 may itself comprise a plurality of components as described below in further detail, including for example request processing nodes, reconciliation nodes, and a high performance data store instance. One of the components of the cell 116B may transmit an internal version of the request to launch the CI to a control plane agent (CPA) process running within an operating system 165 of a selected virtualization host 155 in the depicted embodiment. In some embodiments, a request may be directed to a CPA 167 only if the resource requirements of the requested VM are small enough for it to be characterized as a micro VM; if the resource requirements exceed a threshold, a different type of virtualization host (not shown in FIG. 1) dedicated to supporting larger VMs may be selected. In at least one embodiment, the cell component may start up a control plane agent process if one is not yet up and running at the selected virtualization host. The CPA 167 may implement an internal set of application programming interfaces, referred to as a CPA API 178, in the depicted embodiment, which may be used for communication with the VCS control plane. In effect, the CPA API 178 may represent a contract governing the types of operations that are to be implemented at a VH 155 at the request of the VCS control plane, regardless of the specific implementation details of the CPA or other components of the VH 155.

Based at least in part on the request received from the control plane cell 116, the CPA 167 may identify various characteristics of a desired micro VM, including for example its targeted resource usage mix, networking connectivity requirements and the like in the depicted embodiment. In some embodiments, a number of different boot images for micro VMs may be available at the VCS, and the CPA may create or obtain a local boot image to be used for the requested micro VM. The CPA 167 may also be responsible for performing at least some of the preliminary networking configuration indicated above, such as the establishment of one or more virtual network interfaces (VNIs) in various embodiments. Additional details regarding the configuration of different types of VNIs in various embodiments, such as use of a combination of trunk and child VNIs, for micro VM-related network traffic, are provided below. The CPA 167 may also perform storage setup operations for the micro VM to be launched in some embodiments, e.g., by creating, configuring and/or verifying storage objects that will be used by the micro VM.

After the CPA 167 has initiated, and/or verified the successful completion of, one or more configuration operations for a requested micro VM, in some embodiments the CPA 167 may launch a swappable virtualization intermediary process (VIP) such as VIP 168-1. Initially, in the depicted embodiment, the VIP process 168-1 may comprise an API handler thread, which is configured to receive API requests or commands issued by the CPA 167. The CPA 167 may then issue a command to actually launch the micro VM, and a new child thread 169-1 of the VIP 168-1 may be launched to implement the requested micro VM. The command that results in the launching of the micro VM thread 169-1 may include parameters indicating for example the bootable machine image to be used, the resource requirements for the micro VM, the results of the configuration operations performed by the CPA specifically for the micro VM, and so on. The command to instantiate a micro VM may be submitted via a second internal API of the VCS, referred to as the VIP API 179 in the depicted embodiment. Just as the CPA API represented a contract between the VCS control plane and the CPA, in various embodiments, the VIP API may represent another contract indicating the types of requests that are to be processed by an entity that is responsible for launching and terminating micro VMs with a particular range of isolation and performance requirements, regardless of the specific implementation details or process/thread structure of the entity (e.g., the VIP).

As new requests for micro VMs are received at the CPA 167, the CPA workflow indicated above with respect to the launch of the micro VM thread 169-1 may be repeated in the depicted embodiment—e.g., micro VM specific configuration operations may be performed by the CPA prior to launching a VIP, and one of the threads of the VIP may be used for the requested micro VM. As suggested by the label VIP 168-10000, a large number (e.g., tens of thousands) of micro VMs may be created at a given host 155 in the depicted embodiment. Note that the actual number of micro VMs that can be instantiated to run concurrently at a host 155 may differ in different embodiments, depending for example on the overall resource mix available at the host, the version of the software/hardware stack installed, the resource oversubscription policy/policies in effect, the VCMs in used, and so on, and may be larger or smaller than the 10000 number shown in FIG. 1 by way of example. The use of swappable parent VIPs 168 may enable higher levels of memory oversubscription in the depicted embodiment at VH 155A than may otherwise have been feasible—e.g., the total requested memory usage of the set of micro VMs running at the VH 155A may exceed the amount of memory available.

When a request to terminate a micro VM is received at the VCS control plane, and/or when the lifetime limit of a micro VM is reached, a corresponding message may be transmitted via an API invocation to the CPA, and the VIP whose thread is used for the targeted micro VM may be terminated in the depicted embodiment. That is, in at least one embodiment, there may be a 1-to-1 relationship between the number of running micro VMs and the number of running VIPs. In other embodiments, a variation of the process architecture shown in FIG. 1 may be employed—e.g., a given VIP may spawn multiple micro VMs as respective threads, multiple CPAs may be set up at the VH, and so on. In some embodiments the VIP and/or a separate process used for a micro VM may not be swappable. In at least one embodiment, snapshots of micro VMs that have been launched may be generated and stored, and such snapshots may be employed to quickly launch cloned versions of the micro VMs (i.e., similarly-configured micro VMs may be configured quickly using the saved configuration settings etc. in the snapshots). As mentioned earlier, the control plane and data plane components depicted in FIG. 1 may be used to configure compute instances that may not necessarily be designated as micro VMs in at least some embodiments—e.g., compute instances with high resource requirements may also be implemented using such components in at least some embodiments.

Example Virtualization Control Modes

Figure 2:
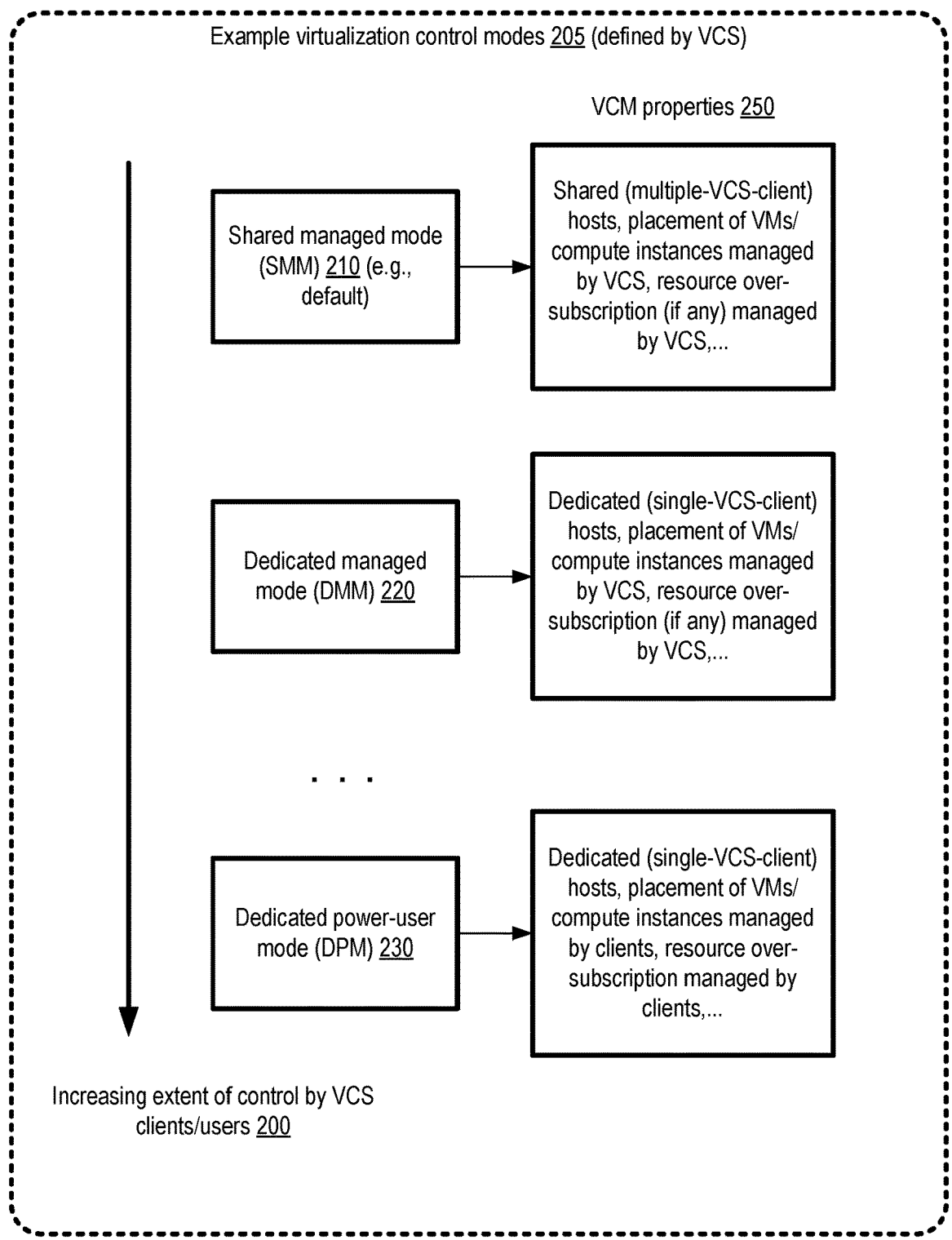
FIG. 2 illustrates examples of virtualization control modes that may be supported at a virtualized computing service, according to at least some embodiments.

FIG. 2 illustrates examples of virtualization control modes that may be supported at a virtualized computing service, according to at least some embodiments. In the depicted embodiment, at least a shared managed mode (SMM) 210, a dedicated managed mode (DMM) 220, and a dedicated power-user mode (DPM) 230 may be included in a set of example VCMs 205 defined by and supported at the VCS to enable the kinds of flexibility with respect to virtualization decisions and with respect to launch time speedup discussed above. As indicated by arrow 200, the different modes are arranged from top to bottom in FIG. 2 in order of increasing extent of administrative control offered to VCS clients/users. The greater the extent to which administrative decisions such as placement-related decisions are made by clients in advance of actual launch requests, the greater the ratio of preparatory configuration work that may be possible in advance in at least some embodiments; as such, as one moves from SMM to DMM to DPM, the extent to which launches can be sped up by the VCS may increase in such embodiments.

In some embodiments, one of the supported VCMs, such as SMM 210, may be designated as the default VCM—the mode to be used if a client does not programmatically indicate a particular VCM to be used for a particular set of compute instances (or for any of their compute instances). In some embodiments, other virtualization control modes may also or instead be supported at a virtualized computing service—e.g., a client may request the creation of a custom VCM in which the client controls one or more aspects of virtualization decisions. In such a scenario, if the new type of virtualization control mode requested by the client can be supported by the VCS, the VCS may store metadata defining the custom VCM, and enable one or more clients to use the custom VCM for their compute instances.

As indicated in the properties column 250 of FIG. 2, in the SMM 210, virtualized hosts may potentially be shared among CIs of several different clients in the depicted embodiment. The placement of individual CIs may be managed by the VCS control plane rather than by the client, and decisions regarding resource oversubscription (if such oversubscription is implemented) may be managed by the VCS control plane rather than by the client in the depicted embodiment. Oversubscription decisions may include, for example, determining whether to instantiate a new compute instance at a host even if doing so may exceed the nominal resource capacity of the host with respect to one or more types of resources.

In the dedicated managed mode (DMM) 220, in various embodiments individual virtualization hosts may be designated for compute instances set up on behalf of a particular VCS client (e.g., a client associated with a particular customer account of the VCS). In some embodiments, a group of collaborating clients or customers that indicate their cooperation programmatically to the VCS control plane may also use dedicated hosts in accordance with the DMM 220. The placement of CIs, as well as oversubscription (if any) may be managed by the VCS control plane in the DMM in the depicted embodiment.

In the dedicated power-user mode (DPM) 230, in various embodiments individual virtualization hosts may also be designated for compute instances set up on behalf of a particular VCS client. In some embodiments, as in the DMM, a group of collaborating clients or customers that indicate their cooperation programmatically to the VCS control plane may also use dedicated hosts in accordance with the DPM 230. The placement of CIs, as well as oversubscription (if any) may be managed by the client rather than by the VCS control plane in the DPM in the depicted embodiment. If either of the dedicated modes (DMM or DPM) is employed for a particular set of virtualization hosts on behalf of a client, metadata indicating that the hosts are to be used exclusively for requests from that client may be stored, e.g., at the VCS control plane in various embodiments. In some embodiments, metadata indicating that a set of virtualization hosts is to be used in shared or multi-tenant mode, e.g., for clients in whose behalf the SMM is to be used, may be stored at the VCS. As discussed below in further detail, in at least one embodiment a client may programmatically change the VCM to be used, e.g., for subsequent CIs to be set up at a specified host or group of hosts. In some embodiments, the VCM to be used may be specified at a per-compute-instance level, e.g., instead of for all the compute instances requested by a client during some time interval.

Example Placement Techniques

Figure 3:
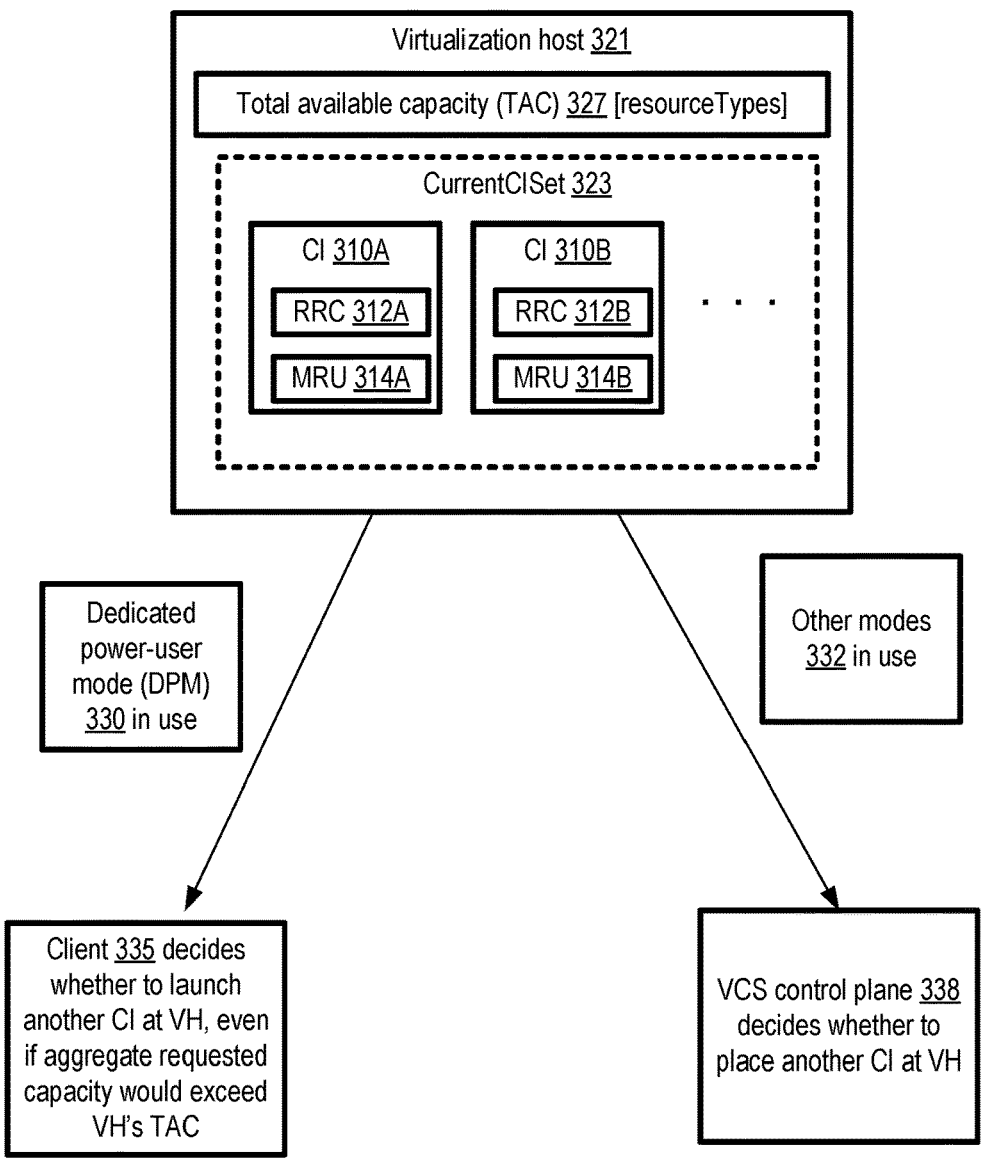
FIG. 3 illustrates examples of virtualization control mode-based placement decisions for compute instances, according to at least some embodiments.

FIG. 3 illustrates examples of virtualization control mode-based placement decisions for compute instances, according to at least some embodiments. In the depicted embodiment, a given compute instance (CI) 310, such as a micro virtual machine, may have a respected requested resource capacity (RRC) 312 with respect to one or more types of resources, such as virtual CPUs (vCPUs), memory, persistent storage, network bandwidth or messages/second, and so on. The RRC 312 for the CI 310 may have been indicated in a programmatic request to launch the CI in some embodiments. In other embodiments, a set of pre-defined CI categories may have been defined by the virtualization computing service being used for the CIs, with respective resource capacities being specified for individual ones of the CIs, such that a request to launch a CI of a particular category is in effect translated into a request for the pre-defined amount of resource capacity for that category.

After a CI is launched at the VCS, the actual usage of resources by the CI may be monitored, e.g., using any desired combination of tools at one or more layers of the hardware/software stack being used for the CI, such as the application layer, the operating system, various virtualization management layers, hardware monitors at the virtualization host, etc., and/or by tools external to the virtualization host, such as networking tools at one or more networking intermediary devices being used for the CI's traffic. Measured resource usage (MRU) metrics 314 with respect to various time intervals (as indicated by the "interval" in the MRU tuple shown in FIG. 3) may be available from such tools in at least some embodiments. In some embodiments, the VCS may attempt (e.g., using throttling techniques implemented by virtualization management components at the virtualization hosts being used) to ensure that the actual usage of a given resource such as vCPUs, memory and the like, by a CI does not exceed the requested resource capacity for that CI, at least over sustained time periods.

A given virtualization host 321 may have a total available capacity (TAC) 327 with respect to individual ones of the resource types requested and used by CIs in various embodiments. At a point in time when a decision to place a newly-requested CI at a host 321 is to be made, the set of currently-running CIs (CurrentCISet) 323 may include zero or more CIs 310 in the depicted embodiment, e.g., including CI 310A with RRC 312A and MRU 314A, CI 310B with RRC 312B and MRU 314B, and so on.

Depending on the virtualization control mode being used for the to-be-launched CI, the decision as to whether one or more of the resource types should be oversubscribed at the VH 321 may be made by the client on whose behalf the CI is to be instantiated, or by the VCS control plane in the depicted embodiment. If a dedicated power-user mode (DPM) of virtualization control (similar to the DPM discussed earlier) is being used, for example, the client 335 may programmatically obtain indications of the requested and actual resource usage (e.g., over some specified recent interval) of the CurrentCISet 323 at individual ones of one or more candidate virtualization hosts 321 in some embodiments. The client may then make the decision as to whether the new CI should be launched at a given host, even if doing so would result in an oversubscription scenario, in which the cumulative requested resource capacities of the CIs at the selected host 321 exceed the total available capacity 327 for one or more resource types. In some embodiments, the client may make an oversubscription decision based on expert knowledge of how the CIs of the CurrentCISet are likely to behave with respect to future resource usage, and/or based on a goal of co-locating the new CI with one or more of the currently-running CIs even if this may result in potentially negative side effects of oversubscription, such as slowing down one or more of the CIs.

In at least some other virtualization control modes 332 that may be supported at the VCS, the VCS control plane 338 may determine the particular VH at which a CI should be launched. In some embodiments, the VCS control plane 338 may also allow oversubscription with respect to one or more resource types at a given set of virtualization hosts, e.g., based on preferences indicated by the client and/or based on oversubscription policies of the VCS itself. In at least some embodiments, the VCS control plane may attempt to avoid or prevent oversubscription with respect to at least some resource types and at least some hosts.

Example Programmatic Interactions

Figure 4:
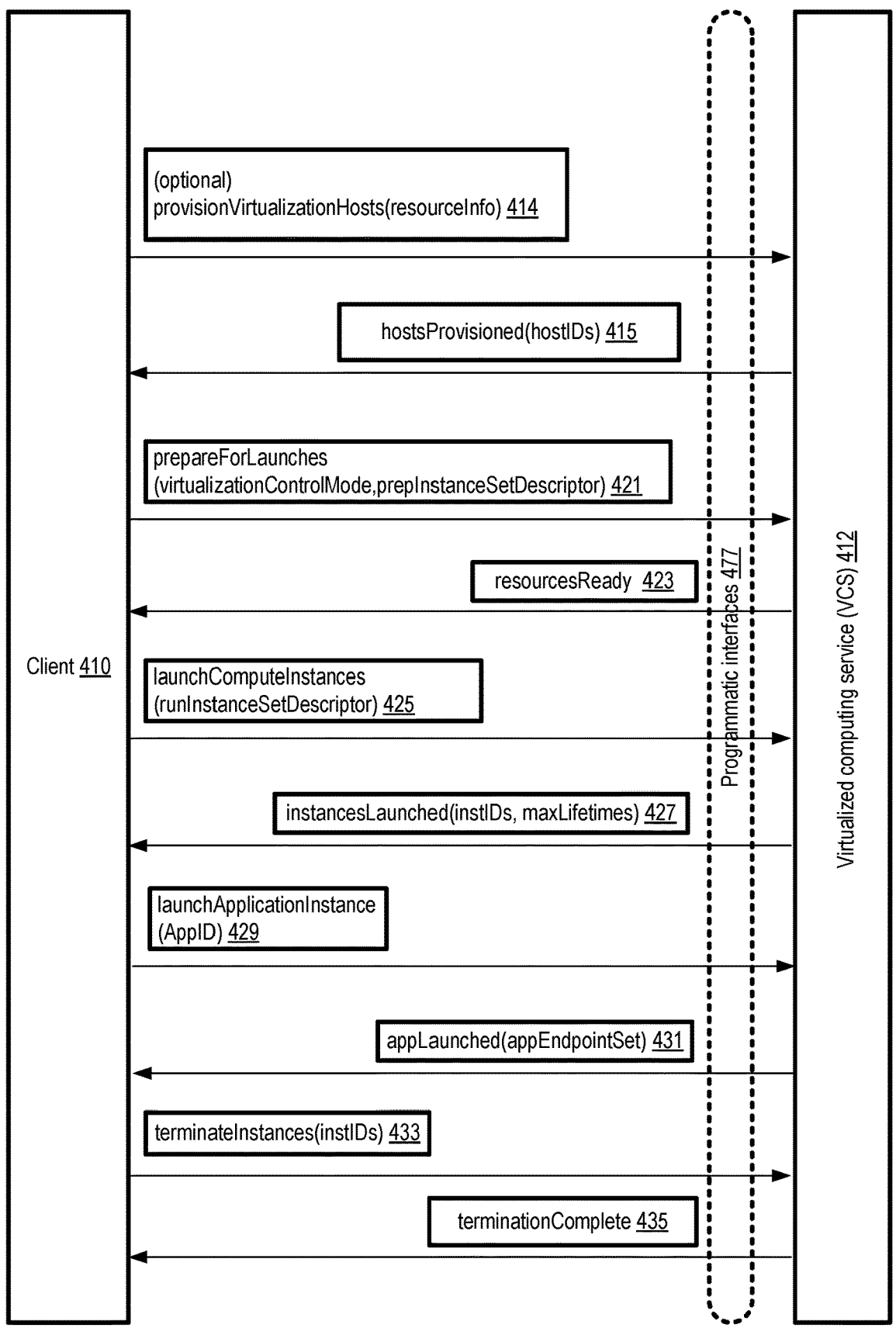
FIG. 4 and FIG. 5 collectively illustrate example programmatic interactions between clients and a virtualized computing service, according to at least some embodiments.
Figure 5:
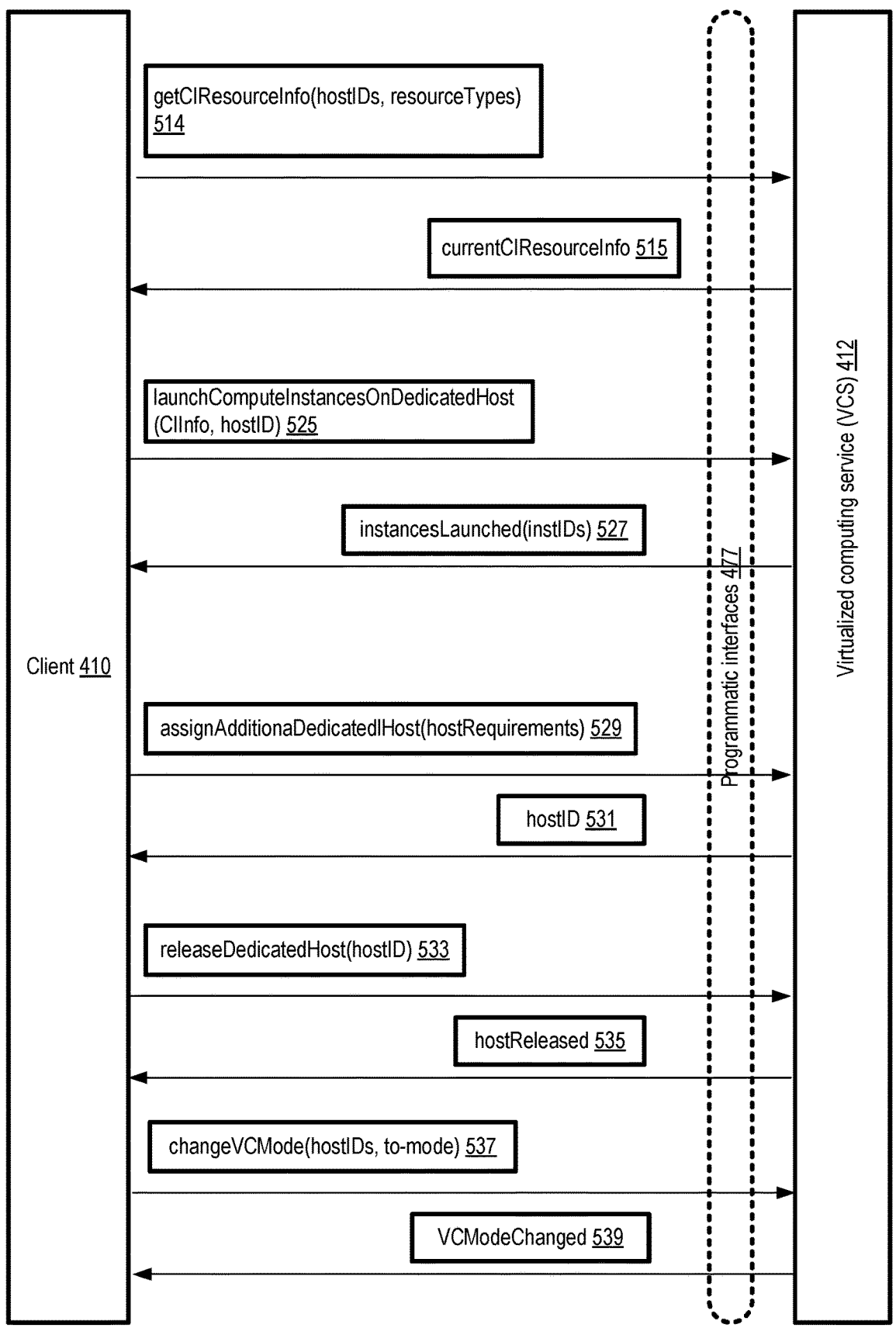

FIG. 4 and FIG. 5 collectively illustrate example programmatic interactions between clients and a virtualized computing service, according to at least some embodiments. The virtualized computing service (VCS) 412, which may have similar capabilities and features as the VCS 102 of FIG. 1, may implement a set of programmatic interfaces 477 in the depicted embodiment, such as APIs, web-based consoles, graphical user interfaces, command-line tools and the like. Using the programmatic interfaces 477, a client 410 may in some embodiments submit a programmatic request to provision a set of candidate virtualization hosts for compute instances that are to be launched later on behalf of the client. Such a provisionVirtualizationHosts request 414 may in at least some embodiments indicate one or more resource requirements (e.g., via a resourceInfo descriptor passed as a parameter) or a set of applications to be implemented using the hosts. Candidate hosts may be assigned to the client 410 in dedicated (single-tenant) mode in response to a provisionVirtualizationHosts request in some embodiments, and host identifiers (hostIDs) of the candidate hosts may be provided in a hostsProvisioned response 415. In some embodiments, only those clients that wish to utilize a particular subset of supported virtualization control modes (similar to the DPM or DMM modes discussed earlier), may submit optional requests 414 to provision, and obtain identifiers of, virtualization hosts. In the Shared Managed Mode (SMM), for example, as indicated earlier, the hosts used may not be dedicated for exclusive use of a given client, so providing host identifiers to clients may not be beneficial in various embodiments.

In at least one embodiment, a client 410 may submit a programmatic request 421 to initiate one or more types of preparatory configuration operations that may help speed up subsequent VCS responses to launch requests. Such a prepareForLaunches request 421 may, in at least some embodiments, include an optional virtualizationControlMode parameter specifying the VCM being used for the CIs. A descriptor prepInstanceSetDescriptor may be included as a parameter in some embodiments, indicating for example one or more types of CI resource requirements (e.g., for vCPUs, memory etc.), the machine image(s) to be used, the isolated virtual network(s) within which the CIs are to be configured, other types of connectivity requirement information (e.g., whether access to the public Internet is required from the CIs, or access via VPNs (virtual private networks) or dedicated physical links to external networks outside the VCS is required), and so on. In at least some embodiments, the specific set of virtualization hosts at which the preparatory configurations are to be performed may be identified in the prepareForLaunches request 421, e.g., using the hostIDs obtained earlier in response to a provisionVirtualizationHosts request. In response to the prepareForLaunches request, the VCS control plane may initiate a number of different types of configuration operations of the kind discussed earlier, based at least in part on the VCM being used, such as the pre-loading of a machine image to a storage cache accessible from a set of candidate hosts, setting up VCS control plane agents, virtual network interfaces and the like at the virtualization hosts. After the preparatory operations are completed, in some embodiments a resourcesReady message 423 may be sent to the client.

A client may submit requests to launch compute instances in one of several ways in the depicted embodiment. In one approach, a launchComputeInstances request 425 may be submitted, indicating (e.g., via a runInstanceSetDescriptor parameter) the number of CIs to be launched. In some embodiments, the specific virtualization hosts to be used for individual ones of the CIs may be indicated in the launch request. In response to a launchComputeInstances request 425, the VCS control plane may cause respective CIs to be launched at the virtualization hosts. An instancesLaunched message 427 may be transmitted to the client via the interfaces 477 in at least some embodiment. The instancesLaunched response may, at least in some embodiments, include identifiers (instIDs) of the instantiated CIs. In some embodiments, for at least some types of CIs such as micro VMs, a maximum lifetime limit may be imposed by the VCS 412, and an indication of the lifetimes (maxLifetimes) may be included in the instancesLaunched message, e.g., to remind the client that the instances may be terminated automatically after they reach the lifetime limit. In some embodiments, the runInstanceSetDescriptor (and/or the prepInstanceSetDescriptor of a prepareForLaunches request) may indicate the kinds of mechanisms to be used by a group of CIs for communication with one another. For example, in one embodiment, a client may indicate that a group of N collaborating CIs are to be set up at a given virtualization host and that a particular type of local communication channel (e.g., using shared memory buffers, virtual sockets, or the like) should be set up for the collaborating CIs. The requested channels may be established by the VCS, e.g., either as part of the preparation operations, or in response to the launch request in various embodiments.

In a second approach towards, instead of requesting specific CIs, a client 410 may request that an application be launched. Some business organizations that utilize the VCS to support their own customers may, for example, provide application descriptors to the VCS control plane, indicating the set of CIs that are to be launched to implement an instance of a particular application on behalf of such customers. In one example scenario, in some embodiments a business organization Org1 may provide (via a set of programmatic interactions not shown in FIG. 4) an indication to the VCS of a set of CIs {CI1, CI2, CI3, . . . , CI10} needed to implement a particular instance AppInst1 of an application App1, designed/developed by Org1, when such an instance is requested by a customer Oc1 of Org1. Communication/connectivity requirements for the CIs may also be indicated to the VCS in various embodiments—e.g., the kinds of local and/or over-the-network communication channels to be used by the CIs to communicate with one another to implement App1's functionality may be indicated. In such an example scenario, Org1 may be considered a first-level or direct client of the VCS, while OC1 may be considered a second-level or indirect client of the VCS (and a first-level client of Org1). Org1 may have initiated preparatory operations (e.g., using requests similar to provisionVirtualizationHosts, prepareForLaunches etc.) to support various instances of App1 in the example scenario. OC1, the client of Org1, may submit a launchApplicationInstance request 429 via programmatic interfaces 477 in some embodiments. The application request may indicate an application identifier (AppID), which may be translated internally at the VCS into the equivalent of one or more launchComputeInstances commands in at least some embodiments. In other embodiments, the client may submit a request for an application to Org1, and Org1 may submit the launchApplicationInstance request to the VCS 412. After the CIs of the application have been set up, and communication channels between the CIs (if needed) have been configured, in at least some embodiments the VCS may transmit an appLaunched response 431 to the requester of the application. In some embodiments, the application instance may have a set of one or more network endpoints (appEndpointSet), usable by clients to obtain results and/or status information from the application, and such endpoints may be indicated in the appLaunched response.

If and when a client 410 wishes to terminate a set of CIs, a terminateInstances request 433 may be submitted via the programmatic interfaces 477 in the depicted embodiment. In response, the VCS control plane may terminate the specified instances and transmit a terminationComplete message 435 to the client in at least some embodiments.

In some embodiments, e.g., depending on the VCM being used, a client may be able to obtain information about requested and/or actual resource usage at one or more virtualization hosts of the VCS. As shown in FIG. 5, a getCIResourceInfo request 514 may be submitted by a client 410 to the VCS 412 for such information, e.g., specifying the identifiers of the virtualization hosts (hostIDs) and the types of resources (resourceTypes) such as vCPUs, memory etc. for which information is desired. In response the VCS control plane may verify that the VCM in use permits such information to be provided in some embodiments. The VCS may then provide, for the specified virtualization hosts, information about the requested resource capacities and measurements of current resource usage (e.g., similar to the RRCs and MRUs for the currentCISet 323 discussed in the context of FIG. 3) to the client 410, e.g., in a currentCIResourceInfo message 515 in one embodiment. Based at least in part on the requested and/or current resource usage, the client 410 may make placement and/or oversubscription decisions as discussed earlier, and submit a launchComputeInstancesOnDedicatedHost request 525, indicating particular host(s) at which individual ones of one or more CIs are to be launched. Details of the requirements of the CIs may be indicated via a CIInfo parameter in some embodiments, while the identifiers of the hosts to be used may be provided in the hostIDs parameter. Note that the request to launch CIs on specific hosts may only be supported in specific virtualization control modes in at least some embodiments—e.g., only in DPM or DMM. After the requested CIs are instantiated, in at least some embodiments an instanceLaunched message 527 may be set to the client 410.

In some embodiments, clients 410 using VCMs in which dedicated virtualization hosts are used may submit requests to add more dedicated hosts to the set of candidate virtualization hosts set aside for the clients. An assignAdditionalDedicatedHosts request 529, specifying the requirements (hostRequirements) may be submitted for such hosts in some embodiments, and an identifier (hostID) 531 of the newly-dedicated host may be provided in response by the VCS. Similarly, using the equivalent of a releaseDedicatedHost message 533, a client 410 may request that a specified dedicated host be freed or released. The VCS may store metadata indicating that the host is no longer dedicated exclusively for the client 410, and transmit a hostReleased message 535 to the client in some embodiments.

In at least one embodiment, a client 410 may submit a request (changeVCMode) 537 to change the virtualization control mode being implemented at one or more virtualization hosts. The request may indicate the identifiers (hostIDs) of the targeted hosts and/or a VCM (to-mode) which is to be used for subsequent CIs set up at the hosts in the depicted embodiment. In response, the VCS control plane may store metadata indicating the VCM to be used for subsequent CIs, and transmit a VCModeChanged message 539 to the client 410 in some embodiments. It is noted that the VCS may support other types of programmatic interactions in some embodiments than those shown in FIG. 4 and/or FIG. 5.

Example Connectivity Needs for Compute Instances

Figure 6A:
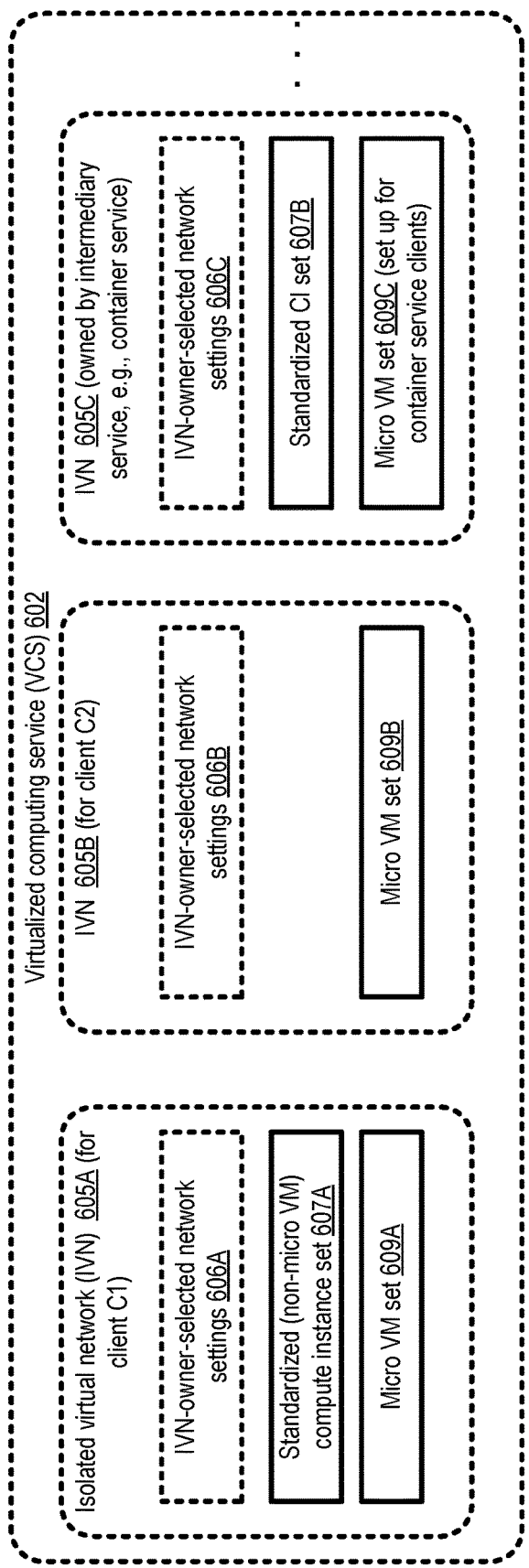
FIG. 6a illustrates example isolated virtual networks that may be established on behalf of clients of a virtualized computing service, according to at least some embodiments.

As mentioned earlier, in some embodiments compute instances and other resources of a VCS may be organized into logically distinct isolated virtual networks (IVNs), and the networking configuration requirements for a given compute instance such as a micro VM may depend on the configurations of the IVNs set up on behalf of the client (or intermediary service) that requested the micro VM. FIG. 6a illustrates example isolated virtual networks that may be established on behalf of clients of a virtualized computing service, according to at least some embodiments. An IVN may comprise a collection of computing and/or other resources in a logically isolated section of a provider network or cloud environment. The entity on whose behalf the IVN is created may be granted substantial control with respect to networking configuration for the devices included in the IVN in various embodiments. In some embodiments, for example, a customer may select the IP (Internet Protocol) address ranges to be used for VNIs to be attached to various ones of the customer's compute instances (including for example micro VMs) in the IVN, manage the creation of subnets within the IVN, and/or the configuration of at least some types of routing metadata (e.g., including one or more route tables associated with respective subnets) for the IVN. In some embodiments, resources that are to be used to perform the operations of one or more other services (e.g., services that help provide secure connectivity to resources at client-owned or client-managed data centers outside the provider network, software container services, file storage services, or database services) implemented at the provider network may also be organized in one or more IVNs.

In FIG. 6a, three IVNs 605A, 605B and 605C are shown by way of example. IVN 605A is established on behalf of a client C1 of the VCS, and has a set of owner-selected networking settings 606A applicable to (a) a set 607A of standardized (non-micro VM) compute instances and (b) a set 609A of micro VMs. IVN 605B, established on behalf of a client C2, includes a set of micro VMs 609B and associated settings 606B; IVN 605B does not include any standardized compute instances. IVN 605C may have been established on behalf of another network-accessible service (termed an intermediary service) in the depicted embodiment, such as a software container service. IVN 605C may include some number of standardized compute instances of set 607B, as well as a set of micro-VMs 609C set up for the containers of clients of the container service. For example, one or more software containers may be established within a given micro-VM of set 609C. Network settings 6306C for IVN 605C may be selected by the intermediary service in the depicted embodiment. Some IVNs (not shown in FIG. 6a) may not include any micro VMs in various embodiments.

Figure 6B:
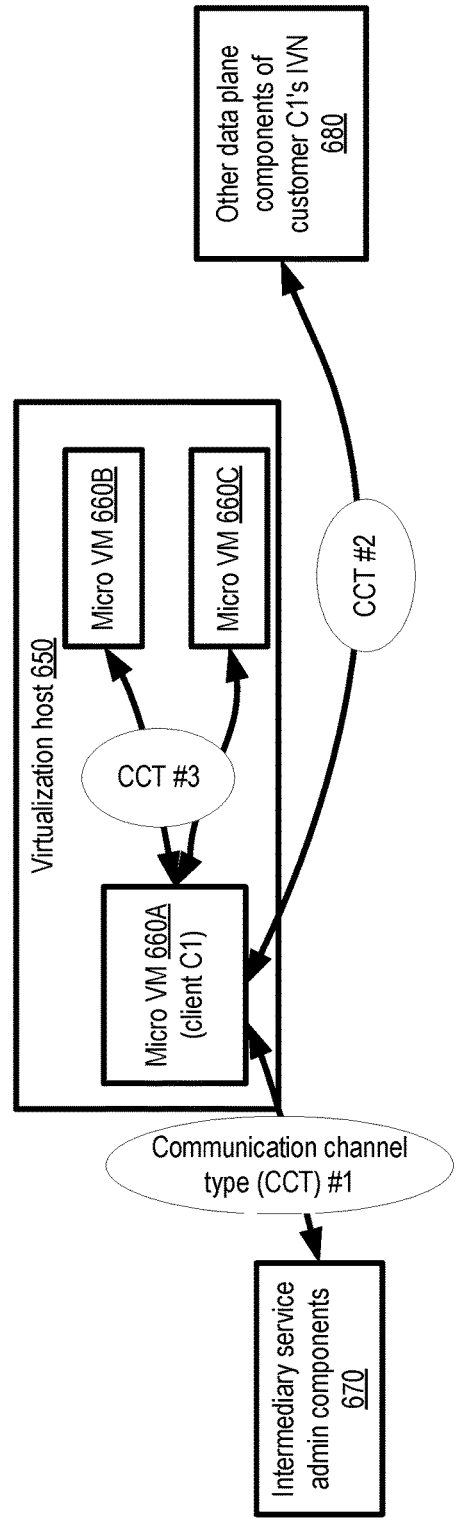
FIG. 6b illustrates three types of communication channels that may be set up for compute instances such as micro virtual machines, according to at least some embodiments.

FIG. 6b illustrates three types of communication channels that may be set up for compute instances such as micro virtual machines, according to at least some embodiments. In the depicted embodiment, micro VMs 660A, 660B and 660C have been established at a virtualization host 650 (similar in features and capabilities to virtualization hosts 155 of FIG. 1). At least micro VM 660A has been established on behalf of a particular customer or client C1, e.g., by an intermediary service such as a software container service or by C1. The micro VM 660A may run applications, one or more software containers, and/or an operating system that is to communicate with three types of entities, and may therefore need three types of networking configuration or channel setup in the depicted embodiment.

To exchange messages with administration or control plane components 670 of an intermediary service, a communication channel designated as type CCT #1 may be established for micro VM 660A in the depicted embodiment. For data-plane traffic exchanged with other entities (such as other micro VMs or compute instances instantiated at other hosts) 680 within one or more IVNs, a channel of type CCT #2 may be established in some embodiments. Finally, for intra-virtualization-host network traffic with other micro VMs such as 660B and 660C, a third type of channel designated as type CCT #3 may be used in at least some embodiments. As described below in further detail, multiplexed virtual network interfaces may be employed for CCT #1 and CCT #2 in at least some embodiments. Local communication channels, e.g., memory buffer or queue-based channels that do not require the use of networking resources (such as virtual network interfaces) may be used for the third type of channel (CCT #3) in at least some embodiments. Depending on the virtualization control mode being used, one or more types of communication channels of the kind shown in FIG. 6b may be at least partially set up in preliminary configuration operations in various embodiments, before the micro VMs that use the channels are launched.

Virtual Network Interfaces

Figure 7:
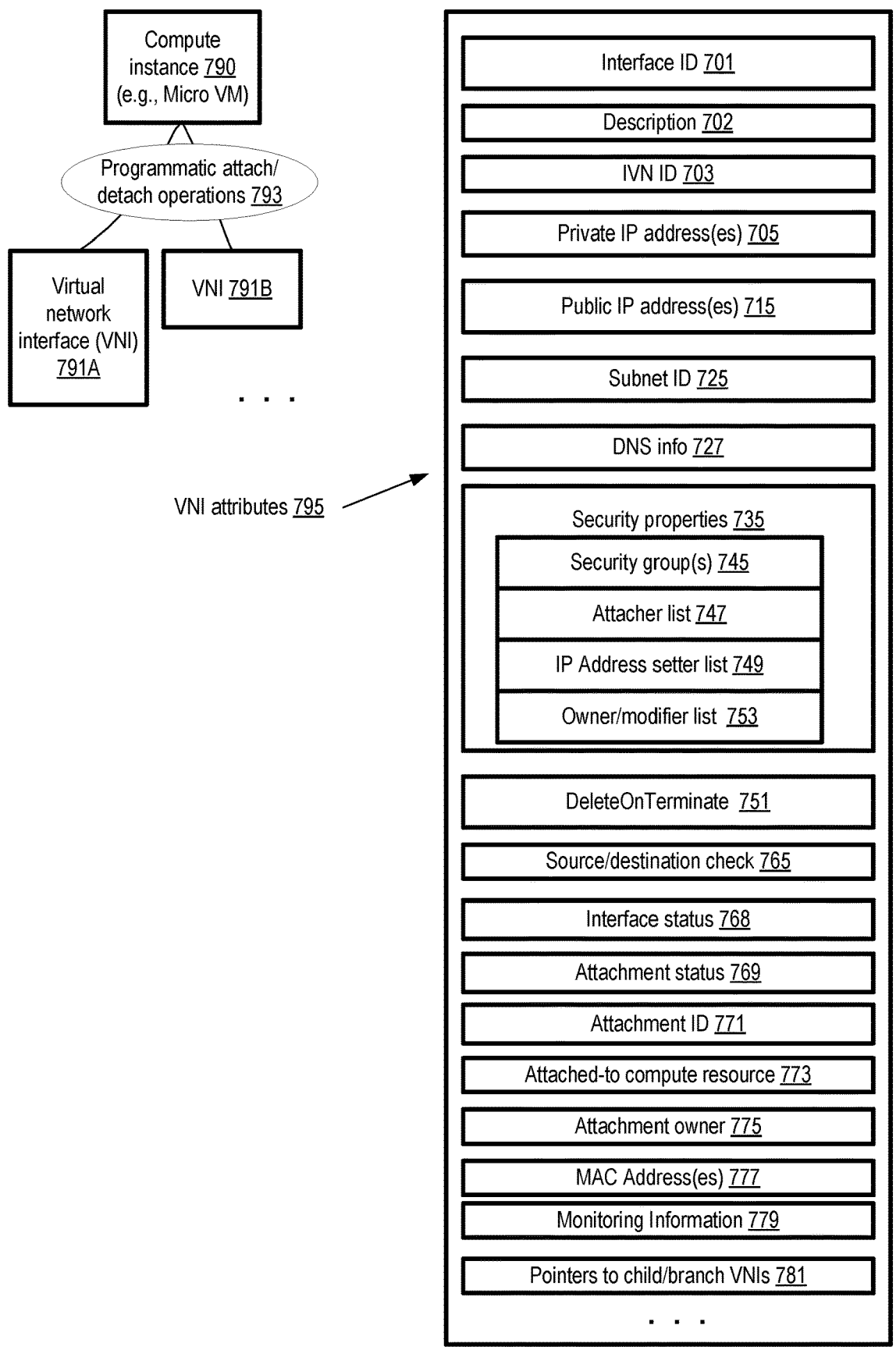
FIG. 7 illustrates examples of attributes of virtual network interfaces that may be configured for compute instances, according to at least some embodiments.

In various embodiments, virtual network interfaces (VNIs) (which may also be referred to as "elastic network interfaces") may be configured at a VCS, enabling some networking-related attributes such as IP (Internet Protocol) addresses to be transferred relatively easily between compute instances (including micro VMs) without necessarily reconfiguring physical network cards. Such attribute transfers may be accomplished, for example, by detaching a virtual network interface programmatically from one compute instance and attaching it programmatically to another compute instance. FIG. 7 illustrates examples of attributes of virtual network interfaces that may be configured for compute instances, according to at least some embodiments. As shown, one or more VNIs such as 791A or 791B may be attached to (or detached from) a given compute instance 790 (such as a micro VM) via programmatic operations 793, independently for example of the specific hardware network interface cards (NICs) of the host at which the virtual machine runs in the depicted embodiment.

A generalized list of example attributes 795 of any given VNI 791 is shown in FIG. 7, not all of which may necessarily be used for all VNIs in at least some embodiments. Only a subset of the attributes or properties shown in FIG. 7 may be implemented in some embodiments, and not all the implemented attribute fields may have to be populated (i.e., some of the attributes may be left blank or null). Respective records comprising fields/entries containing the attributes 795 of various VNIs may be stored in a persistent metadata store in some embodiments, e.g., a store that is accessible from various control-plane or administrative components of the provider network or the VCS.

When a new VNI is created, e.g., in response to a programmatic request from a client of a virtualized computing service which supports VNIs, a new interface identifier 701 may be generated for it in the depicted embodiment. In some implementations, a description field 702 may be filled in by the client that requested the creation of the VNI, e.g., "Interface 554 for client group CG-X of container service". As discussed earlier, a VCS within which the VNI is to be used may comprise a plurality of isolated virtual networks (IVNs) in some embodiments. The attributes 795 may contain an IVN identifier 703 (indicating an IVN within which the VNI is configured) in such embodiments.

Any of several types of network addressing-related fields may be included within the set of attributes of a VNI in different embodiments. One or more private IP addresses 705 may be specified in some embodiments, for example. Such private IP addresses, also referred to herein as non-public addresses, may be used internally for routing within a provider network, and may not be directly accessible from outside the provider network (or from within other IVNs) in various embodiments. In some embodiments, at least some non-public IP addresses associated with a VNI may not be IP addresses; that is, addressed formatted according to a proprietary protocol of the provider network may be used, or addresses formatted according to a different public-domain protocol may be used. In general, zero or more public IP addresses 715 may also be associated with VNIs in some embodiments; these IP addresses may be visible outside the provider network, e.g., to various routers of the public Internet or peer networks of the provider network. One or more subnet identifiers 725 (e.g., expressed in Classless Inter-Domain Routing or CIDR format) may be included within attributes 795 in some embodiments, such as identifiers of subnets set up by a client within an IVN in which the VNI is to be used. In one embodiment an identification of a Domain Name Server (DNS) responsible for propagating address(es) associated with the VNI, or other DNS-related information 427, may be included in the attributes 795 as well.

In some embodiments the attributes 795 may include security-related properties 735. Some provider networks may allow users to specify rules, including for example firewall-related rules, for the types of incoming and/or outgoing traffic allowed at compute instances to which a VNI may be attached. Such rules may be termed "security groups" and identified via security group(s) fields 745. Various port and protocol restrictions may be enforced using such rules in some embodiments, and multiple rules may be associated with each VNI. For example, a client may use security groups to ensure that only HTTP and HTTPs outgoing or incoming traffic is allowed, to limit the set of TCP or UDP ports to which traffic is permitted, to filter incoming and outgoing traffic according to various policies, and so on. In some implementations an attacher list 747 may be specified, indicating which users or entities are allowed to request attachments of the VNI. In some cases a separate detacher list may be used to specify which entities can detach the VNI, while in other cases a single list such as attacher list 747 may be used to identify authorized attachers and detachers. The collection of users or entities that are allowed to set or modify IP addresses (e.g., public IP addresses 715 and/or private IP addresses 705) of the VNI may be provided in IP address setter list 749, and the set of users or entities that own (or can modify various other fields of) the VNI may be specified in owner/modifier field 753 in some embodiments. For example, an owner/modifier identified in field 753 may be permitted to change the attacher list 747 or the IP address setter list in some implementations, thus changing the set of entities permitted to attach or detach the VNI or modify its IP address(es). While the term "list" has been used for fields 747, 749, and 753, logical data structures other than lists (such as arrays, hash tables, sets and the like) may be used to represent the groups of entities given various security privileges, roles and/or capabilities in various embodiments.

In some embodiments, users of the virtualized computing service of a provider network may be allowed to terminate compute instances (CIs), including micro VMs, programmatically. For example, a client may set up CIs, attach VNIs to the CIs, run a desired set of computations on the CIs, and then issue a request to terminate the instances when the desired computations are complete. In such embodiments, a "DeleteOnTerminate" setting 751 may be used to specify what happens to attached VNIs when a CI is terminated. The DeleteOnTerminate setting may be used in a similar manner in some embodiments in which CIs are terminated based on reaching a maximum lifetime threshold. If DeleteOnTerminate is set to "true" for a VNI attached to the CI being terminated, the VNI may be deleted (e.g., a persistent record comprising attributes 795 for the VNI may be removed from the repository in which it was being stored). If DeleteOnTerminate is set to "false", the VNI may be retained, so that for example it may be attached again to some other CI or other computing platforms. In one embodiment, when a VNI is attached to a CI, an attachment record separate from the VNI attributes 795 may be created to represent that relationship, and the DeleteOnTerminate property may be associated with the attachment record instead of or in addition to being associated with the VNI itself. In such an embodiment, the VNI's attributes 795 may include a reference or pointer to the attachment record or records for each of the attachments in which the VNI is currently involved, and different values of "DeleteOnTerminate" may be set for each attachment record.

In one embodiment, the attributes 795 may contain routing-related information such as an indication 765 of whether a source and/or destination check is to be performed for network packets transmitted to a compute instance to which the VNI is attached. If the source/destination check setting is set to "false" or "off", routing decisions may be made based on a packet's source and destination IP addresses, e.g., the packet may be forwarded from one subnet to another; and if the setting is "true" or "on", the computing platform may not perform routing in some embodiments. Thus the source/destination field 765 may be used in some embodiments to control whether a CI to which the VNI is attached performs routing or gateway functions on packets for which it is not the final destination, or whether it ignores such packets. Other types of routing-related information, such as route table entries, may also or instead be included in attributes 795 in other embodiments. Billing-related information may be included in attributes 4795 in some implementations, identifying for example the entity or user to be billed for network traffic associated with the VNI.

The interface status field 768 may be used to indicate a current state of the VNI—e.g., whether the VNI is "available", "disabled", or "in-repair". Similarly, the attachment status field 769 may be used to indicate whether the VNI is currently attached, detached or in the process of being attached or detached in some embodiments. In one implementation, as described above, a record of an attachment may be created at the time the corresponding attachment operation is performed, and an identifier or identifiers of the current attachments of the VNI may be stored in attachment id field 771. Identifiers of the CIs to which the VNI is currently attached may be stored in attached-to instance field 773, and the user or entity that requested the attachment may be identified via attachment owner field 775 in some embodiments. In one embodiment, a list of identifiers of the physical network interface card (NIC) or NICs currently usable for traffic directed to/from the IP addresses of the VNI may be maintained, e.g., in the form of a MAC address(es) field 777. In some implementations, monitoring information 779, such as statistics about the amount of traffic flowing to or from the IP addresses of the VNI, may also be retained among attributes 795. In at least one embodiment in which VNI multiplexing or parent-child hierarchies are supported, pointers 781 to child or branch VNIs of the VNI may be included. Other fields not shown in FIG. 7 may be included in various embodiments.

In one embodiment, some of the fields shown in FIG. 7 may be replaced by references or pointers to other objects. For example, security information for a VNI may be stored in a separate security object, and the attributes 795 may include a reference to the security object. Similarly, each attachment of a computing platform to a VNI may be represented by an attachment object, and the attributes 795 may include pointers to the appropriate attachment objects in some implementations.

Figure 8:
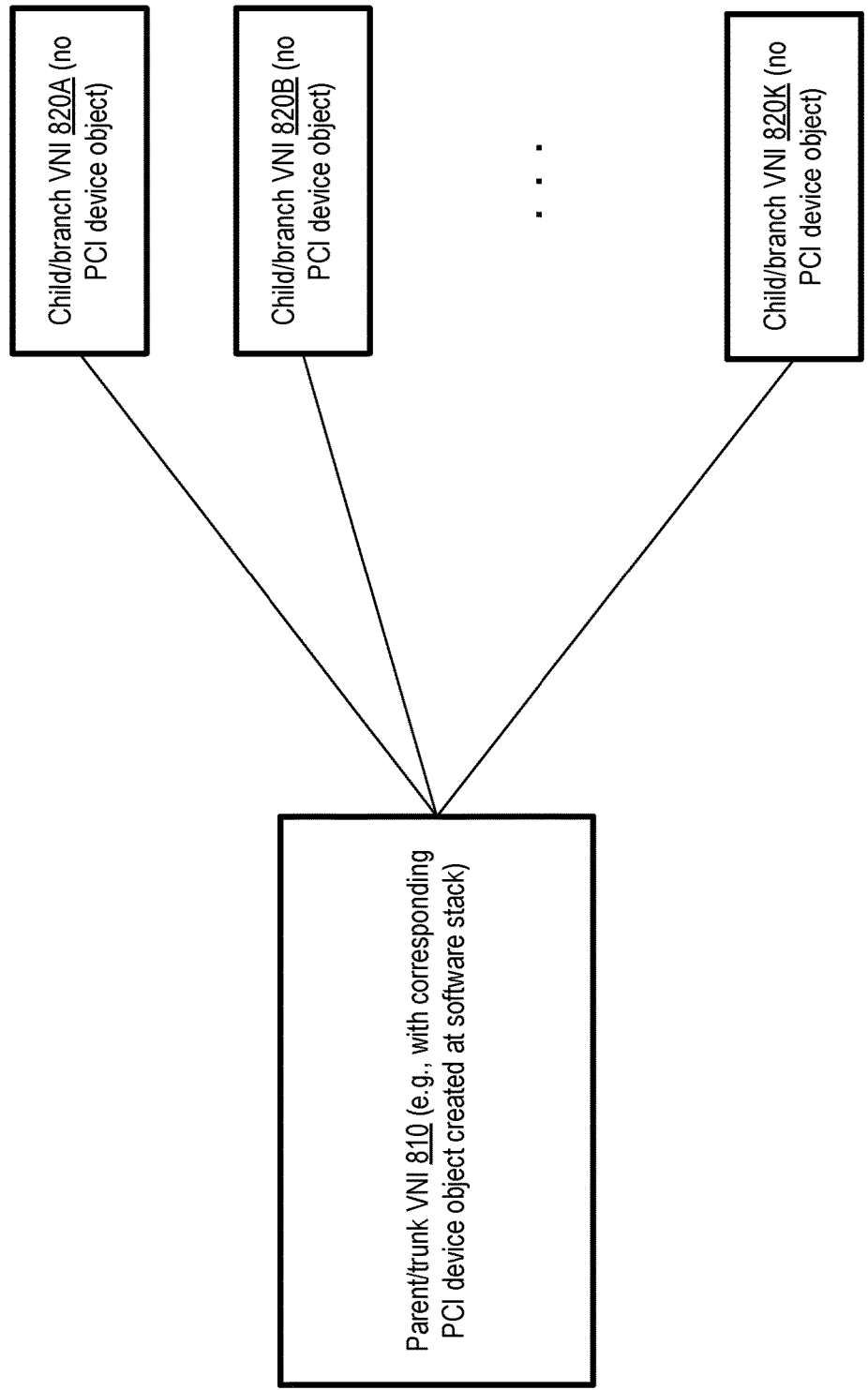
FIG. 8 illustrates an example of a multiplexed virtual network interface, according to at least some embodiments.

In some embodiments, virtual network interfaces may be configured in a trunk-branch or parent-child relationship, such that at least some resources associated with the trunk or parent VNI can be shared among the branches or children while still providing the benefits of virtualized network configuration to the compute instances to which the branch/child VNIs are attached. These types of VNI relationships may be referred to as multiplexed VNIs in some embodiments. Because of the sharing of resources, such configurations may facilitate greater scalability with respect to the number of network connections that can be sustained at a given virtualization host or a group of virtualized hosts. FIG. 8 illustrates an example of a multiplexed virtual network interface, according to at least some embodiments. A parent or trunk VNI 810 may be configured at a virtualization host first, and then some number of child or branch VNIs 820 (e.g., 820A-820K) may be programmatically associated or attached to the parent VNI 810 as needed. For example, as discussed in further detail below, in some embodiments, if there are K micro VMs running concurrently at a virtualization host, at least K+1 child/branch VNIs may be associated with a single parent/trunk VNI, with one child VNI being used for the data-plane traffic of each micro VM, and one child VNI being shared for control-plane traffic. In at least some embodiments in which PCI is being used for the virtualization offloading cards, only the parent/trunk VNI may require a software PCI device object to be created at the virtualization host, while the child/branch VNIs may not require such objects of their own. As such, in embodiments in which the total number of PCI devices permitted by the operating system (within which CPA and the VIP processes of the kind discussed in the context of FIG. 1 are launched) is limited, the use of the multiplexed VNIs may help avoid operating system-imposed networking bottlenecks.

Example Virtualization Offloading Card

Figure 9:
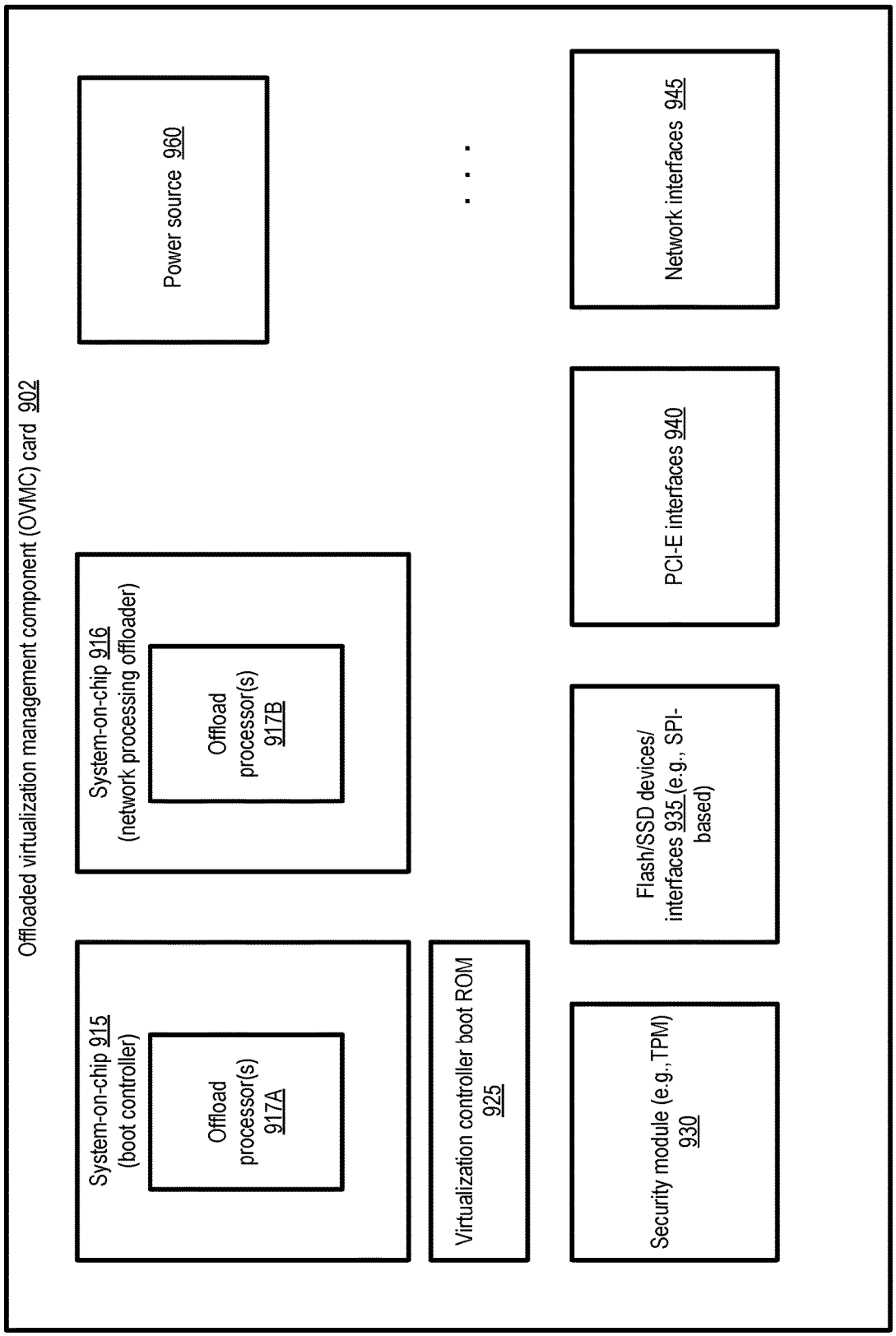
FIG. 9 illustrates example subcomponents of an offloaded virtualization management component card which may be employed at virtualization hosts, according to at least some embodiments.

FIG. 9 illustrates example subcomponents of an offloaded virtualization management component card which may be employed at virtualization hosts, according to at least some embodiments. As mentioned earlier, such a card may also be referred to as a virtualization offloading card in various embodiments. As shown, offloaded virtualization management component (OVMC) card 902 (similar in features and capabilities to OVMC 176 of FIG. 1) may comprise a pair of systems-on-chip (SOCs) 915 and 916 with respective sets of offloading processors 917A and 917B (as distinguished from the primary CPUs of the virtualization host at which the OVMC card is attached and used). One of the SOCs (e.g., 915) may be used for a boot controller, while the other may be used primarily or specifically for network processing offloading in the depicted embodiment. Other distributions of virtualization-related responsibilities may be implemented in different embodiments. A secure boot ROM 925 may be used for an initial phase of a multi-phase boot operation of the virtualization host itself by the boot controller in some embodiments. The OVMC card 902 may also include a security module (such as a trusted platform module (TPM)) 930, which may also be used extensively during the boot procedure and/or for post-boot state verification in some embodiments.

In addition, the OVMC card 902 may comprise a number of storage, power and connectivity-related components in various embodiments. For example, one or more flash devices/interfaces (or SSDs) 935 may be incorporated within the offload card. These devices may be used, for example, to store firmware and/or software corresponding to various virtualization management components, compute instance components, and the like. PCI-E interfaces 940 may be used for communicating with processes such as the CPA and the VIPs and/or for communication among the SOCs in various embodiments. In other embodiments, other types of interconnects and corresponding interfaces may be used, such as variants of the QuickPath interconnect (QPI) or the UltraPath interconnect (UPI). Network interfaces 745 may be used for communications between the virtualization manager and the control plane of the virtualized computing service in some embodiments, as well as for data-plane communications between the compute instances launched on the host and various network endpoints in at least one embodiment. The OVMC card 902 may also comprise a power source 960 in some embodiments, e.g., sufficient to keep the OVMCs working for at least some targeted number of hours or days in the event of extended power failures. In some implementations, a supercapacitor-based power source may be used.

Separate SOCs on the same card may not be required for the offloaded virtualization manager components in some embodiments. For example, a single SOC capable of performing the boot controller functions as well as network offloading tasks may be utilized in one embodiment. In other embodiments, a separate card may be used for performing network processing tasks than is used for the boot controller. In some embodiments, respective OVMC cards may be used for data plane versus control plane traffic to/from a virtualization host. The set of offload card components shown in FIG. 9 is not intended to be comprehensive; several other components, such as timers and the like, may be incorporated at the card in some embodiments. In various implementations, at least some of the components shown in FIG. 9 may not be required.

Example Networking Configuration of Virtualization Host

Figure 10:
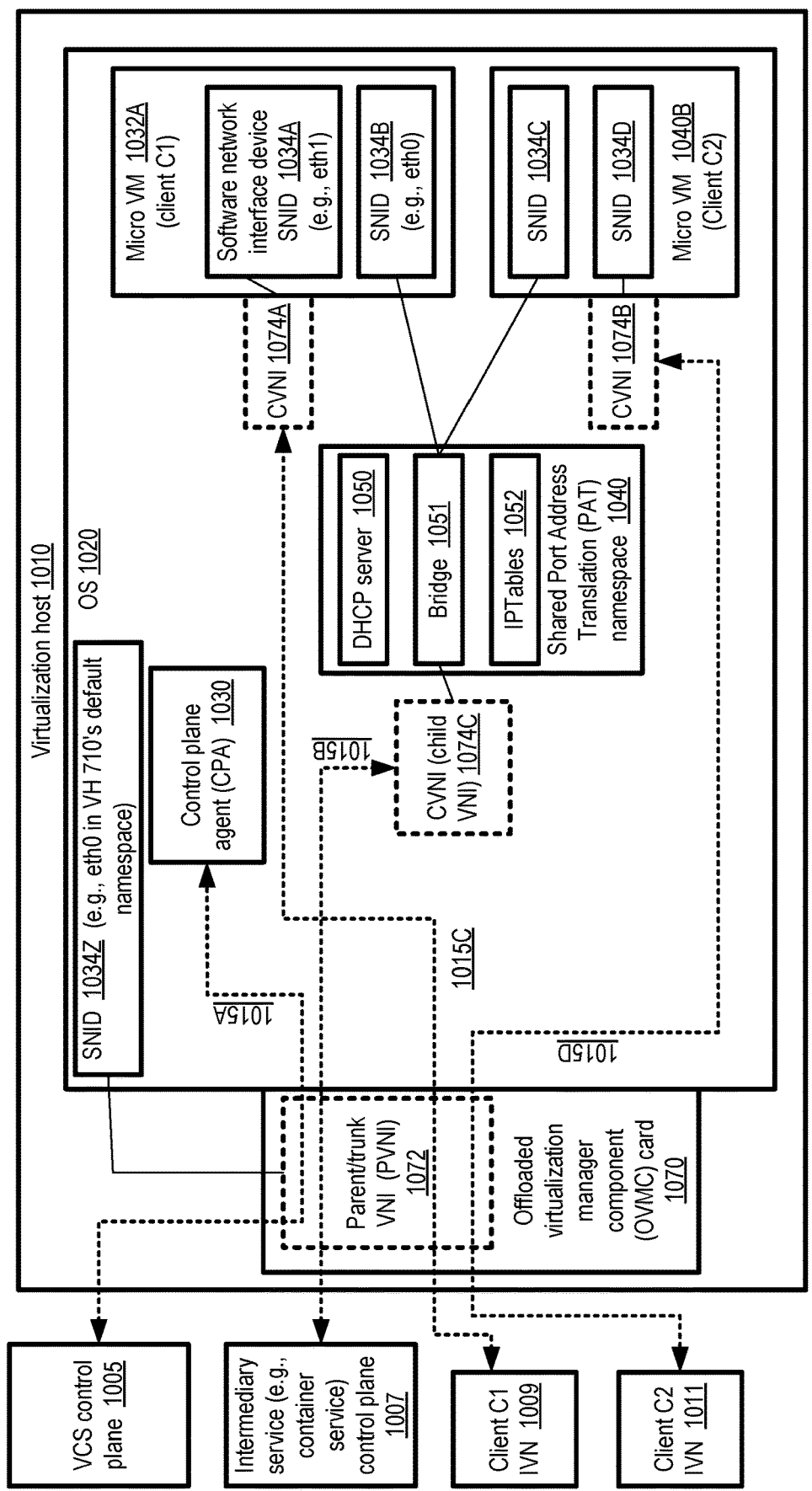
FIG. 10 illustrates example aspects of networking configuration at a virtualization host at which multiple compute instances such as micro virtual machines may be instantiated, according to at least some embodiments.

FIG. 10 illustrates example aspects of networking configuration at a virtualization host at which multiple compute instances such as micro virtual machines may be instantiated, according to at least some embodiments. In the depicted embodiment, virtualization host 1010 (which may be similar in features and capabilities to the virtualization hosts shown in earlier figures including FIG. 1) comprises a control plane agent (CPA) or administrative agent 1030 and two micro VMs 1032A and 1032B by way of example. The micro VMs may be implemented as threads within respective virtualization intermediary processes launched at a stripped down version of an OS 1020 in some embodiments, and the control plane agent 1030 may be implemented as another process within OS 1020, as discussed earlier in the content of FIG. 1. In other embodiments, the micro VMs and/or the administrative agent may be implemented as processes or threads launched within a bare metal compute instance.

In the depicted embodiment, networking configuration operations may potentially have to be performed for network messages of at least three types: (a) messages between the CPA 1030 and the VCS control plane (b) data-plane messages between the micro VMs 1032 and other entities in the IVNs of customers on whose behalf the micro VMs have been set up and (c) control plane messages between an intermediary service, such as a container service, and the micro VMs, which may be used to implement features of the intermediary service (e.g., software containers may be set up at the micro VMs, which may have to interact with an intermediary container service). The volume of traffic expected for the three types of messages may differ (e.g., fewer control plane messages may be expected to flow than data plane messages) in at least some embodiments, and isolation may be required between the different types of messages.

In order to efficiently enable at least these three types of message flows, a number of virtual network interfaces (VNIs) configured in a parent-child tree (or trunk/branch) arrangement may be established in the depicted embodiment using the offloaded virtualization management component (OVMC) card 1070. A single parent or trunk VNI (PVNI)

1072, may be created for the virtualization host, and child or branch VNIs (CVNIs) 774 may be dynamically attached to or detached from the parent VNI as needed to accommodate varying numbers of micro VMs (and/or other types of compute instances) and different types of traffic.

For VCS control plane traffic, the PVNI 1072, which may be attached programmatically to OS 1020 (or to a bare-metal instance of which OS 1020 is a component) may itself be used in the depicted embodiment. The PVNI 1072 may be created during initialization of the virtualization host 1010 in at least some embodiments, e.g., when the virtualization host 1010 is first set up as one of the hosts to be managed by a VCS control plane cell. In at least one embodiment a PVNI 1072 may be set up as part of the preparatory configuration operations for a group of compute instances (e.g., in response to a provisionVirtualizationHosts request of the kind discussed in the context of FIG. 4, or in response to a prepareForLaunches request of the kind also discussed in the context of FIG. 4). In some embodiments in which a variant of Linux or a similar operating system is used for OS 1020, the PVNI 1072 may appear as the "eth0" software networking interface device (SNID) 1034Z in the default namespace of the virtualization host 1070. In one implementation, the default namespace of host 1070 may comprise the eth0 interface linked to the PVNI, a loopback interface and a default route pointing to the PVNI 1072. In at least one embodiment, security settings on the PVNI may restrict access to only allow VCS control plane traffic, thereby isolating this type of traffic from data-plane traffic or control-plane traffic associated with services other than the VCS itself. The PVNI's source/destination check flag (e.g., similar to flag 765 of FIG. 7) may be turned off to allow the PVNI to accept traffic destined for all attached CVNIs. The PVNI's lifetime may be coupled closely with that of the OS 1020 (or a bare metal instance to which the PVNI is attached) in some embodiments—e.g., the PVNI may remain configured as long as the OS 1020 is configured for use to instantiate compute instances.

With respect to data plane traffic between the micro VMs and client IVNs, one CVNI per micro VM may be programmatically associated with the PVNI 1072 in the depicted embodiment. For example, for traffic 1015C between a client C1's IVN 1009 and micro VM 1032A established on behalf of client C1, CVNI 1074A may be configured. Similarly, for traffic 1015D between micro VM 1040B, established on behalf of client C2, and client C2's IVN 1011, CVNI 1074B may be attached to PVNI 1072. Note that micro VMs of different clients C1 and C2 may only be permitted in a subset of virtualization control modes, such as the shared managed mode (SMM) in some embodiments. Each CVNI used for data-plane traffic to client IVNs (such as CVNI 1074A or 1074B) may be connected to a respective "macvtap" interface in a per micro VM namespace in some implementations. One or more network addresses (e.g., private and/or public IP addresses) address from within the client IVN's range of network addresses may be assigned to each IVN-associated CVNI in at least some embodiments, e.g., from the associated client IVN using DHCP.

For control plane traffic 1015B between an intermediary service 1007 and a plurality of the micro VMs, Port Address Translation (PAT) may be used in conjunction with a single shared CVNI 1074C in the depicted embodiment. A shared PAT namespace 1040 may be established, with an associated DHCP server 1050, a bridge 1051 (e.g., a virtual networking device to which other software network devices can be linked, which may be referred to as a "Linux bridge" in some embodiments) and IPTables 1052 or a similar mechanism for implementing port translation. In at least some embodiments, at least a pair of software network interface devices 1034 may be configured at a micro VM, one for the data plane traffic to the client IVN, and another for the control plane traffic to the intermediary service. For example, in an embodiment in which a variant of Linux or a similar operating system is used for OS 1020, an SNID 1034B appearing as eth0 at the micro VM 1032A may be linked to bridge 1051, while SNID 1034A appearing as eth1 may be linked to CVNI 1074A. Similarly, with respect to micro VM 1040B, CVNI 1074C may be associated with one SNID 1034D, while another SNID 1034C linked to bridge 1051 may be used for traffic with the intermediary service control plane 1007. A respective "tap" interface (a link layer simulation device), slaved to the bridge 1051, may be configured within the PAT namespace for individual ones of the micro VMs 1040 in some embodiments. Netfilter IPTables rules may be used to implement PAT, so that the traffic is sent to the correct micro VM in at least one embodiment. The DNCP server 1050 may, for example, assign respective private IP addresses to the micro VMs for the control plane traffic. The CVNIs 1074 may each be instantiated in some embodiments as VLAN interfaces on the PVNI. The use of Port Address Translation as described above may help reduce the total number of CVNIs that have to be associated with the PVNI 1072, and may thus also help support large numbers of micro VMs on a given host.

In at least some embodiments, one or more aspects of the networking configuration of a virtualization host may differ from the example networking configuration shown in FIG. 10. For example, in some embodiments, instead of using a trunked or hierarchical set of VNIs, a set of VNIs that are not hierarchically linked (i.e., all PVNIs) may be used. In one embodiment, PAT may not be employed in the manner discussed above. Different networking virtualization protocols may be used in various embodiments—e.g., instead of using VLAN, GRE (Generalized Routing Encapsulation) may be used in one embodiment. In some embodiments, a virtualization host 1010 may be provisioned with more than one OVMC card 1070—e.g., one OVMC card for control plane or administrative network traffic and another OVMC card for data plane traffic. In one such embodiment, an OVMC card used for control plane traffic may not necessarily utilize a parent/trunk VNI.

In some embodiments, a special "I/O intermediary" micro VM may be established to handle I/O requests on behalf of other micro VMs at the virtualization host—e.g., the other micro VMs may funnel their networking and/or persistent storage read/write requests to the I/O intermediary micro VM, which may perform at least some aspects of I/O virtualization. In contrast to the micro VMs established on behalf of specific customers, such an I/O intermediary micro VM may be persistent in at least some embodiments—e.g., it may remain in existence as long as the virtualization host is being used to respond to micro VM launch and terminate requests. In some embodiments, multiple I/O intermediary micro VMs may be instantiated if needed, e.g., if the total networking and storage request rates of the set of client-requested micro VMs exceeds a threshold.

Networking Configuration Workflow Example

Figure 11:
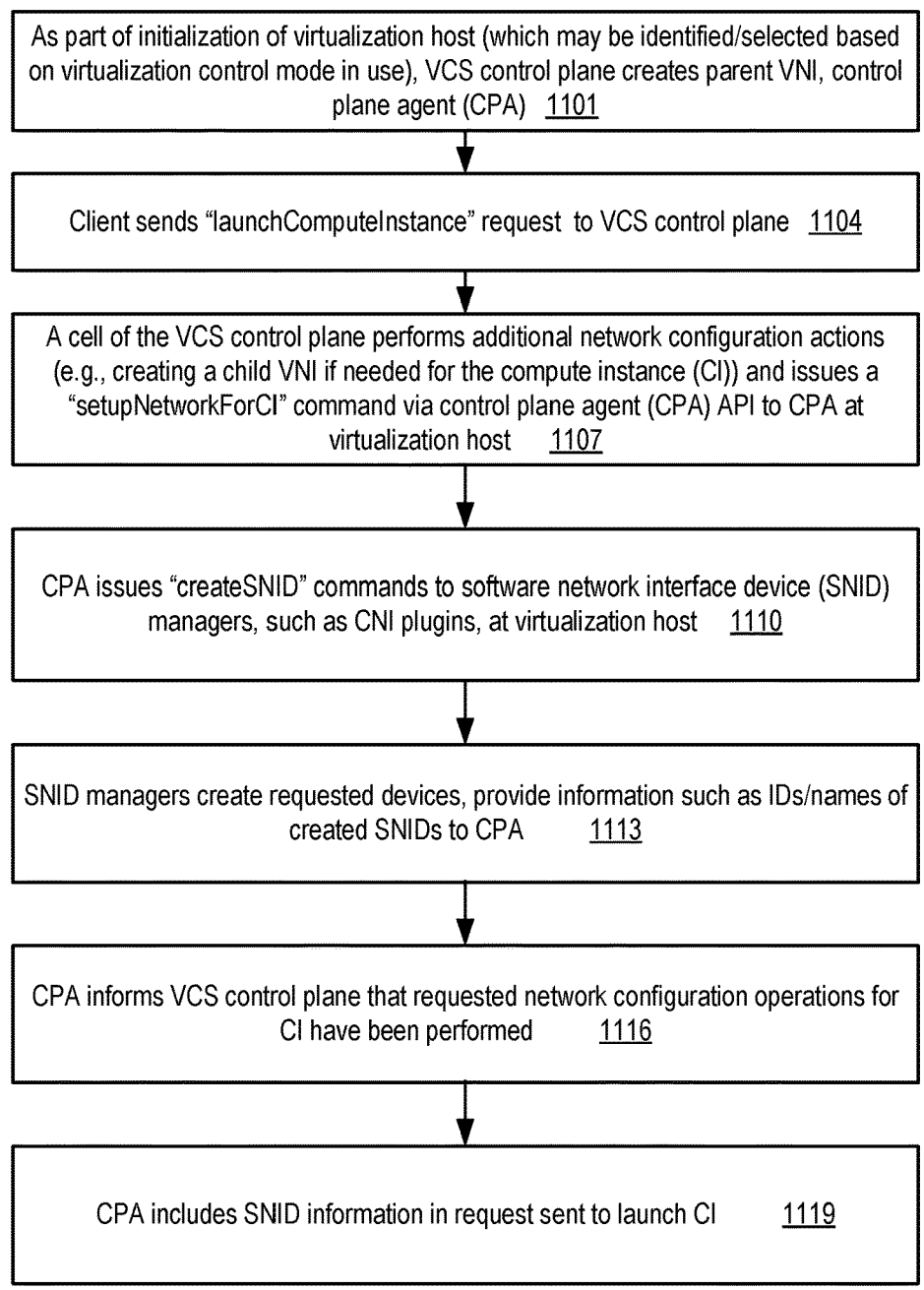
FIG. 11 is a flow diagram illustrating aspects of operations that may be performed to prepare a networking configuration for a compute instance before the compute instance is launched, according to at least some embodiments.

FIG. 11 is a flow diagram illustrating aspects of operations that may be performed to prepare a networking configuration for a compute instance before the compute instance is launched, according to at least some embodiments. As shown in element 1101, in some embodiments, a parent VNI and a control plane agent (CPA) may be configured at a virtualization host during the initialization of the virtualization host, e.g., in response to a request to provision virtualization hosts or prepare for launches of compute instances such as micro virtual machines. The host may be identified/selected based at least in part on the virtualization control mode being used on behalf of the client in at least some embodiments.

A client of the VCS may transmit the equivalent of a "launchComputeInstance" request or command to the VCS control plane (element 1104) in the depicted embodiment. The request may indicate various desired properties of the compute instance (CI), such as one or more network addresses, an indication of the subnet(s) of one or more IVNs within which the CI is to be configured, security metadata, a flag indicating whether a public IP address is to be assigned to the CI, the expected or maximum permitted inbound and/or outbound message rates, and so on in various embodiments. In some implementations in which a CI is being established by an intermediary service such as a container service, the launch command may indicate respective sets of networking properties for two types of traffic—the data plane traffic of the CI, and the control plane traffic with the intermediary service.

The client's request may be routed to a particular cell of the VCS control plane in various embodiments. One or more components of the cell (e.g., a request processing component) may perform additional network configuration actions (element 1107), e.g., prior to transmitting a request to the CPA. For example, a child VNI specific to the micro VM, to be used for data plane traffic of the CI, may be established and associated with the parent VNI if needed. In some embodiments, such child VNIs may be set up in response to a prepareForLaunches request of the kind discussed earlier (e.g., prior to the launchComputeInstance request). At least in some embodiments, prior to creating a new child VNI, the VCS control plane may first ascertain whether any existing child VNIs can be re-used. In one implementation, reference counts may be stored for each child VNI, indicating the number of CIs attached to the child VNI, and if the reference count of a child VNI goes down to zero, the child VNI may be re-used. In at least one embodiment, instead of using a separate child VNI for each CI's data plane traffic, a given child VNI may be used concurrently for several different CIs, in which case the VCS control plane may simply identify an appropriate in-use child VNI for the to-be-launched CI instead of creating a new child VNI. The VCS control plane may then transmit the equivalent of a "setupNetworkForCI" request to the CPA at the virtualization host selected for the client's CI in some embodiments for further stages of network configuration to be initiated at the host itself. In various embodiments, such a request may be transmitted by invoking a control plane API implemented by the CPA, which may differ from the APIs implemented by the virtualization intermediary process (VIP) used for the CIs themselves. The request sent to the CPA may, for example, include VLAN identifiers for the child VNI(s) identified/created for the new CI to be launched, the SNID names/IDs for the child VNI(s), and MAC addresses of the parent VNI and the child VNI(s) in some embodiments.

In response to the "setupNetworkForCI" request, the CPA may issue commands to create the necessary software network interface devices (the equivalent of "createSNID" commands) to local interface device managers at the virtualization host (element 1110). In some embodiments in which the CIs are being used for instantiating software containers, the local software network interface device managers may include plugins implementing the Container Network Interface or CNI. In one embodiment, multiple SNIDs may be set up in parallel. After the requested devices are created, their identifiers/names may be provided to the CPA (element 1113). In some embodiments, the CPA may inform the VCS control plane that the requested network configuration operations have been completed for the CI (element 1116). When the CPA launches a virtualization interface process (VIP) and issues a command via the VIP's API to launch a CI, information about the objects created for the CI may be passed on to the VIP (element 1119), and from the VIP to the thread launched to implement the CI. In various embodiments, the virtualization control mode being used may influence the extent to which the kinds of networking-related configuration operations indicated in FIG. 11 can be performed in advance of the actual launch of the VIP thread used for the compute instance. For example, in one embodiment, if the dedicated power user mode (DPM) is used, only operations corresponding to element 1119 may have to be performed when the CI is actually launched, with the remaining operations performed in advance.

Example Storage Configuration Options

Figure 12:
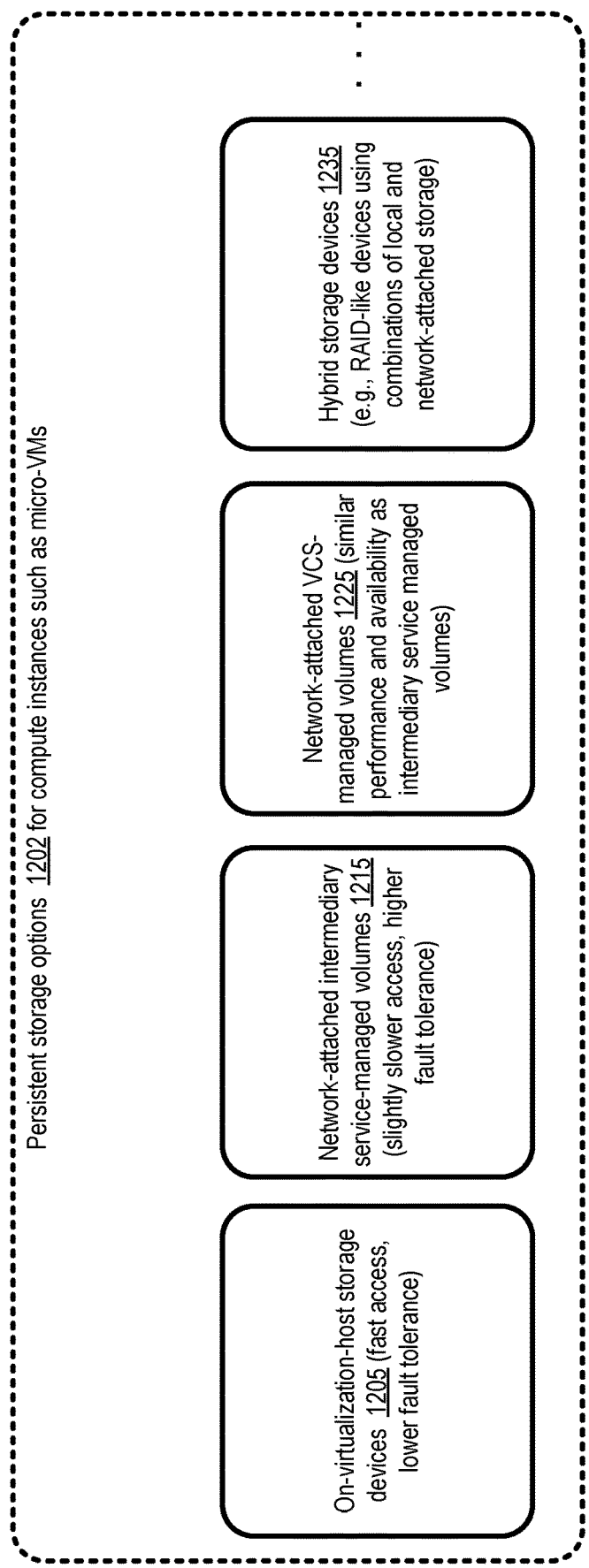
FIG. 12 illustrates example persistent storage options for micro virtual machines and/or other types of compute instances, according to at least some embodiments.

Persistent storage from a variety of sources may be used singly or in combination for compute instances such as micro VMs in some embodiments. FIG. 12 illustrates example persistent storage options for micro virtual machines and/or other types of compute instances, according to at least some embodiments. As shown, the options 1202 may include on-virtualization-host storage devices 1205, network-attached volumes 1215 managed by an intermediary service such as a software container service, network-attached volumes 1225 managed by the VCS, and/or hybrid storage devices 1235 which combine local and network-attached storage for the micro VMs.

In some embodiments, the locally attached on-virtualization host storage devices 1205 may include rotating disks and/or solid state drives (SSDs); in other embodiments, only rotating disks may be used, or only SSDs may be used. Similarly, the network-attached volumes 1215 or 1225 may be set up using any desired type of physical storage device in various embodiments, including rotating disks, solid state drives, and the like. The locally attached storage may provide faster access (e.g., read or write I/O latencies) than the network-attached volumes in some embodiments. The network-attached volumes, which may for example present block device interfaces, may provide higher fault tolerance and availability than the local storage in some embodiments. The particular combination of storage devices that are used for a given micro VM may depend on I/O requirements indicated by the client in various embodiments. In some embodiments, the local and network attached storage may be combined to configure the storage accessible from a given micro VM—e.g., an array configuration, similar in concept to some types of RAID (redundant arrays of inexpensive disks) architectures, using both local and network-attached storage devices may be used to form a hybrid storage device 1235. In at least some embodiments, a default storage device type (e.g., locally-attached SSDs) may be used if a client does not indicate specific storage requirements for a micro VM. In at least some embodiments, e.g., depending on the virtualization control mode in use, the storage devices for a given micro VM may be initialized/prepared by the control plane agent (CPA) as part of the pre-launch configuration, and passed as parameters to the VIP in the request to launch the micro VM.

Shared Tiered Storage

As mentioned earlier, in some embodiments a given virtualization host may be used for thousands, or tens of thousands, of compute instances (CIs) such as micro VMs.

In many cases, with respect to storage requirements, many of the CIs may be similar—e.g., they may be booted from similar machine images, they may access similar operating storage modules in a read-only manner, and so on. To help instantiate very large numbers of micro VMs on a single host, a shared tiered hierarchy of storage may be implemented in some embodiments, with at least some storage objects or devices being shared by multiple micro VMs, thereby reducing the overall storage requirements.

Figure 13:
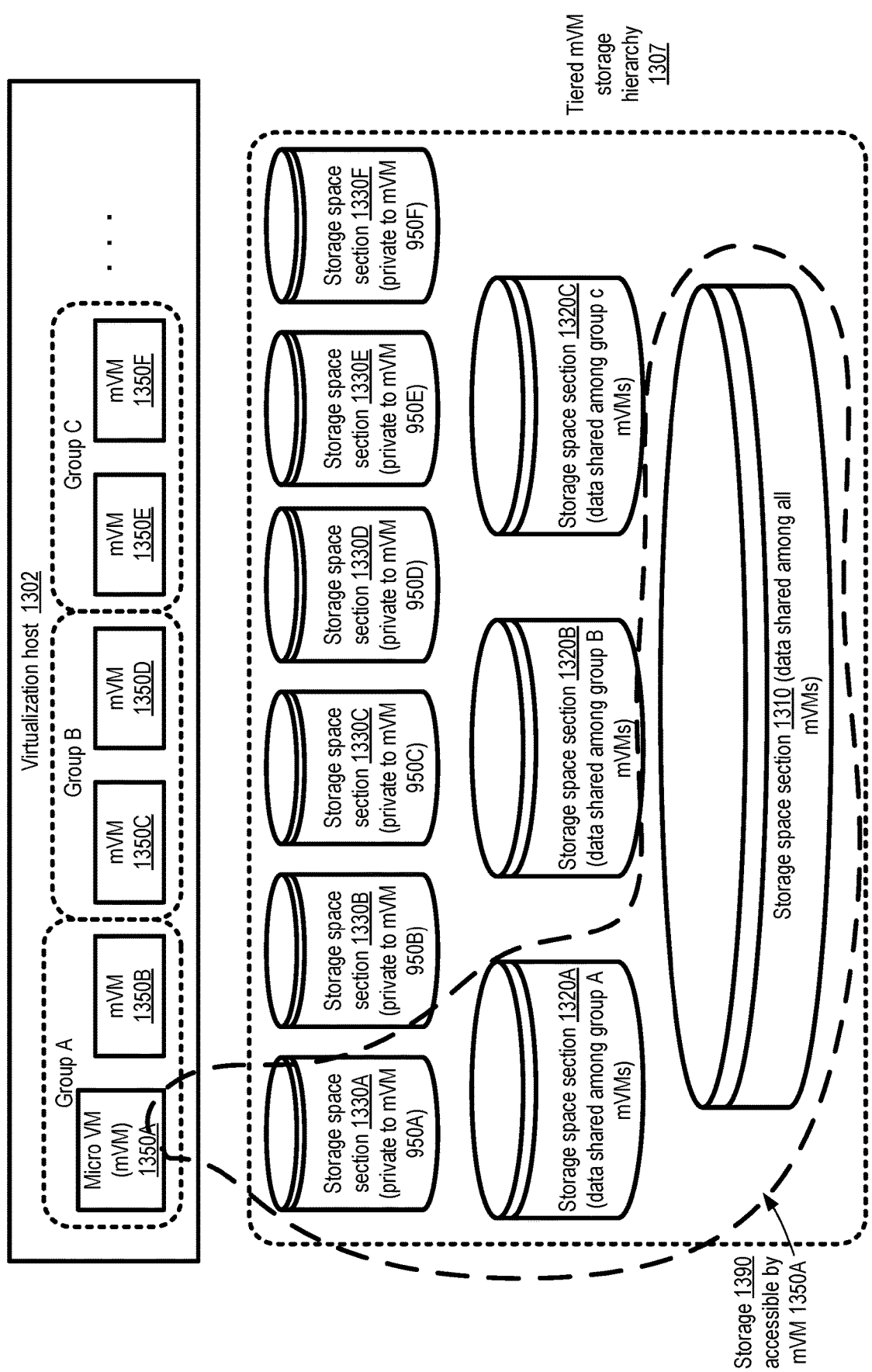
FIG. 13 illustrates an example tiered hierarchy of persistent storage that may be employed for micro virtual machines and/or other types of compute instances, according to at least some embodiments.

FIG. 13 illustrates an example tiered hierarchy of persistent storage that may be employed for micro virtual machines and/or other types of compute instances, according to at least some embodiments. In the depicted embodiment, a virtualization host 1302 (which may be similar in features and capabilities to virtualization hosts shown in earlier figures including FIG. 1) may be used for a number of micro VMs that can be subdivided into groups with at least some overlap in the set of storage objects accessed. In the simplified example depicted, six micro VMs 1350A-1350F are shown, divided into three groups based on storage access similarities. Group A comprises micro VMs 1350A and 1350B, Group B comprises micro VMs 1350C and 1350D, while group C comprises micro VMs 1350E and 1350F.

A tiered micro VM storage hierarchy 1307 may comprise a base tier comprising storage space section 1310 for data shared among all micro VMs at the host 1302, per-group storage sections 1320A, 1320B and 1320C, and per-micro VM storage sections 1330A-1330F in the depicted embodiment. A given micro VM 1350 may be granted access to the entire storage section 1310, the particular shared storage space section 1320 for the group to which the micro VM belongs, and a private section 1330 to which no other micro VM is granted access. For example, the storage accessible by micro VM 1350A may comprise private section 1330A, group A shared section 1320A, and the globally shared section 1310. Similar combinations of storage sections from all three layers may be configured for access by other micro VMs. The tiered hierarchy may be defined at various levels of abstraction in different embodiments—e.g., in some embodiments, the sections 1310, 1320 and 1330 may comprise respective portions of file systems, while in other embodiments, at least some of the sections may comprise portions of volumes, or whole volumes. Any desired types of storage devices may be used for the sections in various embodiments—e.g., local storage, network-attached storage, or hybrid storage of the kind discussed in the context of FIG. 12 may be employed.

Machine Image Size Reduction and Caching

Figure 14:
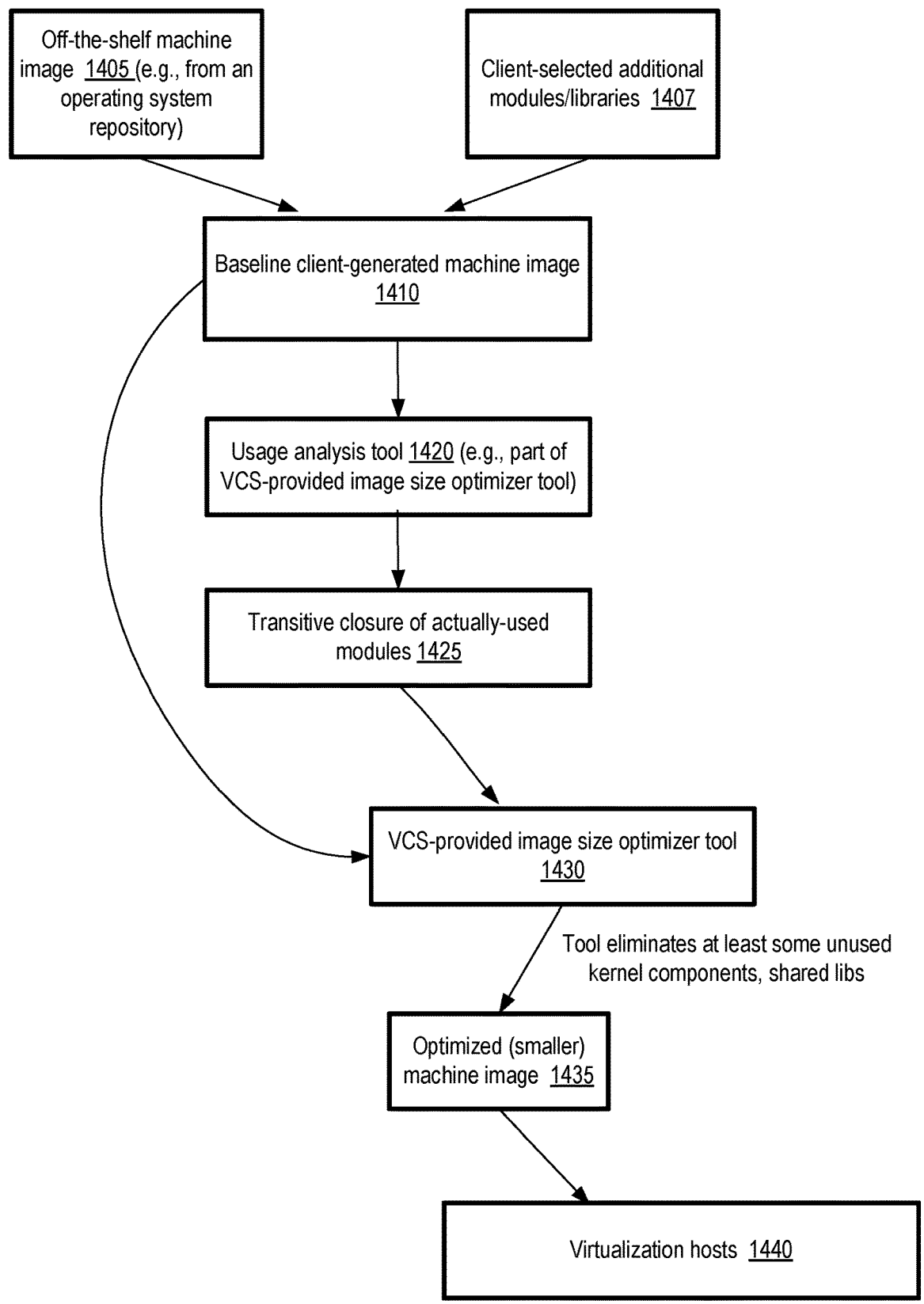
FIG. 14 illustrates an example of a workflow involving the use of a machine image size optimizer tool that may be provided to clients by a virtualized computing service to help accelerate compute instance launches, according to at least some embodiments.

In some embodiments, a VCS may implement one or more optimization techniques or tools related to the machine images that are used for launching compute instances such as virtual machines. FIG. 14 illustrates an example of a workflow involving the use of a machine image size optimizer tool that may be provided to clients by a virtualized computing service to help accelerate compute instance launches, according to at least some embodiments.

As shown, in some embodiments a baseline machine image 1410 may be generated by a client of the VCS, e.g., by combining an off-the-shelf or standard machine image 1405 with a set of client-selected additional modules/libraries suitable for the application(s) that the client wishes to run at the VCS. In at least some embodiments, it may sometimes be the case that the baseline client-generated machine image 1410 contains a number of modules that are not used during the execution of the client's applications. In order to help the client reduce the size of the machine image, one or more usage analysis tools 1420 may be provided by the VCS in some embodiments, which can identify a transitive closure of the actually-used modules 1425 of the baseline machine image 1410. The VCS may, for example, provide access to a set of virtualization hosts at which instrumented compute instances (e.g., compute instances using low-level module invocation tracing instrumentation or the like) can be run to identify a list of modules at various levels of the software stack, including the kernel, shared libraries etc., that are utilized during one or more tests or benchmarks of the applications in some embodiments. A list of all the modules/packages included in the machine image may be compared to the list of modules/packages that were actually used, thereby identifying the set of modules/packages that are not utilized in such embodiments. The usage analysis tools 1420 may, for example, be part of a suite of machine image size optimization tools accessible from the VCS in some embodiments.

A VCS-provided image size optimizer tool 1430 may be deployed to eliminate at least some of the unused kernel components, shared libraries and/or application module from the baseline image 1410 in the depicted embodiment, and generate an optimized machine image 1435 that is smaller than the baseline image but retains all the functionality needed for the client's applications. Such an optimized image 1435 may then be used at virtualization hosts 1440 of the VCS to implement compute instances for the client in the depicted embodiment.

Other machine image-related optimization techniques may be employed in at least some embodiments, e.g., in addition to or instead of utilizing the image size optimization technique illustrated in FIG. 14. By default, numerous machine images, to be used for different types of compute instances or micro VMs (mVMs), may be stored at a VCS control plane repository in one embodiment. Several (or all) of the images may share common files and/or other storage objects in some embodiments—that is, an overlap may exist between the set of storage objects included in different images. To help speed up the process of launching a compute instance, while still keeping the total amount of storage being used for the images within reasonable limits, in some embodiments common portions of one or more boot images may be cached ahead of time at a virtualization host, with the final image being constructed by combining cached portions with portions retrieved from a VCS repository.

Figure 15:
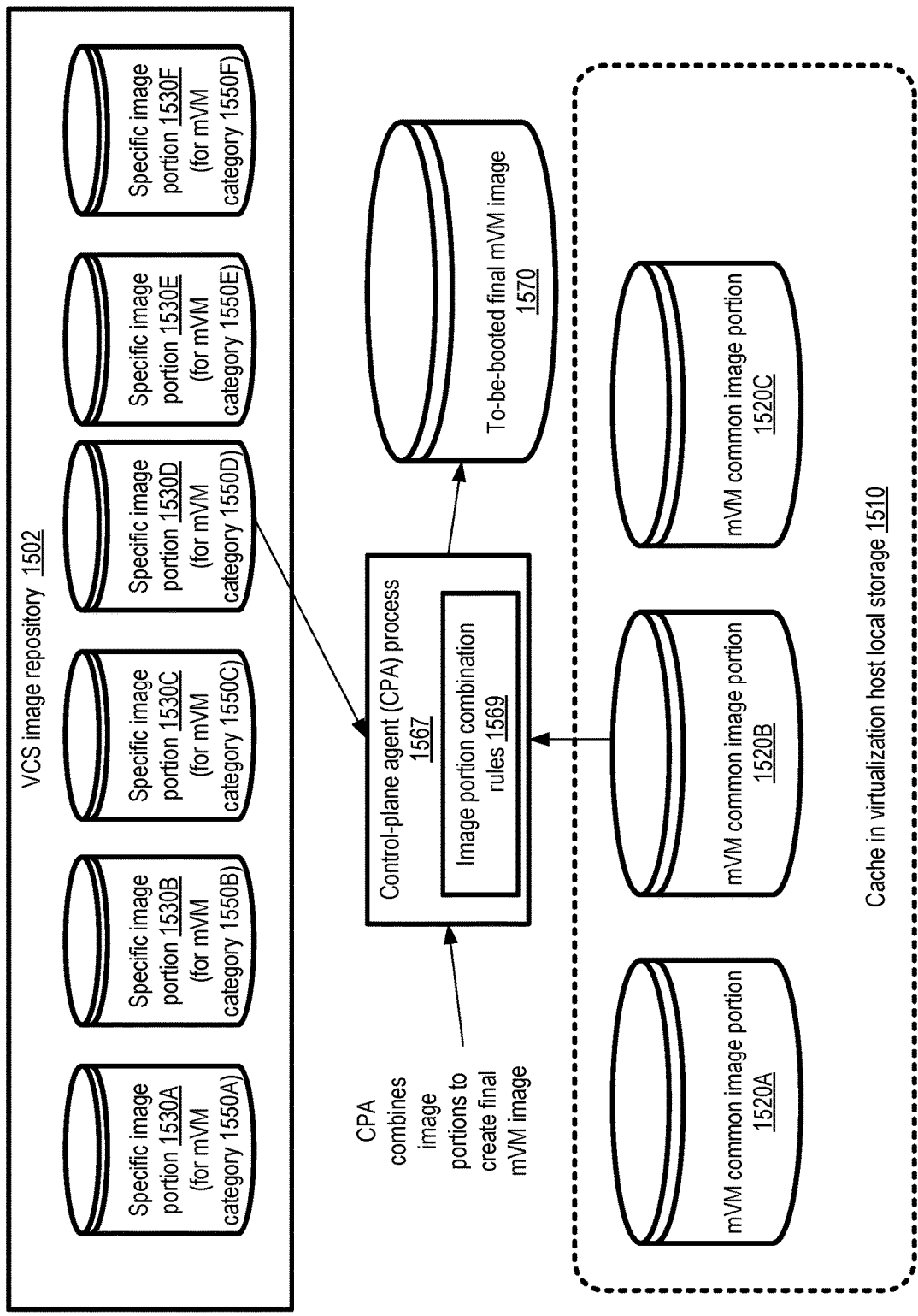
FIG. 15 illustrates an example caching technique for portions of boot images used for micro virtual machines and/or other types of compute instances, according to at least some embodiments.

FIG. 15 illustrates an example caching technique for portions of boot images used for micro virtual machines and/or other types of compute instances, according to at least some embodiments. In at least some embodiments, such caching may be done in advance of receiving launch requests, e.g., as part of the preparatory configuration operations performed in response to requests similar to the provisionVirtualizationHosts or prepareForLaunches requests discussed earlier. In the depicted embodiment, a number of different boot images may be used for respective categories of micro VMs (e.g., categories which differ from one another in resource usage, one or more layers of a software stack, etc.), such as categories 1550A-1550F. A cache 1510 in local storage of a virtualization host may be used for common image portions 1520A, 1520B and 1520C as shown. Individual ones of the common image portions 1520 may be combinable with category-specific portions 1530 (e.g., one of 1530A-1530F) that are stored at a VCS repository to obtain the to-be-booted final image. In some embodiments, the control-plane agent process 1567 at the virtualization host may store a set of image combination rules 1569, which indicate the specific repository-based portions 15130 that are to be combined with a particular cached portion 1520 to assemble the final micro VM image 1570 for a particular request. For example, as shown, the specific image portion 1530D may be combined by the CPA 1567 with cached common image portion 1520B to generate the final image 1570 for a particular request from a client.

Example Virtualization Intermediary Process Threads

Figure 16:
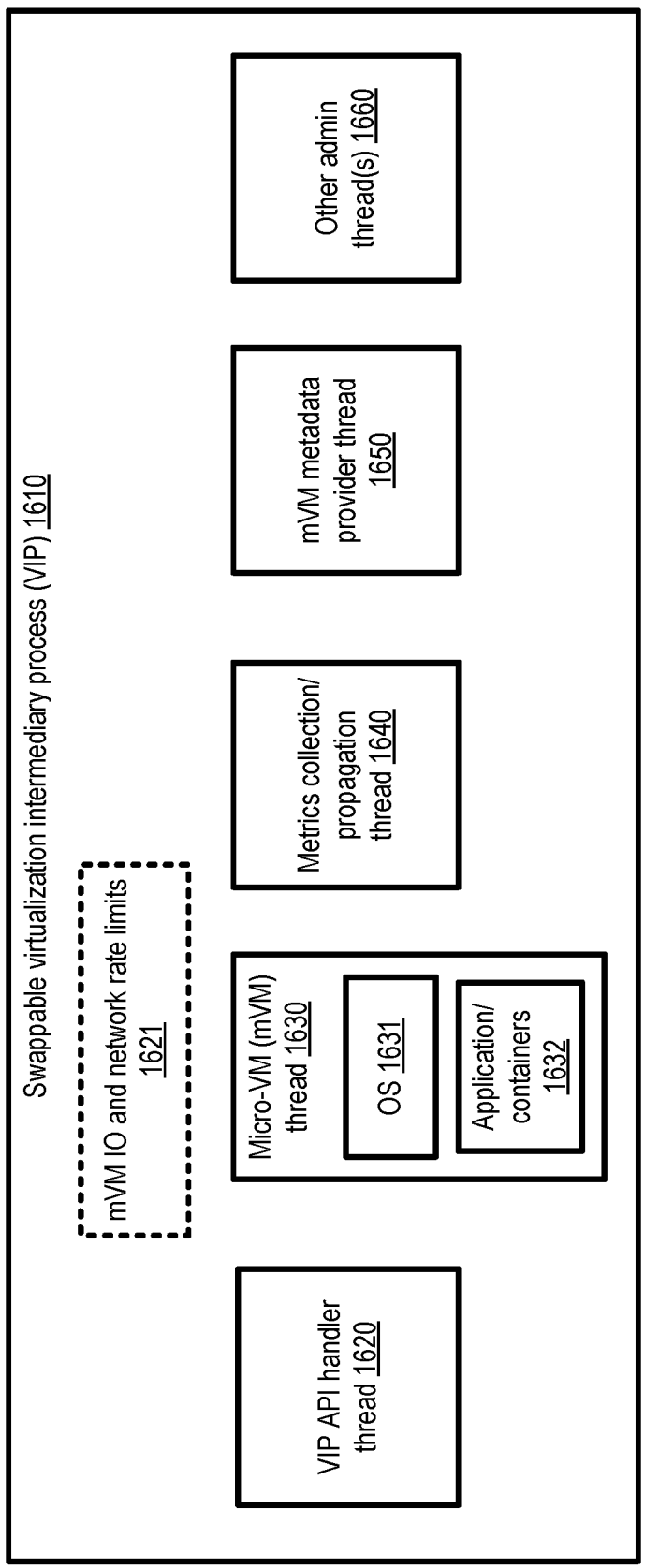
FIG. 16 illustrates an example collection of threads which may be configured at a swappable virtualization intermediary process at a virtualization host, according to at least some embodiments.

As mentioned earlier, in some embodiments individual compute instances including micro VMs may be implemented using a child thread of a virtualization intermediary process (VIP) launched by a control plane agent (CPA) at a virtualization host. FIG. 16 illustrates an example collection of threads which may be configured at a swappable virtualization intermediary process at a virtualization host, according to at least some embodiments. As shown, a swappable VIP 1610 may comprise (among others), an API handler thread 1620, a micro VM thread 1630, a metrics collection and propagation thread 1640, a metadata provider thread 1650 and/or other administrative threads 1660 in the depicted embodiment.

When the VIP is launched, e.g., in response to a command issued by a CPA, at least the API handler thread 1620 may be instantiated in the depicted embodiment, enabling the VIP to receive commands/requests for various operations including launching/terminating a micro VM. In at least some embodiments, a 1:1 relationship may exist between micro VMs and VIPs, and the VIP may be terminated when a request to terminate the micro VM is received (e.g., via the API handler thread). The micro VM thread 1630 may comprise its own operating system 1631 and a software stack comprising one or more applications, software containers and the like as indicated in element 1632. The metrics collection and propagation thread 1640 may gather various kinds of measurements pertaining to the micro VM and provide them to the VCS control plane, e.g. in response to command issued from the CPA via the API handler thread in some embodiments. In some embodiments, such measurements may be included in the data provided to a client regarding resource usage of the current set of compute instances at a virtualization host, e.g., in response to a request similar to the getCIResourceInfo request discussed in the context of FIG. 5. The measurements may be helpful in making oversubscription decisions in various embodiments, e.g., by the VCS control plane and/or by a client when the dedicated power-user mode of virtualization control is in use.

The metadata provider thread 1650 may be sent various elements of metadata pertaining to the micro VM by the CPA in the depicted embodiment, such as an identifier of the machine image used for the micro VM, block device mappings of the micro VM, an IP hostname of the micro VM, information about the authorization roles (if any) associated with the micro VM, scripts that may have been used when launching the micro VM, networking configuration, monitoring information (which may have been collected initially by the metrics thread 1640) and so on. Such metadata may be accessed from the micro VM itself, e.g., even in the absence of connectivity to entities outside the VIP, and may be used for example to troubleshoot problem states, make configuration changes and the like. The VIP may also comprise one or more additional components which enforce a set of I/O and networking rate limits 1621 in some embodiments, throttling the I/O or network requests issued from the micro VM thread 1630 to ensure that the micro VM does not exceed its expected quotas of resources. In at least some embodiments, as discussed below, different rate limits may be enforced during respective phases of operation of a micro VM—that is, rate limits with respect to be or more resources may not necessarily be kept unchanged during the entire lifetime of a given micro VM. Early on in the lifetime of a micro VM, for example, when initialization-related operations that may involve extensive communication with external entities (such as a container service) are being performed, higher rates of I/O may be permitted than later on in the lifetime of the micro VM.

In some embodiments, VIPs with the kind of thread collection shown in FIG. 16 may not be employed to instantiate micro VMs. Instead, a different process/thread collection which also responds to a similar set of APIs invoked from a control plane agent, and generates a micro VM thread or process with a similar level of isolation with respect to other micro VMs may be employed in such embodiments.

Compute Instance Snapshots

In some embodiments, state information of a micro VM or other compute instance (e.g., CPU state, memory state, device state of one or more I/O devices) etc. may be saved in the form of a snapshot, and such snapshots may later be used as the starting points for instantiating other compute instances, which may be referred to as clones of the original compute instance. A compute instance whose state is saved in the form of a snapshot may be referred to as a source compute instance in various embodiments. Because the saved state information may include the results of some partially (or fully) completed configuration operations, the clones may not need to re-perform at least some configuration operations, so the overall time taken by the clones to start performing their application-level tasks may be reduced as a result of using the snapshots as starting points.

Figure 17:
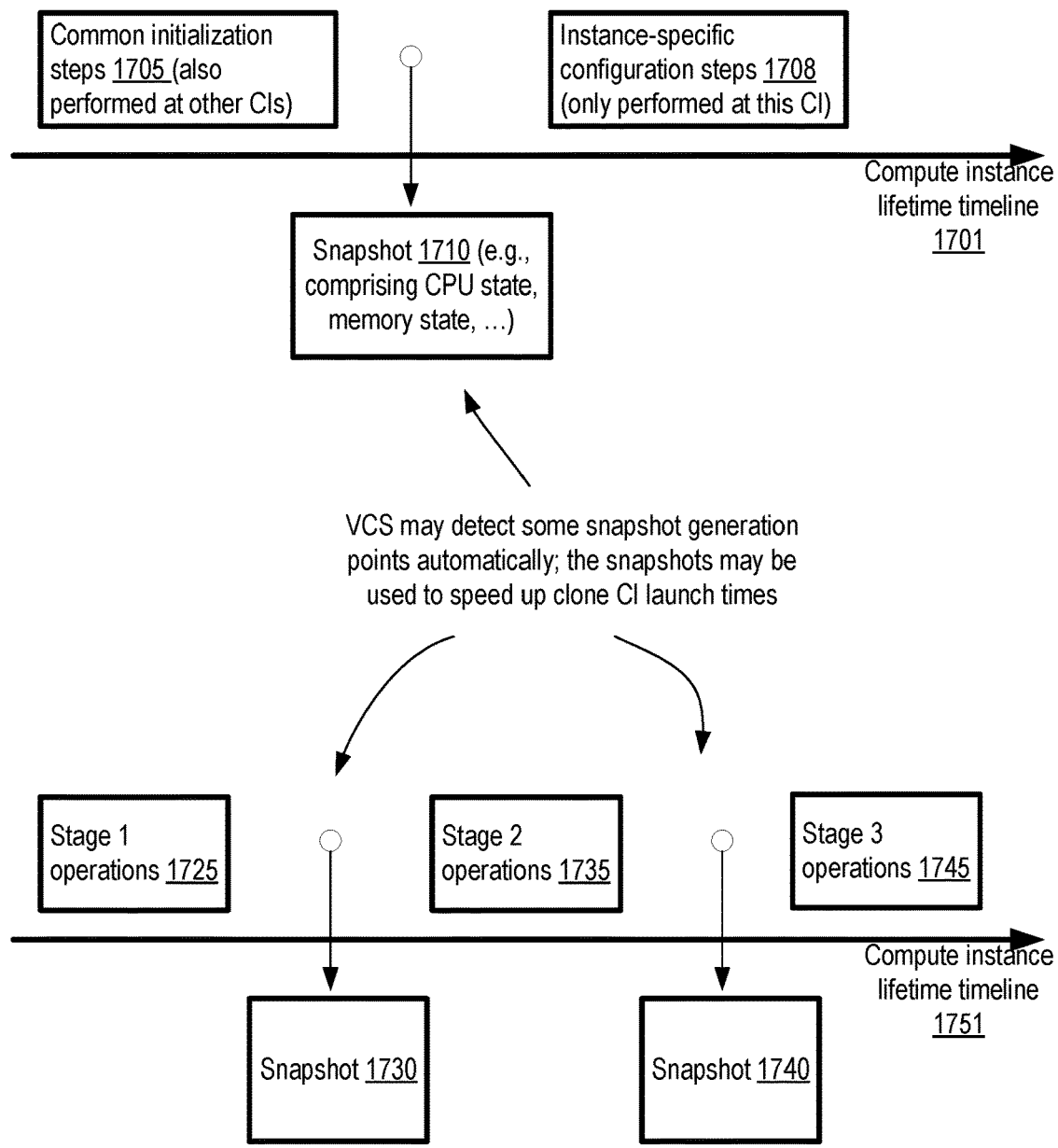
FIG. 17 illustrates examples of the generation of snapshots from source compute instances to help shorten the time taken for configuration operations at cloned compute instances, according to at least some embodiments.

FIG. 17 illustrates examples of the generation of snapshots from source compute instances to help shorten the time taken for configuration operations at cloned compute instances, according to at least some embodiments. Along a lifetime timeline 1701 of a source compute instance, a set of common initialization steps 1705 (that are likely to be required for other compute instances launched in the future) may be followed by instance-specific configuration steps 1708 (that are not likely to be replicated exactly for other compute instances). A snapshot 1710 may be generated after the common initialization steps are performed, and before the instance-specific configuration operations are performed in at least some embodiments. The execution of the source compute instance may be paused in various embodiments before the snapshot is saved to a repository, and the execution may be resumed after the snapshot has been generated. The snapshot 1710 may be generated in response to a programmatic request from a VCS client in some embodiments. In at least one implementation, a VCS client may insert a command, e.g., within a configuration script or program being executed in the compute instance, to generate a snapshot at one or more stages of the operations of the compute instance, such as between the two configuration phases indicated along timeline 1701.

In at least some embodiments, the VCS may be able to automatically identify one or more points during the lifetime of a compute instance at which snapshots that are likely to be usable later can be generated. For example, along timeline 1751 of another source compute instance, a first set of operations labeled Stage 1 operations1 1725 may represent example tasks that are likely to be re-performed at a large number of other compute instances, and a second set of operations labeled Stage 2 operations 1735 may be likely to be re-performed at a smaller number of other compute instances. A component of the VCS control plane may automatically identify respective snapshot generation points between Stage 1 and Stage 2, and also between Stage 2 and Stage 3 in the depicted embodiment. Such detection may, for example, be based on a client-requested analysis by the VCS control plane of configuration and/or application steps performed at numerous compute instances in various embodiments. In effect, in such embodiments, the VCS may (if requested, or by default) identify commonalities in the operations performed at a set of compute instances, and insert snapshot generation operations/instructions into the compute instances at points selected based on the extent to which various sets of tasks before those points are likely to be repeated in additional compute instances. A descriptor of a given snapshot such as 1730 or 1740 may be generated as well by the VCS in some embodiments, indicating the operations whose results are incorporated into that snapshot. A client may submit a programmatic request indicating the particular snapshot to be used for a cloned compute instance in various embodiments, e.g., based on such descriptors (in the case where the VCS automatically generated the snapshots) and/or based on the client's knowledge of the state of the compute instance at the time of the snapshot (in the case where the snapshots are generated in response to client command/requests).

Figure 18:
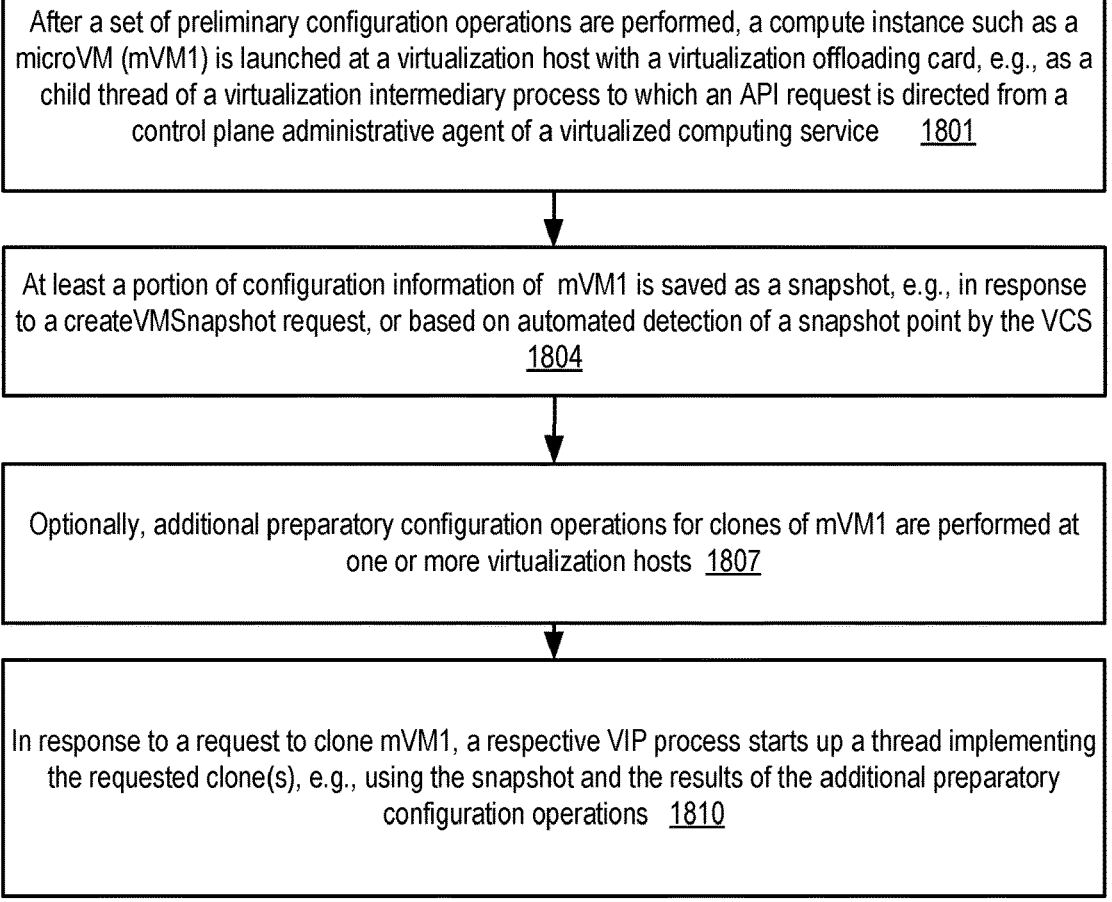
FIG. 18 is a flow diagram illustrating aspects of operations that may be performed at a virtualized computing service to clone micro virtual machines from snapshots, according to at least some embodiments.

FIG. 18 is a flow diagram illustrating aspects of operations that may be performed at a virtualized computing service to clone micro virtual machines from snapshots, according to at least some embodiments. After a first set of preliminary configuration operations of the kind discussed above are performed, a compute instance such as a micro VM (mVM1) may be launched at a virtualization host with a virtualization offloading card in the depicted embodiment (element 1801). For example, using the type of process architecture discussed above, mVM1 may be implemented using a child thread of a virtualization intermediary process (VIP) to which an API call is directed from a VCS control plane administrative agent in some embodiments. At least some of the first set of configuration operations initiated prior to launching mVM1 may be performed in response to one or more programmatic requests in some embodiments, such as the prepareForLaunches request discussed earlier. In at least some embodiments, the set of operations that can be performed in the first set may depend on the virtualization control mode (VCM) being used.

In some embodiments, at least a portion of the configuration information of mVM1 (e.g., various aspects of storage and/or networking settings, initial rate limits, and the like) may be saved as a snapshot (element 1804), e.g., in response to a "createVMSnapshot" request received at the VCS control plane via a programmatic interface. Such a request may, for example, be submitted by a client of the VCS in anticipation of needing to launch a large number of similarly-configured micro VMs ("clones" of mVM1) in some embodiments. The snapshot may, for example, be stored at a repository managed by the VCS control plane in some embodiments, at a storage device other than the local storage of the virtualization host where mVM1 was launched. In some embodiments, the snapshot may be generated based on an automated detection by the VCS of a snapshot point during the lifetime of mVM1; in such embodiments, a client-submitted request to generate the snapshot at a client-selected snapshot point or stage of execution may not be required.

One or more additional preparatory configuration operations (e.g., to set up software devices etc.) for clones of mVM1 may optionally be performed at one or more virtualization hosts in the depicted embodiment (element 1807). In some embodiments, such operations may be performed in response to a "prepareToClone" request received via a programmatic interface. In at least one embodiment, such configuration operations may not be required.

In response to a request to clone mVM1 (e.g., a "cloneVM" API call), a respective VIP process may start up a child thread implementing the requested clone, using the saved snapshot and/or the results of the additional preparatory configuration operations (if any) in the depicted embodiment (element 1810). In some embodiments, the snapshot may comprise the configuration of the VIP process as a whole, not just the configuration of the child thread implementing mVM1.

Scalability Factors

Figure 19:
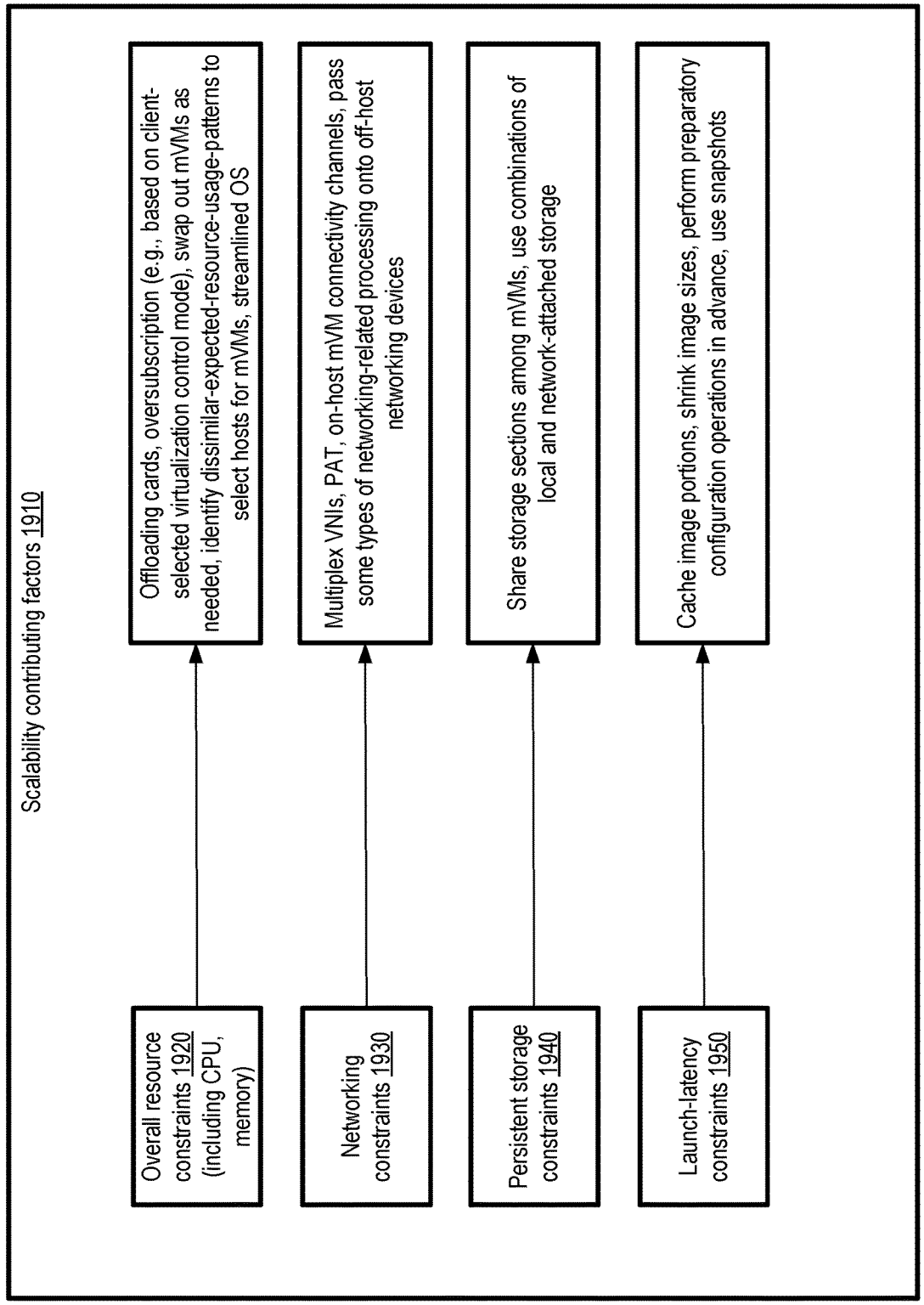
FIG. 19 illustrates a high level overview of factors that may collectively enable very large numbers of compute instances to be launched at a single virtualization host, according to at least some embodiments.

FIG. 19 illustrates a high level overview of factors that may collectively enable very large numbers of compute instances to be launched at a single virtualization host, according to at least some embodiments. Even as more and more performant hardware becomes available for individual virtualization hosts, each host may have various types of resource constraints which tend to limit the number of compute instances (such as micro VMs) that can be launched on it. In order to alleviate or limit the impact of such constraints, a number of techniques may be employed in various embodiments, so that for example thousands or tens of thousands of micro VMs may be instantiated without saturating the utilization of various types of resources of the hosts.

A number of the techniques may help to alleviate overall constraints 1920 for several types of resources, including, among others, memory and CPU resources of the virtualization hosts. Such techniques may include, for example, the use of virtualization offloading cards to reduce the virtualization-related overhead on the CPUs and memory of the host, the use of oversubscription (which may be based on the virtualization control mode selected by the client) in combination with swapping out micro VMs as needed, the use of streamlined versions of operating systems from which support for rarely-used legacy devices has been stripped, and/or intelligent placement algorithms that attempt to place combinations of micro VMs that differ in their individual resource usage mixes. Intelligent placement may, for example, attempt to ensure that no single type of resource becomes the bottleneck at a virtualization host while other types of resources remain under-utilized—for example, the VCS may avoid scenarios in which a thousand micro VMs with disk-intensive workloads are placed on the same host while the host's CPUs remain at a less than 20% overall utilization level. Intelligent placement may be implemented by the VCS control plane in one or more virtualization control modes (e.g., SMM or DMM) in some embodiments, while placement decisions for at least some compute instances may be made by the client in other VCMs (e.g., DPM).

Any combination of several techniques may be used to alleviate networking-related constraints 1930 of a virtualization host in at least some embodiments. Such techniques may include, for example, the use of multiplexed (parent-child) VNI hierarchies as discussed earlier, Port Address Translation using a single child VNI for some types of traffic from all the micro VMs on the host, special optimized on-host channels for connectivity among micro VMs at a given host, re-using existing VNIs or SNIDs, and/or passing some types of network processing tasks on to off-host networking devices. In the latter technique, when a certain type of packet is received at an OVMC card responsible for networking-related virtualization, the card may generate an encapsulation packet and transfer the received packet in encapsulated form to an off-host network processing device. As a result, portions of the overall workload associated with networking for virtual machines of the host may be farmed out not just to the OVMC cards, but also to external devices in such embodiments.

With respect to alleviation of persistent storage constraints 1940, the techniques employed in some embodiments may include sharing sections of storage among micro VMs using a tiered storage hierarchy and/or using combinations of locally attached storage and network-attached storage as discussed earlier. With respect to constraints on micro VM launch latency 1950, the use of caching of boot/machine image portions as discussed earlier may help shorten launch times. Reducing the sizes of machine images using a VCS-provided tool set as discussed earlier may also help reduce launch times in various embodiments. The generation and use of snapshots, and/or the implementation of preparatory configuration steps in advance of launch requests may further make launches of compute instances such as micro VMs faster in at least some embodiments. A number of other techniques may be used in some embodiments to support the launching of large numbers of compute instances including micro VMs on individual hosts, and/or some of the techniques indicated in FIG. 19 may not be used.

Cell-Based VCS Control Plane

Figure 20:
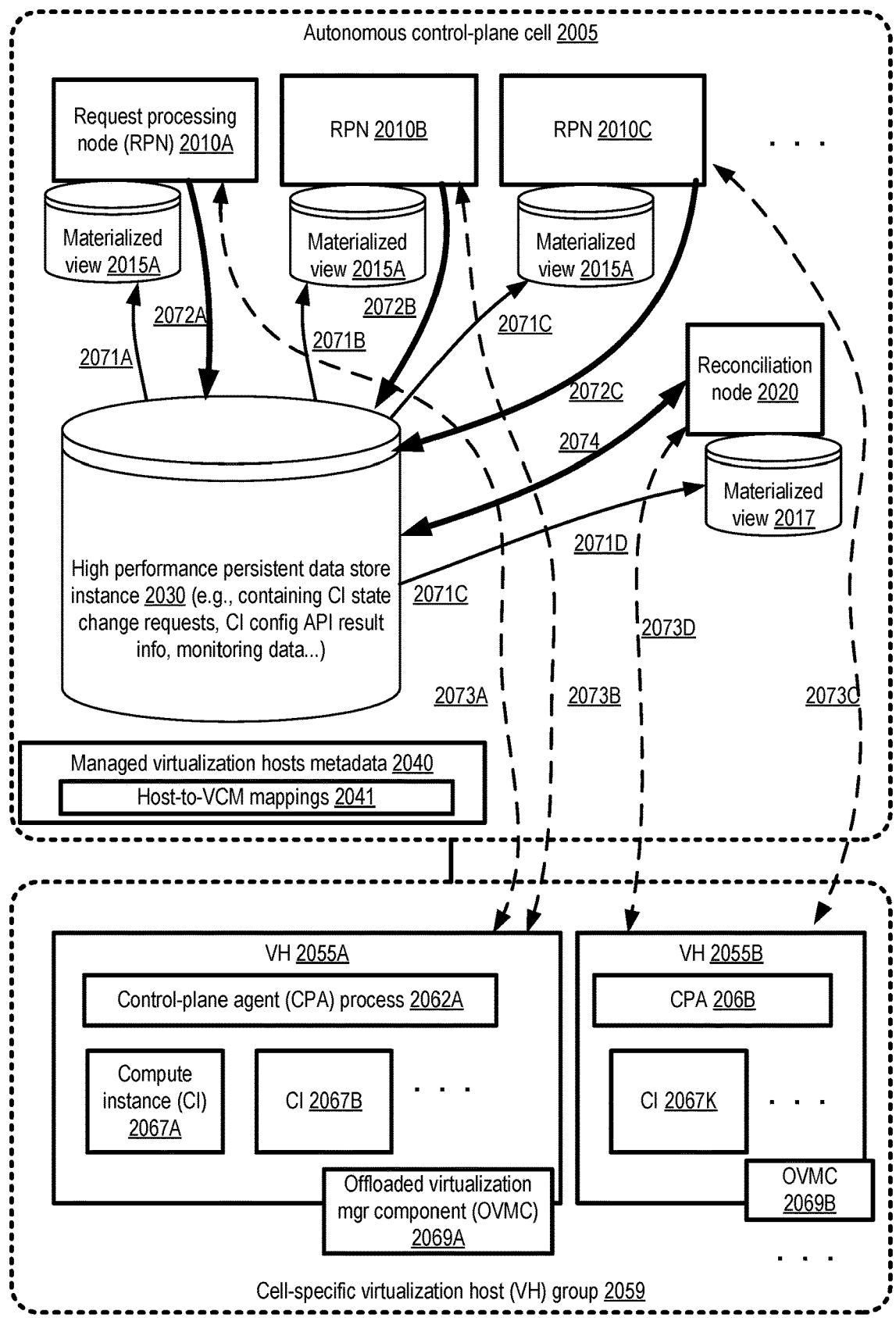
FIG. 20 provides a high-level overview of an example architecture of a control plane cell of a virtualized computing service, according to at least some embodiments.

In various embodiments, the use of a modular cell-based control plane for the VCS may also help to improve the overall performance levels and scalability achievable for various types of virtualization-related requests. As needed, new cells may be added to the control plane to handle increasing workloads in various embodiments; as a result, the control plane itself may be eliminated as a potential bottleneck with respect to virtualization operations. FIG. 20 provides a high-level overview of an example architecture of a control plane cell of a virtualized computing service, according to at least some embodiments. As shown, an autonomous control plane cell 2005 may comprise some number of request processing nodes (RPNs) 2010 (e.g., 2010A, 2010B and 2010C), one or more reconciliation nodes 2020, an instance 2030 of a high performance persistent data store, and metadata 2040 indicating a group of one or more virtualization hosts to be managed by the cell in the depicted embodiment. In some embodiments the virtualization hosts may be considered part of the cell. In some embodiments, for virtualization control modes in which dedicated hosts are assigned for the compute instances of a client, a given client may be assigned hosts managed by multiple control plane cells. In other embodiments, dedicated hosts may be assigned to a given client from among the host group 2059 of a single control plane cell (unless the number of dedicated hosts to be assigned to the client exceeds the number of cells managed by a cell, in which case virtualization host groups 2059 managed by several different cells may be assigned).

In various embodiments, a log-based persistent data store 2030 may be used to store at least a portion of control plane information of a cell 2005. In at least some embodiments, an optimistic concurrency control algorithm may be employed for write transaction submitted to the data store instance 2030. The instance 2030 may serve as a repository storing a sequence of immutable records related to CI (compute instance) state changes, arranged in the order in which the corresponding state change events were processed in some embodiments. The instance 2030 may, for example, include records indicating requests for CI state changes received at the RPNs (such as requests to provision resources for CIs, prepare for launches of CIs, launch CIs or applications, terminate or modify CIs or applications, etc.), API requests submitted to virtualization hosts (e.g., to control plane agents of the kind described above) to implement requested configuration changes, results of such API requests, monitoring data, and/or records of rectification operations which may be initiated by the reconciliation node 2020 in some embodiments. At least a portion of the contents of the data store instance 2030 may be materialized in some embodiments at individual ones of the RPNs and/or the reconciliation node. For example, a respective materialized view 2015 (e.g., 2015A, 2015B or 2015C) comprising at least a relevant subset of the contents of the instance 2030 may be generated and updated as needed for each of the RPNs 2010 (as indicated by arrows 2071A, 2071B and 2071C), and a materialized view 2017 may be generated and updated as needed for the reconciliation node 2020 (as indicated by arrow 2074) in the depicted embodiment.

When a client of the VCS submits a programmatic request (similar to the requests discussed earlier, e.g., in the context of FIG. 4 or FIG. 5), a request router of the VCS may direct the request (or an internal representation of the request) to a selected RPN 2010 at a selected cell 2005 in various embodiments. Any of various properties of the request (e.g. the identity of the requester, a networking property such as an IVN subnet, etc.) and/or properties of the individual cells that have been established at the VCS control plane (e.g., resource utilization information pertaining to the cells or the hosts managed by the cells) may be used to decide which cell should be responsible for a requested CI. In some embodiments in which the selected cell contains multiple RPNs, a particular RPN may be selected using a random selection policy. In other embodiments, a mapping function between one or more VM request properties and an RPN ID may be used to select the RPN. In some embodiments, after a particular RPN is selected to respond to the instantiation of a CI, that same RPN may be used for processing any additional state changes requests for that CI. In contrast, in other embodiments, any of the RPNs may be selected to process one or more of the state change requests pertaining to a given CI.

After receiving an indication of a request to instantiate a CI, an RPN 2010 may initiate at least a portion of a workflow to launch a CI with the properties indicated in the request in the depicted embodiment. The workflow may comprise a synchronous set of operations and an asynchronous set of operations in some embodiments, with the synchronous operations being performed by the RPN 2010, and the asynchronous operations being performed by the reconciliation node. In one embodiment, the RPN may store a record of the request at the data store instance 2030 (as indicated by arrows 2072A, 2072B and 2072C), and then submit one or more API requests to a selected virtualization host 2055 (e.g., 2055A or 2055B) of the group 2059 of virtualization hosts being managed by the cell. The virtualization hosts 2055 shown in FIG. 20 may be similar in features and capabilities to the virtualization hosts shown in earlier figures, including FIG. 1. Such APIs calls may be used, for example, to perform some of the preparatory configuration steps (such as the attachment, to a parent VNI at the host, of a child VNI to be used by the requested CI) discussed earlier, and then to submit the request the launch of a CI to the CPA at the virtualization host. The invocation of one or more APIs by an RPN 2010, and the corresponding responses, are indicated by arrows labeled 2073 (2073A, 2073B and 2073C) in FIG. 14.

In embodiments in which the virtualization host comprises an offloaded virtualization manager component 2069 (e.g., OVMCs 2069A or 2069B), the portion of the workflow initiated by the RPN may involve the use of the OVMC—e.g., at least a portion of the network and storage I/O configuration of the requested VM may be performed with the help of the OVMC. In some embodiments, a response to the API call may also be recorded in the instance 2030 of the persistent data store by the RPN. For example, in response to the API invocation, a CPA 2065 (e.g., 2065A or 2065B) at a virtualization host 2055 (e.g., 2055A or 2055B) may start up a compute instance 2067 (e.g., 2067A, 2067B or 2067C) such as micro VM and provide a CI identifier or other metadata pertaining to that CI to the RPN in some embodiments. A similar approach may be taken by an RPN to other types of CI configuration change requests in various embodiments. For example, when a request to modify or terminate a CI is received, a record of the request may be stored in the instance 2030 and an API may be invoked to perform the modification or termination. In some embodiments, the API may for a CI state change may be invoked before, or in parallel with, the insertion of the record of the request in the data store instance 2030.

In some cases, a request (such as an API call initiated by the RPN) directed to the virtualization host 2055 for a CI state change may not succeed, or may take a longer time than expected. In order to deal with such scenarios, in some embodiments the reconciliation node 2020 may perform one or more anti-entropy iterations, e.g., as part of the asynchronous portion of the workflow associated with CI state change requests. In a given anti-entropy iteration, the actual states of one or more CIs may be compared to their respective expected states, and one or more rectification operations to attempt to change the states of the CIs to their expected state may be initiated. In one embodiment, the reconciliation node 2020 may examine at least a portion of the data store instance 2030 to determine the expected states and/or the actual states, as indicated by arrow 2074. In at least one embodiment, the reconciliation node 2020 may communicate with one or more of the virtualization hosts 2055 (e.g., with the CPA 2062, or with a CI itself) to determine the actual state of a CI, as indicated by arrow 2073D. If a discrepancy between an expected state and an actual state of a CI is identified, the reconciliation node 2020 may take any of several types of rectification actions in the depicted embodiment: e.g., a request may be sent to a virtualization host 2055 via an API invocation, or a request may be sent to an RPN to re-try an operation that has not succeeded. In at least some embodiments, a record of the rectification action may be added to the instance 2030 of the data store by the reconciliation node 2020. A number of different types of triggers may lead to the initiation of an anti-entropy iteration of the reconciliation node in various embodiments—e.g., a new iteration may be initiated when a particular amount of time has elapsed since the previous iteration, when a certain number of state change requests have been processed by the RPNs since the previous iteration, when an apparent failure is detected at some component of the cell 2005, or if a request for an anti-entropy iteration is received (e.g., from another component of the cell 2005, from a virtualization host 2055, or from some other component of the VCS control plane).

Various parameters governing the structure and internal organization of a cell 2005 may be tuned or adjusted over time in some embodiments, e.g., by a cell pool manager, in an effort to ensure that targeted levels of performance, availability and fault tolerance regarding client requests for CI state changes continue to be maintained. Such parameters may, for example, include the number of RPNs 2010 to be set up in a cell, the number of reconciliation nodes 2020 to be set up, the write rate capacity of the persistent data store instance 2030, the number and types of virtualization hosts 2055 managed by the cell, how many distinct hosts are to be used for RPNs and reconciliation nodes at the cell (e.g., whether there is a 1:1 relationship between RPNs and hosts, in which case each RPN would be set up on a respective host, or an N:1 relationship) and so on. In at least some embodiments, the RPNs and/or the reconciliation node may be implemented at respective compute instances (e.g., as instances of standardized CI types supported at the VCS, or as instances of micro VMs).

In various embodiments, information about the particular virtualization control modes (e.g., the DPM, DMM or SMM modes discussed earlier) being used for various virtualization hosts 2055 being managed at a cell 2005 may be included in the metadata 2040, e.g., in the form of host-to-VCM mappings 2041. The set of preparatory configuration operations that are performed at a given host in advance of launch requests for CIs at that host (as opposed to the configuration operations that can only be performed after the launch requests are received) may be determined, e.g., at one or more of the RPNs, based at least in part on the VCM information. For example, in the dedicated power-user mode (DPM), because the set of hosts to be used may be known in advance, at least some networking-related configuration operations such as establishment of one or more virtual network interfaces may also be feasible in advance, whereas in shared managed mode, such operations may have to be performed after a particular host is selected after a launch request is received.

Provider Network Environment

Figure 21:
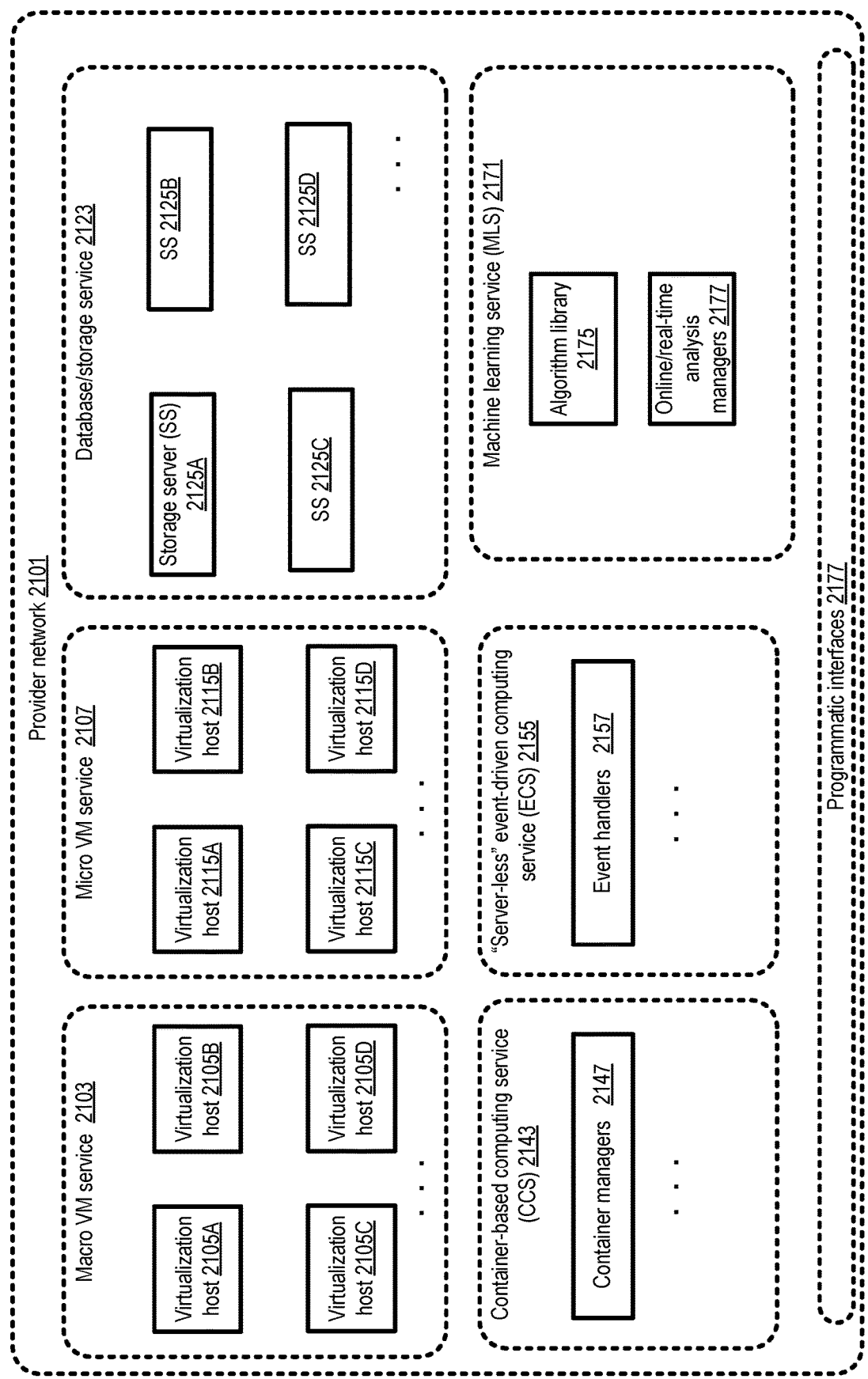
FIG. 21 illustrates a provider network environment at which one or more types of virtualized computing services may be implemented, according to at least some embodiments.

FIG. 21 illustrates a provider network environment at which a virtualized computing service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 2101 may comprise resources used to implement a plurality of services, including, for example, a micro VM service 2107, macro VM service 2103, a container-based computing service 2143, an event-driven computing service 2155, a database or storage service 2123, and a machine learning service (MLS) 2171. The virtualization hosts 2105 (e.g., 2105A-2105D) of the macro VM service 2103 may be used for longer-lasting compute instances that individually utilize/request more resources than the threshold resource usage defined for micro VMs in the depicted embodiment. At the virtualization hosts 2115 (e.g., 2115A-2115D) of the micro VM service, one or more of the techniques to accelerate launches (e.g., preparatory configuration operations being performed in advance, caching and size optimization of machine images, etc.) and support large numbers of compute instances on a given host may be implemented in the depicted embodiment. In some embodiments, compute instances of all sizes and lifetimes may be implemented using a single virtualized computing service—e.g., micro VM service 2107 and macro VM service 2103 may be implemented as lower-level services of a virtualized computing service similar to VCS 102 of FIG. 1.

Components of a given service may utilize components of other services in the depicted embodiment—e.g., for some machine learning tasks, a component of the machine learning service 2171 may utilize micro virtual machines implemented at virtualization hosts such as 2115A-2115D. The virtualization hosts 2115 may be similar in capabilities and features to the virtualization hosts shown in FIG. 1 and other figures discussed earlier. Input data, intermediate results, final results and/or other artifacts of various machine learning algorithms or models, may be stored at storage servers 2125 (e.g., 2125A-2125D) of the database or storage service 2123 in some embodiments. In some embodiments, a storage service 2123 may be utilized by at least some types of virtual machines instantiated at the macro VM service or the micro VM service, e.g., to configure volumes that present block-device interfaces for use from micro VMs instantiated at the VCS. Individual ones of the services shown in FIG. 21 may implement a respective set of programmatic interfaces 2177 which can be used by external and/or internal clients (where the internal clients may comprise components of other services) in the depicted embodiment.

A container-based computing service (CCS) 2143 may enable its clients to use software containers, without having to provision the underlying hardware, virtual machines or operating systems in the depicted embodiment. Software containers are lightweight mechanisms for packaging and deploying applications, providing a consistent portable software environment for applications to easily run and scale. In at least some embodiments, micro VMs implemented at the service 2107 may be instantiated for container-based computing service clients. Individual ones of the micro VMs may comprise one or more software containers in such embodiments, established in response to requests submitted by the CCS on behalf of CCS clients. As such, the CCS may represent one example of an intermediary service of the kind discussed earlier with respect to at least some micro VMs. In some embodiments, network channels (e.g., using Port Address Translation as described in the context of FIG. 10) for interactions between the control plane of the CCS and the micro VMs may be established by the micro VM service. In such embodiments, at least some requests to the micro VM service to prepare for and/or instantiate micro VMs may be submitted by container managers 2147 of the service 2143.

At event-driven computing service (ECS) 2155, resources for requested operations may be provisioned dynamically using VMs created at the micro VM service and/or the macro VM service, after a request for the operation triggers the provisioning in the depicted embodiment. Such computing services which support dynamic event-driven provisioning may be referred to as "server-less" computing services in some embodiments, as specific (virtual or physical) servers may not have to be acquired in advance of the processing of various client-requested operations. In effect, in some embodiments, clients of an event-driven computing service 2155 may package up some program code that is to be run and submit it to the service for execution at resources selected by the service; the clients may not necessarily care where their packaged code is run as long as the results are provided within desired timeframes. As such, for some types of requests directed at service 2155, micro VMs instantiated using service 2107 may be ideal execution platforms, and the ECS 2155 may represent another example of an intermediary service that utilizes micro VM capabilities. As in the case of the CCS 2143, in some embodiments network channels may be set up at the virtualization hosts 2155 for traffic between the micro VMs and the control plane of the ECS 2155. In some embodiments, the event-driven computing service 2155 and/or the container-based computing service 2143 may be implemented as subcomponents of a VCS, e.g., along with the micro VM service and/or the macro VM service.

A machine learning service 2171 may also utilize micro VMs implemented using service 2107 in some embodiments, e.g., to instantiate relatively short-lived virtual machines to run real-time analytics models. Online/real-time analysis managers 2177 of the MLS 2171 may submit requests to the micro VM service control plane to obtain virtual machines that can be used to implement algorithms selected from library 2175 in such embodiments. Longer machine learning tasks, such as training complex models, may be performed using compute instances managed by the macro VM service in some embodiments.

Methods for Supporting Micro VMs

FIG. 22 is a flow diagram illustrating aspects of operations that may be performed at a virtualized computing service to support accelerated launch times and client-selectable levels of virtualization control, according to at least some embodiments. As shown in element 2201, in various embodiments information about a set of supported virtualization control modes (VCMs) for compute instances (CIs) of one or more types (e.g., micro-VMs that meet a required resource capacity criterion) may be provided via programmatic interfaces of a virtualized computing service (VCS) (e.g., a VCS similar in features and functionality to the VCS 102 of FIG. 1). The supported VCMs may, for example, include a shared managed mode (SMM), a dedicated managed mode (DMM), a dedicated power user mode (DPM) and the like in some embodiments. The modes may differ from one another with respect to the level of client control, and client responsibilities, with regard to placement decisions for compute instances, resource oversubscription and the like in at least some embodiments. The particular mode being used for a given client may also influence the extent to which compute instance launches can be sped up in various embodiments, so clients may be able to make tradeoffs regarding launch speed versus user control/responsibilities.

Respective indications of (a) a machine image to be used to instantiate one or more CIs, (b) an isolated virtual network (IVN) with which connectivity from the one or more compute instances is to be configured and/or (c) a particular VCM, VCM1, to be used for configuring/administering a set of compute instances may be obtained, e.g., via a programmatic interface of the VCS in some embodiments (element 2204). The machine image may, for example, represent a snapshot that comprises saved state information from an earlier-launched CI in at least some embodiments. In one embodiment, one or more tools provided by the VCS may have been used to generate the image, e.g., by eliminating a set of unused modules at various levels of the software stack from a baseline image.

Based at least partly on the selected virtualization control mode VCM1, a set of preparatory configuration operations that collectively enable faster responses to future CI launch requests may be initiated/performed (element 2207) in the depicted embodiment. Such operations may include, for example, caching at least a portion of the machine image at a location accessible from one or more candidate virtualization hosts (VHs) that each include a virtualization management offloading card, caching additional data objects that may be shared among CIs (such as software container images or artifacts), initializing one or more virtual network interfaces, etc. In at least some embodiments, the extent of advance preparation, and therefore the extent of launch acceleration that may potentially be achieved, may be greater for VCMs in which the client has greater control and can, for example, indicate the specific virtualization hosts to be used.

A launch request for one or more CIs (e.g., a collaborating group of micro-VMs) may be received at the VCS (element 2210) in various embodiments. Depending on VCM1, the request may indicate the specific VH(s) at which the respective CIs are to be instantiated. Control plane components of the VCS may select the host(s) if a VCM in which clients do not make CI placement decisions is being used.

Any additional pre-requisite configuration operations required for the requested CIs may be performed, and the requested CIs may be launched (element 2213) in some embodiments. An individual CI may, for example, be a thread of a virtualization intermediary process established by a VCS control plane agent at a VH in response to the launch request. One or more types of communication channels may be established for the CIs in some embodiments, including over-the-network channels (e.g., to devices within the IVN, thus configuring the CIs as part of the IVN) via respective virtual network interfaces whose traffic is processed at a virtualization management offloading card, local channels for communications with other CIs without using network resources, etc. In at least one embodiment, a given CI may be terminated after a pre-disclosed duration, and an indication of the duration may be provided programmatically to the requesting client.

Depending on VCM1, detailed information regarding the requested resource capacities of CIs at a given host and/or measures of actual resources used at that host by the CIs may be provided to a client in some embodiments (element 2216). Such information may be used, when requesting additional CIs, to oversubscribe resources along desired dimensions such as CPU, memory etc. by the client if desired in one embodiment. For example, a client using a VCM that permits oversubscription may include the identifier of a particular VH (VH-k) in a launch request, and the VCS may launch the requested CI at VH-k without verifying or checking whether the additional CI would lead to exceeding the nominal resource capacity of VH-k.

In at least some embodiments, snapshots of state information of a CI, including CPU state, memory state etc. may be generated, e.g., based on requests from programs running at the CI, requests from clients and/or auto-detection of snapshot points during CI execution (element 2219). Such snapshots may be used to clone CIs (e.g., by specifying the snapshots as the machine images to be used) that have already been at least partly configured, further shortening the time taken by a CI to start doing useful application work in such embodiments.

It is noted that in various embodiments, some of the operations shown in the flow diagrams of FIG. 11, FIG. 18 and/or FIG. 22 may be implemented in a different order than that shown in the figure, or may be performed in parallel rather than sequentially. Additionally, some of the operations shown in FIG. 11, FIG. 18 and/or FIG. 22 may not be required in one or more implementations.

Use Cases

The techniques described above, involving the use of a variety of techniques to support varying levels of client control over virtualization decisions, as well as large numbers of compute instances per host, at a network-accessible virtualized computing service may be extremely beneficial for a number of reasons in various scenarios. Many types of computations performed at a virtualized computing service on behalf of other intermediary services (e.g., services that support software containers, or services that allow customers to submit programs to be executed at resources selected by the service instead of the customer) and/or on behalf of individual clients may require only a limited set of resources, and/or may have fairly short lifespans. The overhead associated with setting up traditional compute instances, which may assume longer lifespans and larger resource needs, may not be cost-effective for such small compute instances or "micro" VMs. At least some clients may be interested in more control over decisions such as compute instance placement, the level of oversubscription with regard to various types of resources at the hosts used for the compute instances, and so on. By providing clients options to select from among a plurality of virtualization control modes, the requirements of such clients may be met. Techniques that involve the installation of stripped down versions of operating systems at virtualization hosts, the use of virtualization offloading cards (both of which would enable a larger fraction of the host's resources available for client-requested compute instances), fine-grained multiplexing/sharing of software and hardware networking and storage devices among compute instances, the use of swappable processes to instantiate the compute instances, and the like may in combination enable large numbers (e.g., tens of thousands) of compute instances to be set up at a single host without affecting the overall performance perceived by the clients. Substantial savings in terms of the total CPU, memory and storage needed to support the compute instances, relative to some conventional virtualization techniques, may be obtained.

Illustrative Computer System

Figure 23:
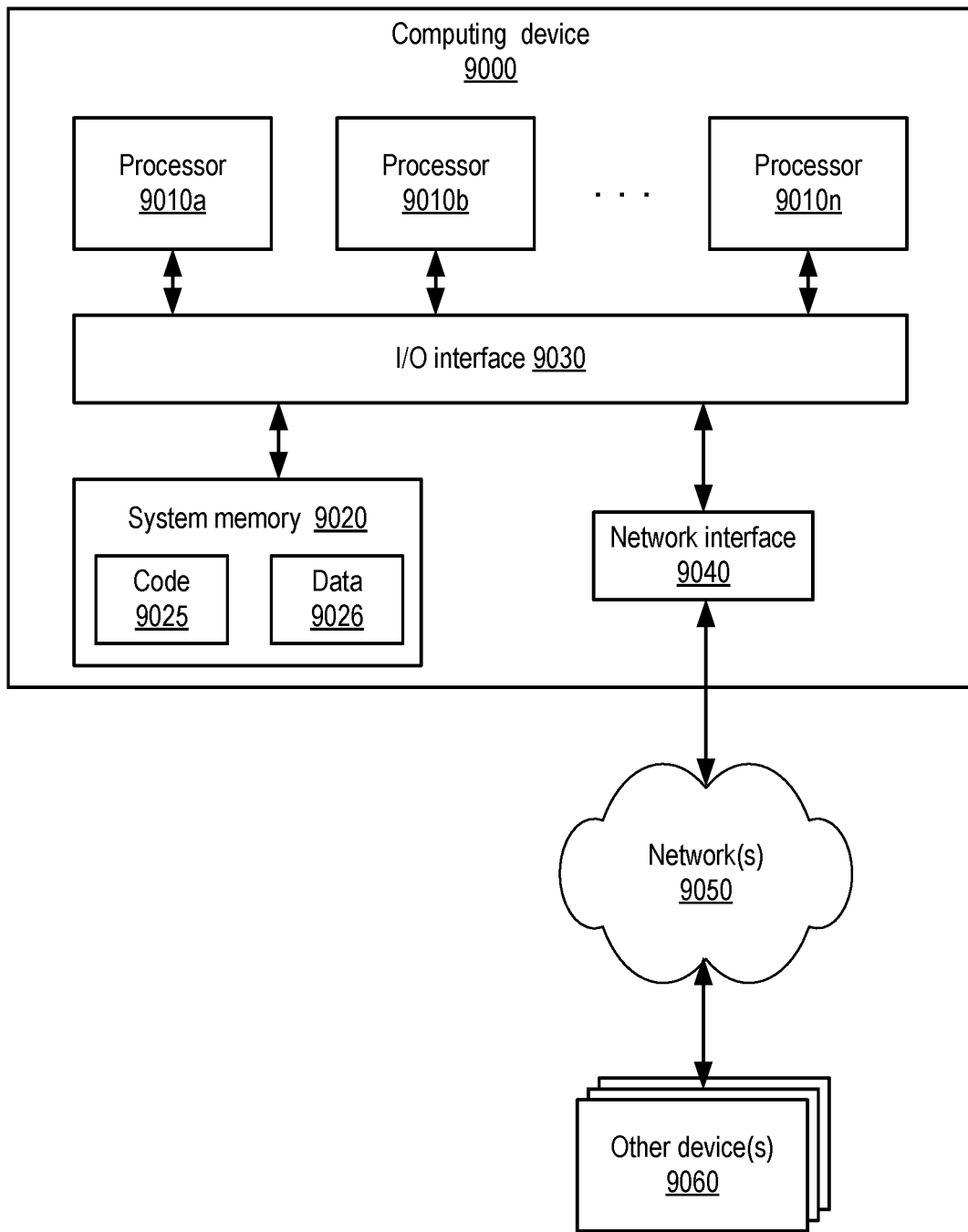
FIG. 23 is a block diagram illustrating an example computing device that may be used in at least some embodiments.

In at least some embodiments, a server that implements a portion or all of one or more of the technologies described herein, including the various components of the data plane and/or control plane of a virtualized computing service, may include a general-purpose computer system that includes or is configured to access one or more computer-accessible media. FIG. 23 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030. In some embodiments, one or more of the components shown in FIG. 23 may be attached to a motherboard.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 22, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 22 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 23 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices of a network-accessible computing service;
   wherein the one or more computing devices comprise program instructions that when executed on or across one or more processors cause the one or more computing devices to:
      obtain respective indications of (a) a machine image to be used to instantiate one or more micro virtual machines which meet a first resource capacity criterion, (b) an isolated virtual network to which connectivity from the one or more micro virtual machines is to be established, and (c) a first virtualization control mode associated with the one or more micro virtual machines;

initiate, based at least in part on the first virtualization control mode, one or more preparatory configuration operations enabling an accelerated response to a future launch request for a micro virtual machine, wherein the one or more preparatory configuration operations include (a) a transfer of the machine image to a storage device accessible from a first virtualization host and (b) an initialization of one or more virtual network interfaces at the first virtualization host, including a first virtual network interface; and cause, responsive to request and subsequent to initiating the one or more preparatory configuration operations, a first micro virtual machine to be instantiated using the machine image at the first virtualization host, wherein the first micro virtual machine is a thread of an intermediary process launched by an administrative agent of the computing service at the first virtualization host in response to a first launch request, and wherein the first micro virtual machine is configured within the isolated virtual network.

2. The system as recited in claim 1, wherein a second launch request indicates that a plurality of collaborating micro virtual machines, including a second micro virtual machine and a third micro virtual machine, are to be instantiated, wherein the one or more computing devices further comprise program instructions that when executed on or across one or more processors further cause the one or more computing devices to:

cause the second and third micro virtual machines to be launched at the first virtualization host; and causing a local channel for communication between the second and third virtual machines to be established at the first virtualization host, wherein the local communication channel does not utilize a network device.

3. The system as recited in claim 1, wherein the one or more computing devices further comprise program instructions that when executed on or across one or more processors further cause the one or more computing devices to:

provide, based at least in part on determining that the first virtualization control mode is in use, respective identifiers of one or more candidate virtualization hosts to a first client of a computing service, wherein the first launch request comprises an identifier of the first virtualization host, and wherein an identifier of a candidate virtualization host for a micro virtual machine to be configured using a second virtualization control mode on behalf of a second client is not provided to the second client.

4. The system as recited in claim 1, wherein the one or more computing devices further comprise program instructions that when executed on or across one or more processors further cause the one or more computing devices to:

obtain an indication, via a programmatic request from a client, of an identifier of a virtualization host to be used for a second virtual machine, wherein instantiation of the second virtual machine results in an oversubscription of at least one type of resource.

5. The system as recited in claim 1, wherein the one or more computing devices further comprise program instructions that when executed on or across one or more processors further cause the one or more computing devices to:

based at least in part on determining that the first virtualization control mode is to be used for the one or more micro virtual machines, store metadata indicating that one or more candidate virtualization hosts are dedicated exclusively for a client.

6. A method, comprising:

performing, by one or more computing devices:

determining a first virtualization control mode to be used for configuring one or more compute instances;

initiating, responsive to determining the first virtualization control mode, one or more preparatory configuration operations enabling an accelerated response to a future request for launching at least one compute instance of the one or more compute instances, including (a) a transfer of at least a portion of a first machine image to a storage device accessible from a first virtualization host selected according to the determined first virtualization control mode, and (b) an initialization of one or more virtual network interfaces; and causing, responsive to request and subsequent to initiating the one or more preparatory configuration operations, a first compute instance to be launched using the first machine image at the first virtualization host, wherein the first compute instance is a thread of an intermediary process launched by an administrative agent at the first virtualization host in response to a first launch request.

7. The method as recited in claim 6, wherein determining the first virtualization control mode comprises obtaining an indication of the first virtualization control mode via a programmatic interface.

8. The method as recited in claim 6, further comprising performing, by the one or more computing devices:

providing, based at least in part on the first virtualization control mode, respective identifiers of one or more candidate virtualization hosts to a first client of a computing service, wherein the first launch request comprises an identifier of the first virtualization host, and wherein an identifier of a candidate virtualization host for a compute instance to be configured using a second virtualization control mode on behalf of a second client is not provided to the second client.

9. The method as recited in claim 6, wherein the first virtualization host has a first resource capacity of a first resource type, the method further comprising performing, by the one or more computing devices:

providing, to a client of a computing service on whose behalf the first compute instance is launched, respective indicators of (a) requested resource levels, with respect to the first resource type, of a set of compute instances of the first virtualization host, and (b) a metric of measured resource usage, with respect to the first resource type, of the set of compute instances; and causing, in response to an additional launch request for an additional compute instance, the additional compute instance to be instantiated at the first virtualization host, without verifying whether a requested resource level of the additional compute instance with respect to the first resource type would cause the first resource capacity to be exceeded.

10. The method as recited in claim 9, wherein the first resource type comprises one or more of: (a) processors, (b) volatile or non-volatile memory, (c) persistent storage, or (d) network bandwidth.

11. The method as recited in claim 6, further comprising performing, by the one or more computing devices:

storing metadata indicating that one or more candidate virtualization hosts are designated exclusively for compute instances requested by a first client of a computing service.

12. The method as recited in claim 11, further comprising performing, by the one or more computing devices:
identifying, in response to a second launch request, a particular virtualization host of the one or more candidate virtualization hosts at which a second compute instance is to be instantiated, wherein the second launch request does not include an indication of a target virtualization host to be used for the second compute instance.

13. The method as recited in claim 11, further comprising performing, by the one or more computing devices:
based at least in part on determining that a second virtualization control mode is to be used for a second compute instance on behalf of a second client, causing a second compute instance, requested by the second client, to be instantiated at a particular virtualization host; and
causing a third compute instance, requested by the third client, to be instantiated at the particular virtualization host.

14. The method as recited in claim 6, wherein the first launch request indicates that a plurality of collaborating compute instances, including the first compute instance and a second compute instance, is to be instantiated, the method further comprising performing, by the one or more computing devices:
causing the second compute instance to be launched at the first virtualization host; and
causing a local channel for communication between the first and second compute instances to be established at the first virtualization host, wherein the local communication channel does not utilize a network device.

15. The method as recited in claim 6, further comprising performing, by the one or more computing devices:
pausing execution of the first compute instance;
saving, to a persistent storage device, a snapshot of state information of the first compute instance; and
in response to a programmatic request, launching a clone compute instance of the first compute instance.

16. One or more non-transitory computer-accessible storage media storing program instructions that when executed on one or more processors cause one or more computer systems to:
determine a first virtualization control mode to be used for configuring one or more compute instances;
initiate, based at least in part on the first virtualization control mode, one or more preparatory configuration operations enabling an accelerated response to a future request for launching at least one compute instance of the one or more compute instances, including (a) a transfer of at least a portion of a first machine image to a storage device accessible from a first virtualization host selected based at least in part on the first virtualization control mode, and (b) an initialization of one or more virtual network interfaces to be used at the first virtualization host to communicate with one or more endpoints; and
cause, responsive to request and subsequent to initiating the one or more preparatory configuration operations, a first compute instance to be launched using the first machine image at the first virtualization host, wherein the first compute instance is a thread of an intermediary process launched by an administrative agent at the first virtualization host in response to a first launch request.

17. The one or more non-transitory computer-accessible storage media as recited in claim 16, further storing program instructions that when executed on one or more processors further cause the one or more computer systems to:
obtain an indication of the first virtualization control mode via a programmatic interface.

18. The one or more non-transitory computer-accessible storage media as recited in claim 16, wherein the first machine image is generated by a machine image optimization tool of a computing service, wherein to generate the first machine image, the machine image optimization tool eliminates, from a baseline image, based at least in part on a usage analysis, one or more of: (a) a kernel module, or (b) a system library.

19. The one or more non-transitory computer-accessible storage media as recited in claim 16, further storing program instructions that when executed on one or more processors further cause the one or more computer systems to:
in response to a mode change request submitted via a programmatic interface, store metadata indicating that a second virtualization control mode is to be used at the first virtualization host; and
cause, in accordance with the second virtualization control mode, an additional compute instance to be instantiated at the first virtualization host.

20. The one or more non-transitory computer-accessible storage media as recited in claim 16, further storing program instructions that when executed on one or more processors further cause the one or more computer systems to:
provide an indication, via a programmatic interface, of a lifetime limit of one or more compute instances including the first compute instance; and
cause the first compute instance to be automatically terminated in response to a determination that the lifetime limit has been reached by the first compute instance.

* * * * *